(12) United States Patent
Okamura

(10) Patent No.: US 10,864,436 B2
(45) Date of Patent: Dec. 15, 2020

(54) GAME CONTROLLER

(71) Applicant: NINTENDO CO., LTD., Kyoto (JP)

(72) Inventor: Takanori Okamura, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 49 days.

(21) Appl. No.: 15/422,775

(22) Filed: Feb. 2, 2017

(65) Prior Publication Data

US 2017/0354870 A1 Dec. 14, 2017

(30) Foreign Application Priority Data

Jun. 10, 2016 (JP) .................. 2016-116699
Oct. 19, 2016 (JP) .................. 2016-205167

(51) Int. Cl.
*A63F 13/24* (2014.01)
*A63F 13/285* (2014.01)

(52) U.S. Cl.
CPC ............ *A63F 13/24* (2014.09); *A63F 13/285* (2014.09)

(58) Field of Classification Search
CPC ............................. A63F 13/24; A63F 13/285
USPC .......................................................... 463/37
See application file for complete search history.

(56) References Cited

U.S. PATENT DOCUMENTS

| | | | |
|---|---|---|---|
| 3,641,576 A | 2/1972 | Farbanish | |
| 3,956,751 A | 5/1976 | Herman | |
| 4,612,668 A | 9/1986 | Sarac | |
| 4,636,802 A | 1/1987 | Middleton, Jr. | |
| 4,647,937 A | 3/1987 | Hidaka et al. | |
| 4,748,295 A | 5/1988 | Rogers | |
| 4,775,573 A | 10/1988 | Turek | |
| 4,854,040 A | 8/1989 | Turek | |
| 5,111,199 A | 5/1992 | Tomoda et al. | |
| 5,134,505 A | 7/1992 | Tanaka et al. | |
| 5,206,657 A | 4/1993 | Downey | |
| 5,207,426 A | 5/1993 | Inoue | |
| 5,451,973 A | 9/1995 | Walter et al. | |
| 5,551,693 A | 9/1996 | Goto et al. | |
| 5,644,113 A | 7/1997 | Date et al. | |

(Continued)

FOREIGN PATENT DOCUMENTS

| | | |
|---|---|---|
| CN | 205081655 U | 3/2016 |
| EP | 1 057 504 | 12/2000 |

(Continued)

OTHER PUBLICATIONS

Office Action dated May 17, 2018 issued in U.S. Appl. No. 15/647,315 (45 pgs.).

(Continued)

*Primary Examiner* — Omkar A Deodhar
*Assistant Examiner* — Shauna-Kay Hall
(74) *Attorney, Agent, or Firm* — Nixon & Vanderhye, P.C.

(57) ABSTRACT

An example game controller includes, in each of left and right grip portions of a housing, a vibrator capable of vibrating in a first direction and a second direction. The game controller is divided into a main body housing and a grip portion. The vibrator comes into direct contact with the grip portion on a first surface of the vibrator corresponding to the first direction and a second surface of the vibrator corresponding to the second direction. Meanwhile, the vibrator comes into contact with the main body housing through a holder without coming into direct contact with the main body housing.

22 Claims, 31 Drawing Sheets

(56) References Cited

U.S. PATENT DOCUMENTS

| | | |
|---|---|---|
| 5,764,196 A | 6/1998 | Fujimoto et al. |
| 5,940,682 A | 8/1999 | Tabara |
| 5,973,644 A | 10/1999 | Haneishi et al. |
| 6,001,014 A * | 12/1999 | Ogata .................... A63F 13/02 463/37 |
| 6,046,674 A | 4/2000 | Irwin et al. |
| 6,069,564 A | 5/2000 | Hatano et al. |
| 6,104,354 A | 8/2000 | Hill et al. |
| 6,120,025 A | 9/2000 | Hughes, IV |
| 6,144,346 A | 11/2000 | Boy |
| 6,150,600 A | 11/2000 | Buchla |
| 6,161,761 A | 12/2000 | Ghaem et al. |
| 6,186,896 B1 | 2/2001 | Takeda et al. |
| 6,222,740 B1 | 4/2001 | Bovensiepen et al. |
| 6,241,247 B1 | 6/2001 | Sternberg et al. |
| 6,252,561 B1 | 6/2001 | Wu et al. |
| 6,342,009 B1 | 1/2002 | Soma |
| 6,350,365 B1 | 2/2002 | Koyama et al. |
| 6,356,243 B1 | 3/2002 | Schneider et al. |
| 6,394,906 B1 * | 5/2002 | Ogata ................... G06F 3/0216 463/38 |
| 6,435,969 B1 | 8/2002 | Tanaka et al. |
| 6,480,110 B2 | 11/2002 | Lee et al. |
| 6,582,887 B2 | 6/2003 | Luch |
| 6,641,479 B1 * | 11/2003 | Ogata ..................... A63F 13/06 463/37 |
| 6,710,766 B1 | 3/2004 | Ogata |
| 6,724,345 B2 | 4/2004 | Tran |
| 6,989,818 B2 | 1/2006 | Biheller |
| 7,512,413 B2 | 3/2009 | Hui et al. |
| 7,582,839 B2 | 9/2009 | Kyowski et al. |
| D709,882 S | 7/2014 | Morris et al. |
| 8,803,739 B2 | 8/2014 | Rajgopal et al. |
| 9,789,395 B2 | 10/2017 | Igarashi et al. |
| 2001/0008849 A1 | 7/2001 | Komata |
| 2002/0041258 A1 | 4/2002 | Schneider et al. |
| 2002/0080112 A1 * | 6/2002 | Braun .................... G06F 3/016 345/156 |
| 2002/0128064 A1 | 9/2002 | Sobota |
| 2002/0135519 A1 | 9/2002 | Luch |
| 2003/0030533 A1 | 2/2003 | Waffenschmidt |
| 2003/0042122 A1 | 3/2003 | Sato |
| 2003/0216180 A1 * | 11/2003 | Shinohara .............. A63F 13/06 463/37 |
| 2004/0023719 A1 | 2/2004 | Hussaini |
| 2004/0023720 A1 | 2/2004 | Sakoh |
| 2004/0077313 A1 | 4/2004 | Oba et al. |
| 2004/0129542 A1 | 7/2004 | Kawaguchi et al. |
| 2004/0224768 A1 | 11/2004 | Hussaini |
| 2005/0024268 A1 | 2/2005 | McKinzie, III et al. |
| 2005/0025117 A1 | 2/2005 | Inagaki et al. |
| 2005/0041624 A1 | 2/2005 | Hui et al. |
| 2005/0064814 A1 | 3/2005 | Matsuo et al. |
| 2005/0153777 A1 | 7/2005 | Koshima |
| 2005/0269769 A1 | 12/2005 | Naghi et al. |
| 2006/0022951 A1 | 2/2006 | Hull |
| 2006/0109182 A1 | 5/2006 | Rosenberg et al. |
| 2006/0260921 A1 | 11/2006 | Lee et al. |
| 2007/0085425 A1 * | 4/2007 | Hirashima ............. H02K 33/16 310/15 |
| 2007/0097832 A1 | 5/2007 | Koivisto et al. |
| 2007/0164868 A1 | 7/2007 | Deavours et al. |
| 2007/0281787 A1 | 12/2007 | Numata |
| 2008/0143560 A1 | 6/2008 | Shipman |
| 2008/0261695 A1 | 10/2008 | Coe |
| 2009/0011831 A1 | 1/2009 | Yamada |
| 2009/0017911 A1 * | 1/2009 | Miyazaki .............. A63F 13/211 463/37 |
| 2009/0054146 A1 | 2/2009 | Epstein |
| 2009/0073724 A1 | 3/2009 | Hayama et al. |
| 2009/0289774 A1 | 11/2009 | Choi |
| 2010/0069154 A1 | 3/2010 | Claussen |
| 2010/0081375 A1 | 4/2010 | Rosenblatt |
| 2010/0181176 A1 | 7/2010 | Igarashi et al. |
| 2010/0302169 A1 | 12/2010 | Pance et al. |
| 2011/0021271 A1 | 1/2011 | Ikeda |
| 2011/0048908 A1 | 3/2011 | Nishino |
| 2011/0127149 A1 | 6/2011 | Sun |
| 2011/0242361 A1 * | 10/2011 | Kuwahara ............ G06F 1/1643 348/231.4 |
| 2012/0108340 A1 | 5/2012 | Ashida et al. |
| 2012/0113013 A1 | 5/2012 | Lee et al. |
| 2012/0142418 A1 | 6/2012 | Muramatsu |
| 2012/0153748 A1 | 6/2012 | Wauke |
| 2012/0268360 A1 | 10/2012 | Mikhailov |
| 2012/0322555 A1 | 12/2012 | Burgess |
| 2013/0213146 A1 | 8/2013 | Amos |
| 2013/0281212 A1 | 10/2013 | Tsuchiya et al. |
| 2014/0018173 A1 | 1/2014 | Urhman |
| 2014/0094309 A1 | 4/2014 | Osawa et al. |
| 2014/0315640 A1 | 10/2014 | Goh |
| 2015/0193017 A1 | 7/2015 | Igarashi et al. |
| 2015/0371794 A1 | 12/2015 | Duenninger et al. |
| 2016/0059122 A1 | 3/2016 | Ehara et al. |
| 2016/0093452 A1 | 3/2016 | Zercoe et al. |
| 2016/0151706 A1 | 6/2016 | Antonio |
| 2016/0258758 A1 * | 9/2016 | Houston ................ G01C 21/20 |
| 2017/0087458 A1 * | 3/2017 | Nakagawa ............. A63F 13/54 |
| 2017/0110920 A1 | 4/2017 | Mao et al. |
| 2017/0151494 A1 | 6/2017 | Ironmonger et al. |

FOREIGN PATENT DOCUMENTS

| | | |
|---|---|---|
| EP | 1078660 | 2/2001 |
| EP | 1 852 162 A1 | 11/2007 |
| EP | 2 172 252 A2 | 4/2010 |
| EP | 2 208 518 | 7/2010 |
| EP | 1 681 658 | 2/2014 |
| EP | 2 698 185 | 2/2014 |
| EP | 2 700 435 | 2/2014 |
| EP | 2 843 498 A1 | 3/2015 |
| EP | 2 870 985 A2 | 5/2015 |
| EP | 2 888 017 | 7/2015 |
| EP | 2 908 223 A1 | 8/2015 |
| EP | 2 908 224 | 8/2015 |
| EP | 2 963 522 | 1/2016 |
| JP | H4-42029 U | 4/1992 |
| JP | 7-68052 | 3/1995 |
| JP | H11-004966 | 1/1999 |
| JP | H11-53994 | 2/1999 |
| JP | 11-90042 | 4/1999 |
| JP | 2001-143556 | 5/2001 |
| JP | 2002-102537 | 4/2002 |
| JP | 2003-086060 | 3/2003 |
| JP | 2004-057619 | 2/2004 |
| JP | 2007-299706 | 11/2007 |
| JP | 2009-037582 | 2/2009 |
| JP | 2009-118185 | 5/2009 |
| JP | 2010-055981 | 3/2010 |
| JP | 2011-024774 | 2/2011 |
| JP | 2012-249923 | 12/2012 |
| JP | 2013-236910 | 11/2013 |
| JP | 2014-044898 | 3/2014 |
| JP | 2014-211342 | 11/2014 |
| JP | 5869142 | 2/2016 |
| JP | 2016-096677 | 5/2016 |
| WO | WO 1999/036136 | 7/1999 |
| WO | 2012/125924 A2 | 9/2012 |
| WO | WO 2013/157052 | 10/2013 |
| WO | WO 2014/184120 | 11/2014 |
| WO | WO 2015/118082 | 8/2015 |
| WO | WO 2016/031028 | 3/2016 |

OTHER PUBLICATIONS

Office Action dated Oct. 4, 2018 in U.S. Appl. No. 15/422,785.
Office Action dated Nov. 29, 2018 in U.S. Appl. No. 15/647,315.
PharaohsVizier, White Knockoff Gamecube Controller Review, https://www.youtube.com/watch?v=h719aQqYYn4, p. 1.
GametistaTV, Wii U Pro Controller Xbox 360 Stick Mod, https://www.youtube.com/watch?v=jsMcz4XPNWM, p. 1.

(56) References Cited

OTHER PUBLICATIONS

Rai FX, How to take apart your Wii U Pro Controller, https://www.youtube.com/watch?v=Kgg45YISVQU, p. 1.
Extended Search Report dated Mar. 22, 2019 in counterpart European Patent Application No. 18208899.7.
Office Action dated Feb. 11, 2019 in U.S. Appl. No. 15/426,284.
Communication pursuant to Article 94(3) EPC dated Oct. 22, 2018 in counterpart European Patent Application No. 171536873.
Awgs: "I tried to disassemble and clean PS controller (DUALSHOCK emerald) for maintenance [awgs Foundry]," Awgs Foundry, Nov. 19, 2015 XP055515953, Retrieved from the Internet: url:https://web.archive.org/web/20160606100733/http://awgsfoundry.com/blog-entry-264.html [retrieved on Oct. 16, 2018].
English-language machine translation of JP2016-096677.
https://www.youtube.com/watch?v=NkSb_U6m05Q.
Office Action dated Oct. 5, 2018 in U.S. Appl. No. 15/422,854.
Notice of Allowance dated Jan. 22, 2019 in U.S. Appl. No. 15/422,785.
Office Action dated Jan. 10, 2019 in U.S. Appl. No. 15/422,854.
Office Action dated Jan. 10, 2019 in U.S. Appl. No. 15/422,915.
Office Action dated Mar. 21, 2019 in U.S. Appl. No. 15/422,854.
"Microsoft Xbox Elite Wireless Controller Review," 4gamer.net [online], Feb. 20, 2016, [searched on Feb. 20, 2020], https://www.4gamer.net/games/999/G999902/20160218096/.
Notice of Reasons for Refusal dated Apr. 3, 2020 in Japanese Patent Application No. 2016-116695 and English-language machine translation.
Notice of Reasons for Refusal dated Dec. 25, 2019 in Japanese Patent Application No. 2016-116700 and English-language translation.
Final Office Action dated Feb. 18, 2020 in U.S. Appl. No. 15/426,284.
Office Action dated Oct. 10, 2019 in U.S. Appl. No. 15/426,284 and PTO-892 form.
Notice of Reasons for Refusal dated May 8, 2020 in Japanese Patent Application No. 2016-116697 and English-language machine translation.
Method of photographing a screen shot with PS Vita, Kotonova <online>, May 12, 2015, Internet <URL: https://kotonova.com/2117> and English-language machine translation 11 pages.
[Feature] Nintendo "Wii U Basic Set" hardware report, PC Watch [online], Dec. 9, 2012, Internet <URL: https://pc.watch.impress.co.jp/docs/topic/feature/577915.html> and English-language machine translation, 19 pages.
Extended European Search Report dated Jul. 14, 2017 issued in corresponding European Application No. 16204388.9 (8 pgs.).
Final Office Action dated Mar. 5, 2018, issued in U.S. Appl. No. 15/370,189 to Suetake et al., filed Dec. 6, 2016 (50 pages).
Office Action dated Aug. 25, 2017 issued in U.S. Appl. No. 15/370,189 to Suetake, filed Dec. 6, 2016 (35 pages).
Office Action dated Aug. 28, 2017 issued in U.S. Appl. No. 15/647,315 to Suetake, filed Jul. 12, 2017 (35 pages).
Anonymous, "Nintendo Wii U Teardown", Nov. 19, 2012, XP055397223, Retrieved from the internet: URL:https://www.ifixit.com/Teardown/Nintendo+Wii+U+Teardown/11796 (17 pages).
European Search Report dated Aug. 18, 2017, issued in EP Application No. 17153683.2 (10 pages).
European Search Report dated Aug. 17, 2017, issued in EP Application No. 17153682.4 (7 pages).
European Search Report dated Aug. 24, 2017, issued in EP Application No. 17153692.3 (7 pages).
Extended European Search Report dated Sep. 27, 2017 issued in European Application No. 17153687.3 (10 pgs.).
Okamura et al., U.S. Appl. No. 15/422,854, filed Feb. 2, 2017 (78 pages).
Okamura, U.S. Appl. No. 15/422,785, filed Feb. 2, 2017 (76 pages).
Kaneko et al., U.S. Appl. No. 15/422,915, filed Feb. 2, 2017 (75 pages).
Tsuchiya, et al. U.S. Appl. No. 15/426,284, filed Feb. 7, 2017 (118 pages).
Final Office Action dated May 29, 2019 in U.S. Appl. No. 15/426,284 and PTO-892 form.
Final Office Action dated Aug. 7, 2019 in U.S. Appl. No. 15/647,315 and PTO-892 form.
European Search Report dated Feb. 27, 2018 issued in EP 16831611 (10 pages).
Suetake et al., U.S. Appl. No. 15/370,189, filed Dec. 6, 2016, 85 pages.
Notice of Reasons for Refusal dated Sep. 23, 2020 in Japanese Patent Application No. 2016-205167.
English-language machine translation of JP2014-211342.

* cited by examiner

F I G. 1
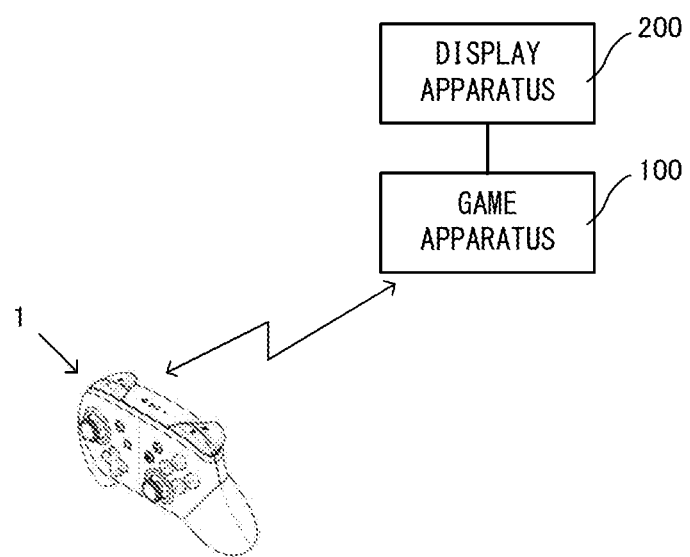

F I G. 6
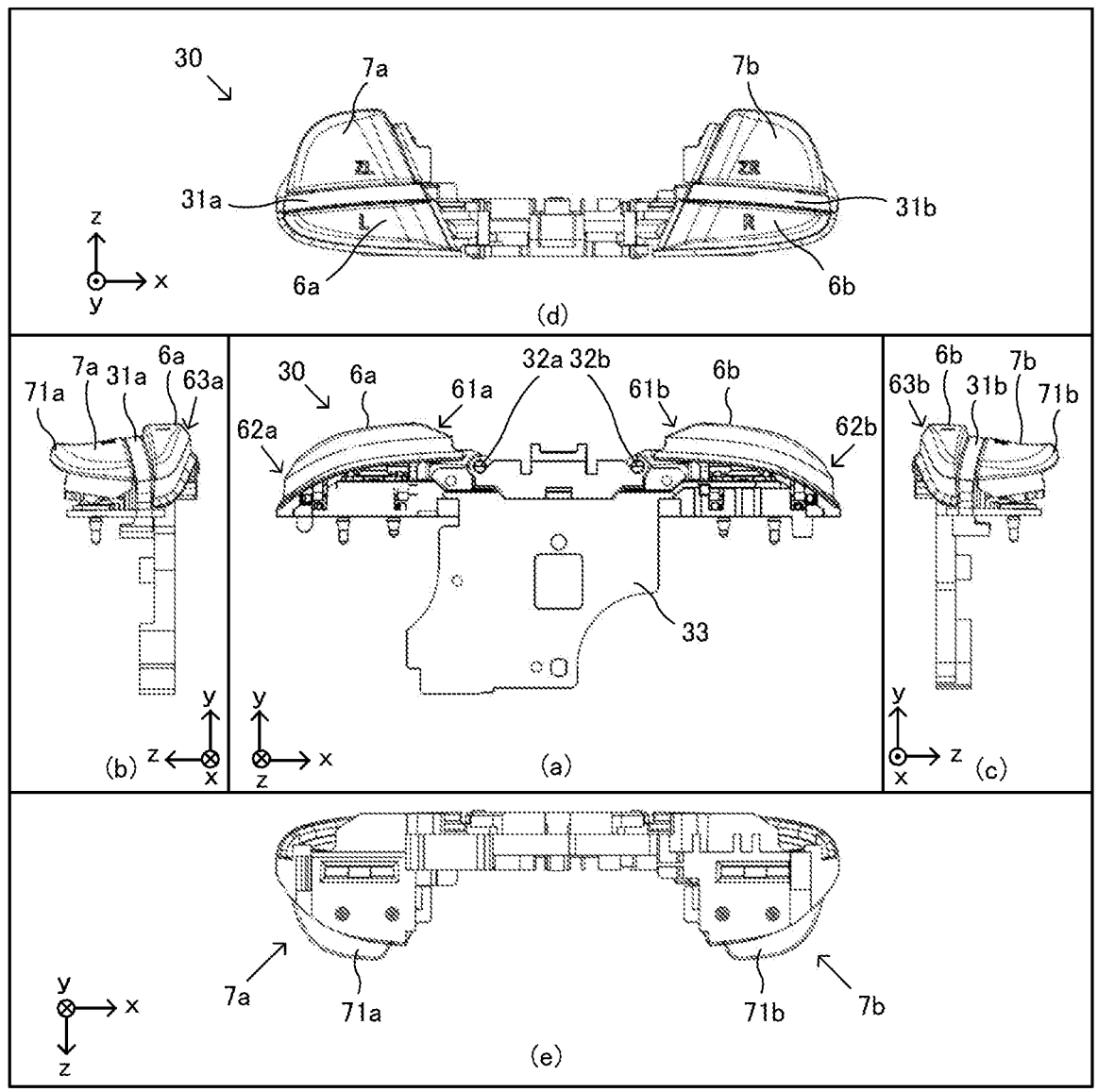

F I G. 7
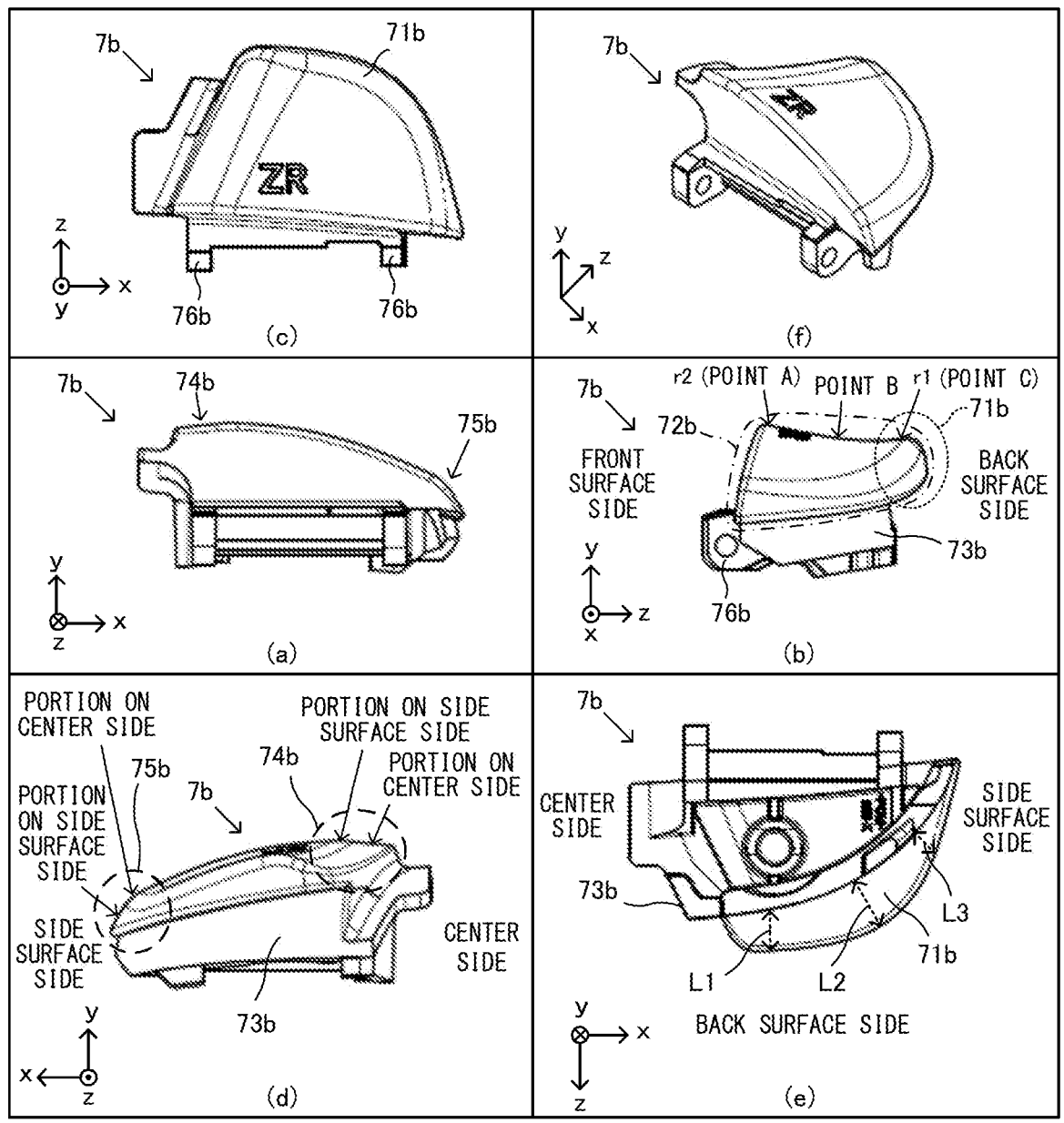

F I G. 9
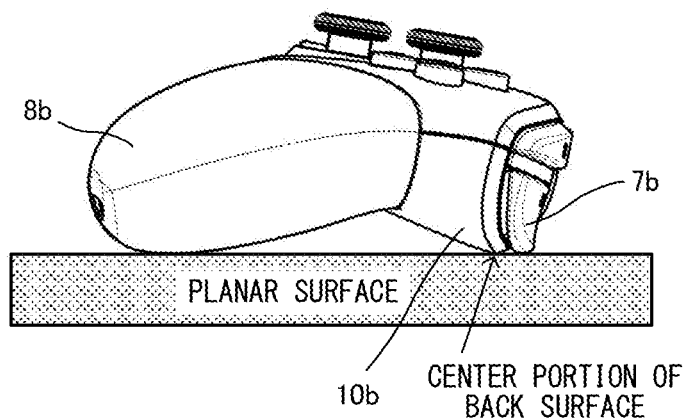
F I G. 10
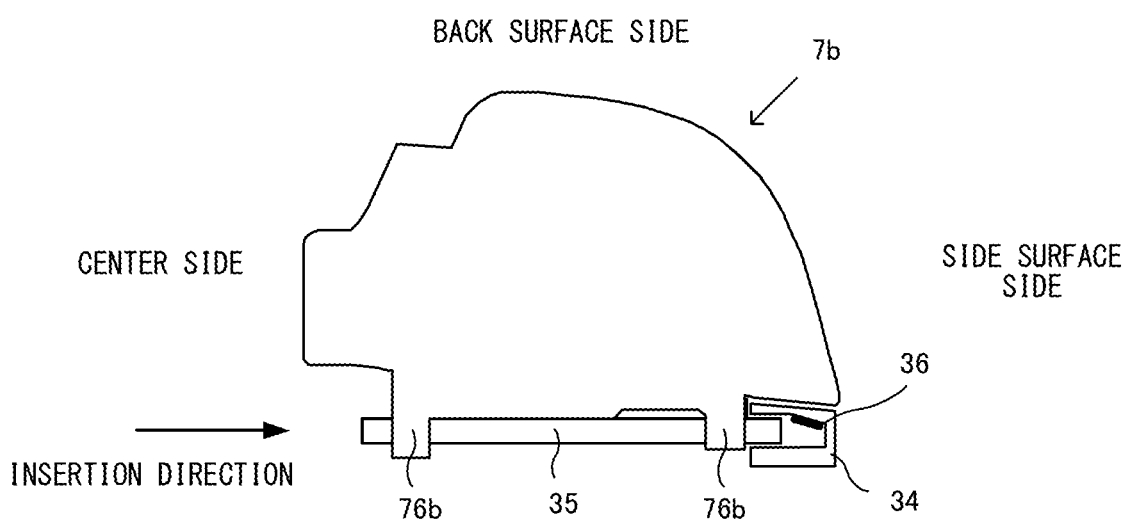

F I G. 1 4
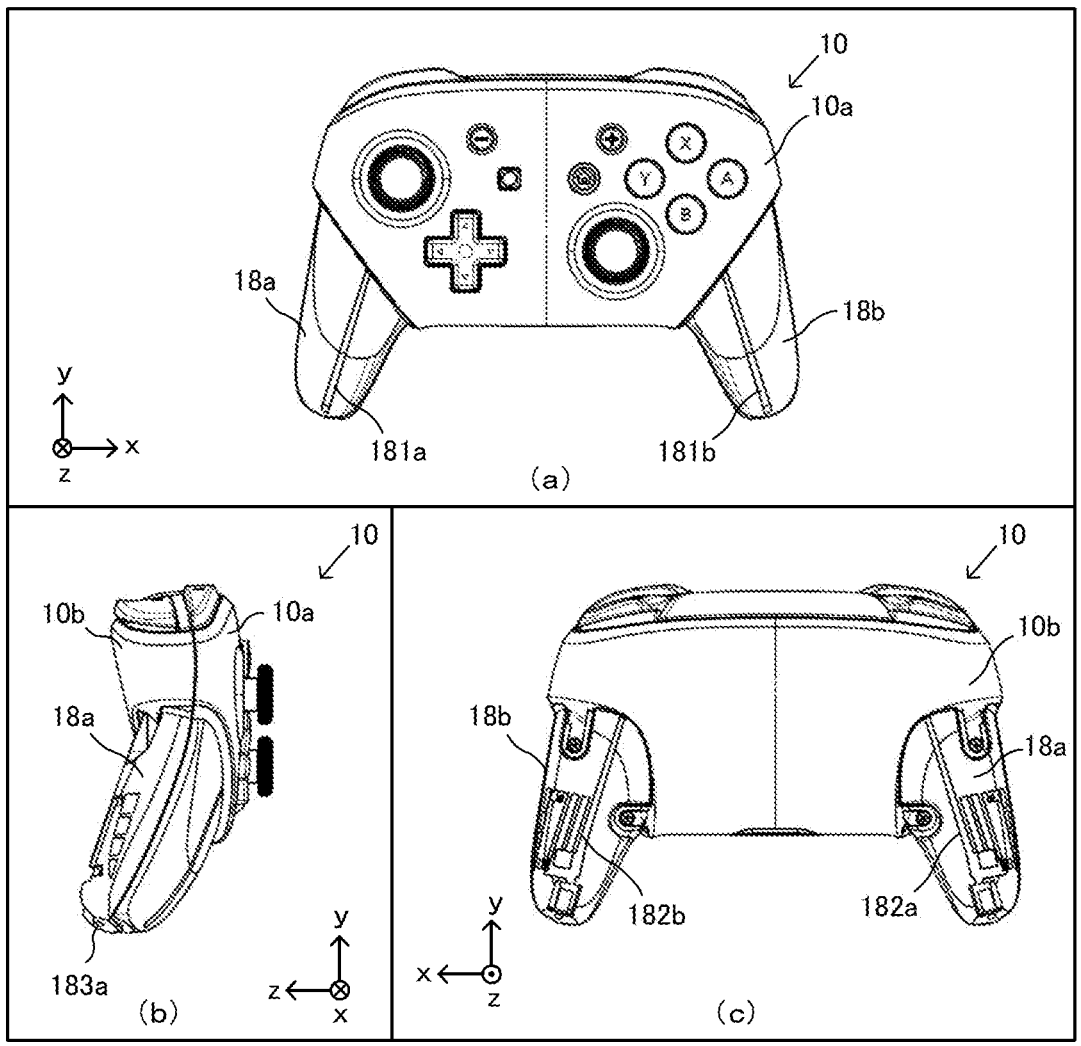
F I G. 1 5
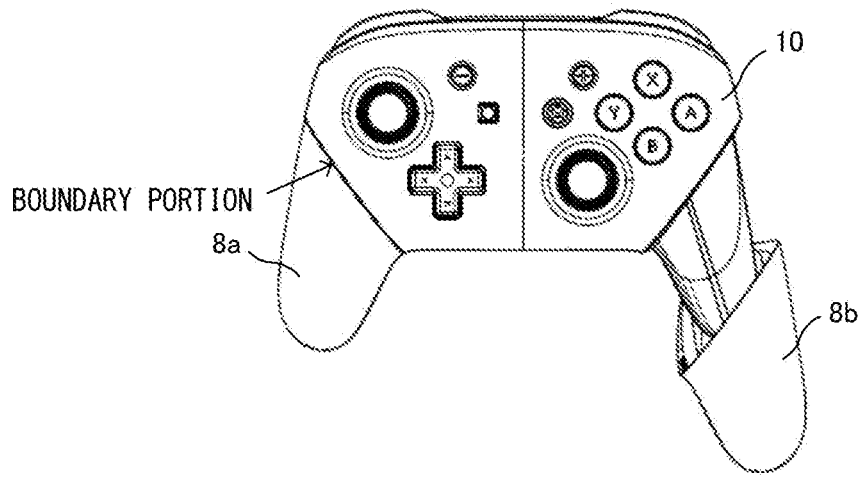

FIG. 38
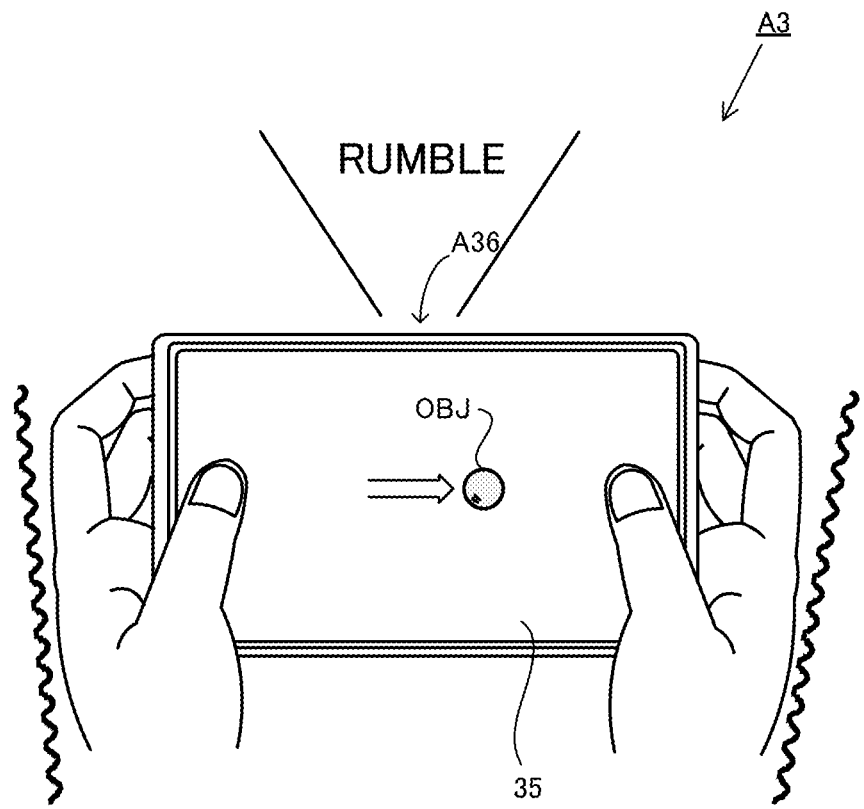
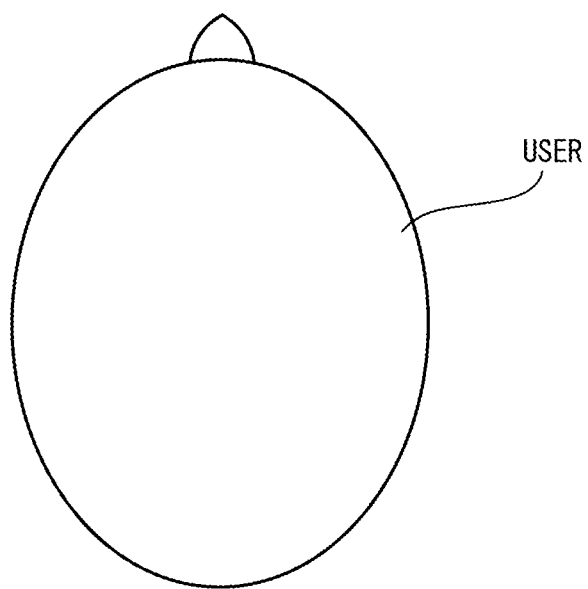

FIG. 41

3-bit AM/FM ENCODING TABLE

| CODE | AMPLITUDE UPDATE COMMAND | FREQUENCY UPDATE COMMAND |
|---|---|---|
| 0(000) | RESET TO INITIAL VALUE | RESET TO INITIAL VALUE |
| 1(001) | MULTIPLY BY $2^{0.5}$ (1.414) | MULTIPLY BY $2^{0.2}$ (1.149) |
| 2(010) | MULTIPLY BY $2^{0.5}$ (1.414) | MULTIPLY BY $2^{-0.2}$ (0.871) |
| 3(011) | MULTIPLY BY $2^{-0.3}$ (0.812) | MULTIPLY BY $2^{0.2}$ (1.149) |
| 4(100) | MULTIPLY BY $2^{-0.3}$ (0.812) | MULTIPLY BY $2^{-0.2}$ (0.871) |
| 5(101) | MULTIPLY BY $2^{k-2}$ | DO NOTHING |
| 6(110) | MULTIPLY BY $2^{k}$ | DO NOTHING |
| 7(111) | MULTIPLY BY $2^{k+2}$ | DO NOTHING |

FIG. 42 k-CALCULATION TABLE

| AMPLITUDE VALUE A IMMEDIATELY BEFORE UPDATE | VALUE OF k |
|---|---|
| MINIMUM AMPLITUDE $\leq$ A $<$ MINIMUM AMPLITUDE $\times 2^{0.5}$ | 2 |
| MINIMUM AMPLITUDE $\times 2^{0.5} \leq$ A $<$ MINIMUM AMPLITUDE $\times 2^{1.5}$ | 1 |
| MINIMUM AMPLITUDE $\times 2^{1.5} \leq$ A $\leq$ MAXIMUM AMPLITUDE $\times 2^{-1.5}$ | 0 |
| MAXIMUM AMPLITUDE $\times 2^{-1.5} <$ A $\leq$ MAXIMUM AMPLITUDE $\times 2^{-0.5}$ | -1 |
| MAXIMUM AMPLITUDE $\times 2^{-0.5} <$ A $\leq$ MAXIMUM AMPLITUDE | -2 |

GAME CONTROLLER

CROSS REFERENCE TO RELATED APPLICATION

The disclosures of Japanese Patent Application No. 2016-116699, filed on Jul. 10, 2016, and Japanese Patent Application No. 2016-205167, filed on Oct. 19, 2016, are incorporated herein by reference.

FIELD

The technology disclosed here relates to a game controller.

BACKGROUND AND SUMMARY

Conventionally, there is a game controller including a vibrator. For example, there is a game controller including a vibrator having a motor and an eccentric member.

However, in a conventional game controller, there is room for improvement in a vibration experience for a user.

Therefore, it is an object of an exemplary embodiment to improve a vibration experience for a user using a game controller.

To achieve the above object, the exemplary embodiment employs the following configurations.

An example of the exemplary embodiment is a game controller including: a housing; and a vibrator placed in the housing and capable of vibrating in a first direction and a second direction different from the first direction. The vibrator comes into contact with the housing at least on a first surface corresponding to the first direction.

Based on the above, a vibrator is brought into contact with a housing on a first surface of the vibrator. Thus, it is possible to make a vibration in a first direction likely to be transmitted to the housing, and improve a vibration experience for a user.

Further, in another configuration, the vibrator may come into contact with the housing on the first surface corresponding to the first direction and a second surface corresponding to the second direction.

Based on the above, a vibrator is brought into contact with a housing on a first surface and a second surface of the vibrator. Thus, it is possible to make vibrations in a first direction and a second direction of the vibrator likely to be transmitted to the housing, and improve a vibration experience for a user.

Further, in another configuration, the first surface may be a surface substantially orthogonal to the first direction, and the second surface may be a surface substantially orthogonal to the second direction.

According to the above configuration, a surface orthogonal to a vibration direction is brought into contact with the housing. Thus, it is possible to make a vibration of the vibrator likely to be transmitted to the housing.

Further, in another configuration, the first direction and the second direction may be substantially orthogonal to each other.

According to the above configuration, it is possible to vibrate a game controller using vibrators vibrating in directions orthogonal to each other. Thus, it is possible to cause the user to experience vibrations in different directions.

Further, in another configuration, when the game controller is viewed from front, the first direction may be a substantial left-right direction of the game controller.

According to the above configuration, it is possible to vibrate a game controller in a left-right direction. Thus, it is possible to cause the user to experience a vibration in the left-right direction.

Further, in another configuration, when the game controller is viewed from front, the second direction may be a substantial front-back direction of the game controller.

According to the above configuration, it is possible to vibrate a game controller in a front-back direction. Thus, it is possible to cause the user to experience a vibration in the front-back direction.

Further, in another configuration, the vibrator may have a substantially cuboid shape.

According to the above configuration, for example, it is possible to bring the vibrator into contact with a surface of the housing in a wider area. Thus, it is possible to make a vibration likely to be transmitted to the user.

Further, in another configuration, the vibrator may come into contact with a planar surface portion of an inner surface of the housing.

According to the above configuration, the vibrator is brought into contact with a planar surface portion of the housing. Thus, it is possible to make a contact area large. It is possible to make a vibration of the vibrator likely to be transmitted to the housing. It is possible to make a vibration likely to be transmitted to the user.

Further, in another configuration, the housing may include a first portion and a second portion thicker than the first portion. The vibrator may come into contact with the first portion of the housing.

According to the above configuration, the vibrator comes into contact with a thinner portion of the housing. Thus, it is possible to make a vibration of the vibrator likely to be transmitted to the housing. It is possible to make a vibration likely to be transmitted to the user.

Further, in another configuration, the vibrator may come into contact with a rib portion of an inner surface of the housing.

According to the above configuration, it is possible to bring the vibrator into contact with a rib portion (a protruding portion) within the housing.

Further, in another configuration, the vibrator may be accommodated in a holder, and the holder may be fixed to the housing.

According to the above configuration, the vibrator is accommodated in a holder, and the holder is fixed to the housing, whereby it is possible to fix the vibrator within the housing.

Further, in another configuration, the holder may be so shaped as to cover at least a part of the vibrator, and at least a surface of the holder corresponding to the first surface of the vibrator may be open.

According to the above configuration, it is possible to expose the first surface of the vibrator through an opening portion of the holder and cover the other surfaces of the vibrator with the holder. The first surface of the vibrator is exposed through the opening portion of the holder and come into contact with the housing. Thus, a vibration in the first direction is likely to be transmitted to the housing. It is possible to make a vibration likely to be transmitted to the user. On the other hand, the other surfaces of the vibrator are covered with the holder. Thus, the holder absorbs a vibration of the vibrator and can make the vibration less likely to be transmitted to the housing.

Further, in another configuration, the holder may be formed of an elastic material.

According to the above configuration, it is possible to cover the vibrator with a relatively soft material and make the holder likely to absorb a vibration of the vibrator.

Further, in another configuration, the game controller may include as the vibrator a first vibrator and a second vibrator. The first vibrator can vibrate in a first direction and a second direction different from the first direction. The second vibrator can vibrate in a first direction and a second direction different from the first direction. The housing may include a left grip portion configured to be held by a left hand of a user, and a right grip portion configured to be held by a right hand of the user. The first vibrator may be placed in the left grip portion, and the second vibrator may be placed in the right grip portion. The first vibrator may come into contact with the left grip portion on a first surface corresponding to the first direction and a second surface corresponding to the second direction. The second vibrator may come into contact with the right grip portion on a first surface corresponding to the first direction and a second surface corresponding to the second direction.

According to the above configuration, it is possible to place vibrators in left and right grip portions to be held by the user, and impart a vibration to each of the left and right hands of the user. Further, the first surface and the second surface of the vibrator come into contact with the left and right grip portions, respectively. Thus, vibrations are likely to be transmitted to the left and right grip portions. Further, it is possible to vibrate each of the left and right grip portions. Thus, it is possible to separate left and right vibrations and cause the user to experience various types of vibrations. It should be noted that "the first vibrator can vibrate in a first direction and a second direction different from the first direction" means that the first vibrator itself can vibrate in two directions. Similarly, "the second vibrator can vibrate in a first direction and a second direction different from the first direction" means that the second vibrator itself can vibrate in two directions. With respect to the game controller, the two vibration directions of the first vibrator may or may not coincide with the two vibration directions of the second vibrator, depending on the orientations of the first vibrator and the second vibrator.

Further, in another configuration, the housing may include a grip portion configured to be held by a hand of a user. The first surface of the vibrator may come into contact with a first portion which is included in the grip portion and with which a palm of the user comes into contact.

According to the above configuration, the first surface of the vibrator and a first portion of a grip portion are brought into contact with each other, whereby it is possible to make a vibration in the first direction of the vibrator likely to be transmitted to a palm of the user.

Further, in another configuration, the grip portion may include a second portion different from the first portion. The first portion may hit an approximate center portion of the palm of the user, and the second portion may hit a portion of a finger of the user. The second surface corresponding to the second direction of the vibrator may come into contact with the second portion of the grip portion. A resonance frequency of a vibration in the first direction may be different from a resonance frequency of a vibration in the second direction.

According to the above configuration, it is possible to impart vibrations at different frequencies to a center portion of the palm of the user and a finger portion of the user, and cause the user to feel different types of vibrations depending on the portion of the hand.

Further, in another configuration, when the game controller is viewed from front, the first direction may be a substantial left-right direction of the game controller, and the second direction may be a substantial front-back direction of the game controller. A resonance frequency of a vibration in the first direction may be different from a resonance frequency of a vibration in the second direction.

According to the above configuration, it is possible to vibrate the vibrator at different resonance frequencies in a left-right direction and a front-back direction of a game controller. Thus, it is possible to cause the user to feel different types of vibrations in the left-right direction and the front-back direction.

Further, in another configuration, the housing may include a main body housing and a grip portion configured to be held by a hand of a user. At least the first surface of the vibrator may come into direct contact with the grip portion.

According to the above configuration, it is possible to bring the vibrator into direct contact with a grip portion of the housing, and make a vibration of the vibrator likely to be transmitted to the grip portion.

Further, in another configuration, the vibrator may come into contact with the main body housing through a buffer member.

According to the above configuration, the vibrator comes into direct contact with the grip portion, while the vibrator comes into contact with a main body housing through a buffer member. Thus, it is possible to make a vibration of the vibrator likely to be transmitted to the grip portion, while it is possible to make a vibration less likely to be transmitted to the main body housing.

Further, in another configuration, a resonance frequency of a vibration in the first direction may be different from a resonance frequency of a vibration in the second direction.

According to the above configuration, it is possible to vibrate a game controller at different resonance frequencies, and cause the user to feel vibrations at different resonance frequencies.

Further, another example of the exemplary embodiment may be a game controller including a vibrator. The vibrator may have as resonance frequencies a first resonance frequency and a second resonance frequency different from the first resonance frequency.

According to the above configuration, it is possible to vibrate a game controller at different resonance frequencies, and cause a user to feel vibrations at different resonance frequencies. It should be noted that the vibrator may be a linear vibration actuator.

According to the exemplary embodiment, it is possible to improve a vibration experience for a user.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a diagram showing a non-limiting example of a game system including a game controller 1 according to the exemplary embodiment;

FIG. 6 is an external view of a non-limiting example of a button frame 30;

FIG. 7 is an external view of a non-limiting example of a key top of a ZR-button 7b;

FIG. 9 is a diagram showing, when the game controller 1 is placed on a planar surface, a non-limiting example of the game controller 1 as viewed from a direction parallel with the planar surface;

FIG. 10 is a diagram showing a non-limiting example of a structure for fixing the ZR-button 7b to the button frame 30;

FIG. 14 is an external view of a non-limiting example of the state where a grip portion 8 of the game controller 1 is removed;

FIG. 15 is a diagram showing a non-limiting example of the state of the middle of removing a grip portion 8b of the game controller 1 on the right side;

FIG. 38 is a diagram showing a non-limiting example where the main body of the information processing apparatus A3 vibrates and simultaneously, a sound is output in accordance with the display position of a virtual object OBJ displayed on a display screen of a display section A35;

FIG. 41 is a diagram showing a non-limiting example of an encoding table used to decode AM/FM code data;

FIG. 42 is a diagram showing a non-limiting example of a k-calculation table used to calculate a value k used in the encoding table;

DETAILED DESCRIPTION OF NON-LIMITING EXAMPLE EMBODIMENTS

With reference to the drawings, a game controller 1 according to an exemplary embodiment is described below. FIG. 1 is a diagram showing an example of a game system including the game controller 1 according to the exemplary embodiment.

As shown in FIG. 1, the game system includes the game controller 1, a game apparatus 100, and a display apparatus 200. The game apparatus 100 includes a CPU, a RAM, and a storage device (a non-volatile memory, an optical disc, a magnetic disk, or the like) (not shown). The CPU of the game apparatus 100 can execute game processing based on a predetermined game program, and outputs the result of the game processing to the display apparatus 200. As the display apparatus 200, for example, a liquid crystal display apparatus or an organic EL display apparatus may be used. It should be noted that the game apparatus 100 may be a stationary game apparatus, or may be a mobile game apparatus integrated with the display apparatus 200. Further, the game apparatus 100 is not limited to an apparatus designed for games, and may be an information processing apparatus capable of executing any program for a personal computer, a smartphone, or the like other than a game program.

The game apparatus 100 and the game controller 1 are connected together in a wired or wireless manner, and operation data corresponding to an operation performed on the game controller 1 is output to the game apparatus 100. For example, the game controller 1 and the game apparatus 100 may be connected together using Bluetooth (registered trademark).

Figure 2:
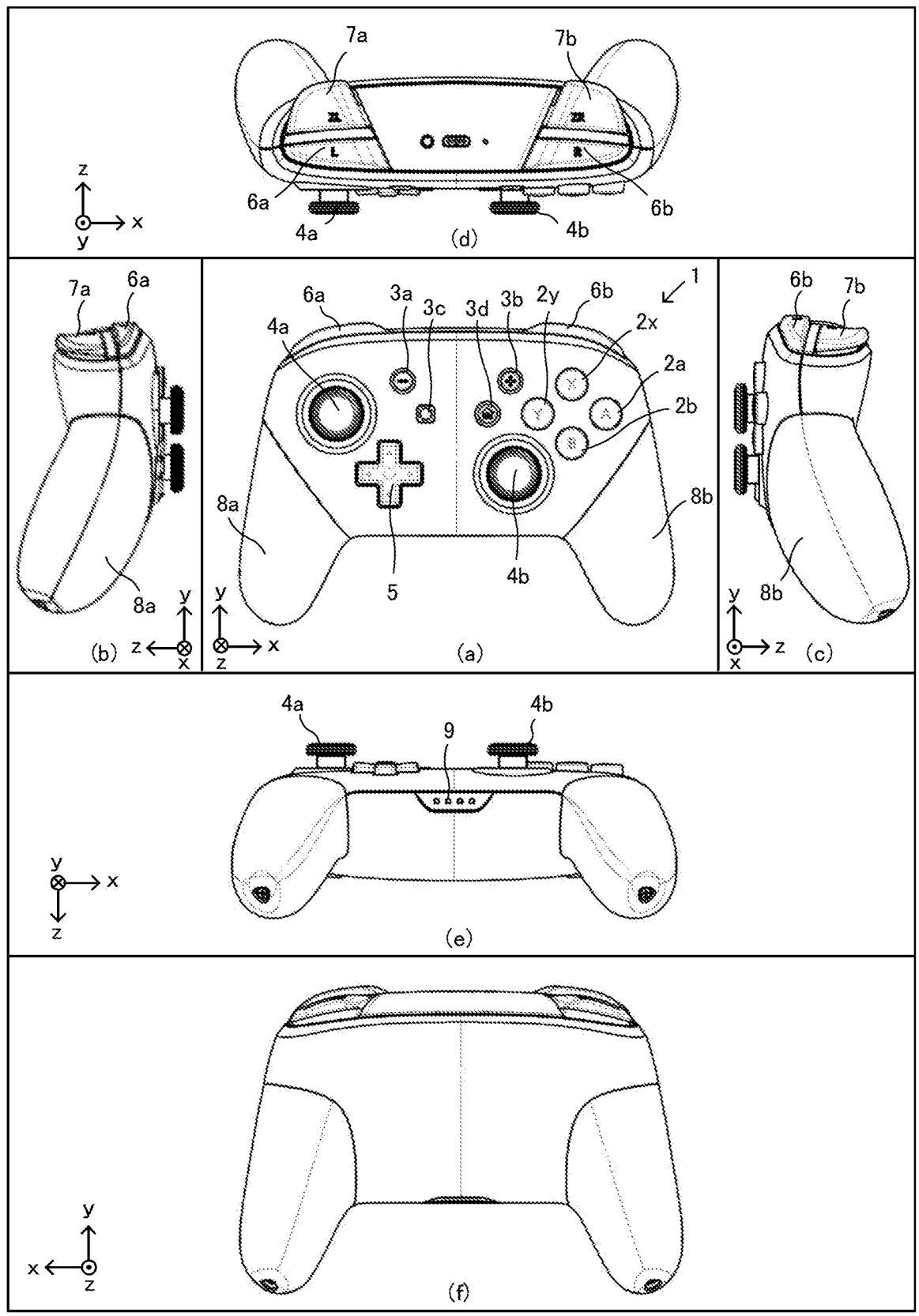
FIG. 2 is an external view of a non-limiting example of the game controller 1.

The details of the game controller 1 are described below. FIG. 2 is an external view of the game controller 1. (a) of FIG. 2 is a front view of the game controller 1. (b) of FIG. 2 is a left side view of the game controller 1. (c) of FIG. 2 is a right side view of the game controller 1. (d) of FIG. 2 is a top view of the game controller 1. (e) of FIG. 2 is a bottom view of the game controller 1. (f) of FIG. 2 is a rear view of the game controller 1. An xyz coordinate system in FIG. 2 is a coordinate system with respect to the game controller 1 and is defined such that a direction perpendicular to a front surface of the game controller 1 (e.g., a direction of pressing an A-button 2a) is a z-axis direction, a left-right direction of the game controller 1 (e.g., a direction connecting the A-button 2a and a Y-button 2y) is an x-axis direction, and an up-down direction of the game controller 1 (e.g., a direction connecting a B-button 2b and an X-button 2x) is a y-axis direction.

As shown in (a) of FIG. 2, in a right region of the front surface of the game controller 1, an A-button 2a, a B-button 2b, an X-button 2x, and a Y-button 2y are placed. Further, on the right side in a center region of the front surface of the game controller 1, a plus button 3b and a home button 3d are placed. Further, below the Y-button 2y and the home button 3d, a right analog stick 4b is placed.

Further, on the left side in the center region of the front surface of the game controller 1, a minus button 3a and a capture button 3c are placed. Further, in a left region of the front surface of the game controller 1, a left analog stick 4a is placed. Further, below the minus button 3a and the capture button 3c, a directional pad 5 is placed.

The A-button 2a, the B-button 2b, the X-button 2x, and the Y-button 2y are buttons capable of being pressed in a depth direction (a positive z-axis direction) in (a) of FIG. 2 and are buttons used for a game operation. Further, the minus button 3a, the plus button 3b, the capture button 3c, and the home button 3d are buttons capable of being pressed in the positive z-axis direction. The home button 3d may be used for, for example, an operation different from a game operation. If the home button 3d is pressed, a menu screen or a setting screen of the game apparatus 100 may be displayed. For example, a user can press the home button 3d at any timing while the game apparatus 100 is executing a game program. If the home button 3d is pressed while a game program is being executed, the game program that is being executed is interrupted, and a predetermined menu screen is displayed. Further, by the pressing of the home button 3d, an on state and an off state of a power supply of the game apparatus 100 or an on state and an off state of the sleep of the game apparatus 100 may be controlled. The capture button 3c is a button used to capture, for example, an image displayed on the display apparatus 200. The capture button 3c and the home button 3d are buttons that are not used for a normal game operation and therefore are used less frequently than other buttons for a game operation (the A-button 2a, the B-button 2b, the X-button 2x, the Y-button 2y, an L-button 6a, an R-button 6b, a ZL-button 7a, a ZR-button 7b, and the like) during a game. It should be noted that the details of the structure of the home button 3d will be described later.

Further, the left analog stick 4a and the right analog stick 4b are devices for indicating a direction and are each configured such that a stick portion operated by the finger of the user can be tilted in any directions (at any angles in up, down, left, right, and oblique directions). It should be noted that the left analog stick 4a and the right analog stick 4b may be able to be pressed in the positive z-axis direction. The directional pad 5 is a device for indicating the up, down, left, and right directions.

It should be noted that the positions of the left analog stick 4a, the directional pad 5, the right analog stick 4b, the A-button 2a, the B-button 2b, the X-button 2x, and the Y-button 2y are not limited to those shown in FIG. 2. For example, the left analog stick 4a may be provided at the position of the directional pad 5 shown in FIG. 2, and the directional pad 5 may be provided at the position of the left analog stick 4a shown in FIG. 2. Further, the right analog stick 4b may be provided at the positions of the A, B, X, and Y-buttons shown in FIG. 2, and the A, B, X, and Y-buttons may be provided at the position of the right analog stick 4b shown in FIG. 2.

Further, the directional pad 5 may not be configured as an integrated key top, and may be configured as independent four buttons. That is, a button corresponding to the up direction of the directional pad 5, a button corresponding to the right direction of the directional pad 5, a button corresponding to the down direction of the directional pad 5, and a button corresponding to the left direction of the directional pad 5 may be provided as independent buttons.

The key tops of the left analog stick 4a and the right analog stick 4b are the same in shape, size, and material. The left analog stick 4a and the right analog stick 4b, however, are different in the weight of tilting the analog stick (the magnitude of the force required to tilt the analog stick at the same angle). Specifically, within each of the left analog stick 4a and the right analog stick 4b, an elastic member (a spring)

is provided, and the key top is configured such that when the key top is tilted, the key top returns to the previous position by the restoring force of the elastic member. The characteristics (the spring constants) of these elastic members provided within the analog sticks are different, whereby the left analog stick 4a and the right analog stick 4b are different in weight.

Specifically, the left analog stick 4a is lighter than the right analog stick 4b. Although depending on the game program executed by the game apparatus 100, for example, the left analog stick 4a is used for the operation of moving a game character. On the other hand, the right analog stick 4b is used to move a virtual camera or move a target for the user to take aim. In a case where an object is moved using an analog stick, and if the analog stick is too light, the analog stick is greatly tilted by a small force. Thus, the user cannot move the object as intended. Thus, the right analog stick 4b is heavier than the left analog stick 4a, whereby, for example, in a case where the virtual camera is moved using the right analog stick 4b, it is possible to move the virtual camera more finely and improve the operability.

It should be noted that the left analog stick 4a and the right analog stick 4b may be the same in weight. Alternatively, the right analog stick 4b may be lighter than the left analog stick 4a. Yet alternatively, the left analog stick 4a and the right analog stick 4b may be different in shape, size, and material.

It should be noted that to vary the operational feelings of the left analog stick 4a and the right analog stick 4b, other than the weights of the left analog stick 4a and the right analog stick 4b, the left analog stick 4a and the right analog stick 4b may be configured as follows. For example, the left analog stick 4a and the right analog stick 4b may be different in the tilting range (the movable range) of the key top. Alternatively, the left analog stick 4a and the right analog stick 4b may be different in sensitivity (resolution). For example, the tilting range of the right analog stick 4b is greater than that of the left analog stick 4a, whereby it is possible to perform a more precise operation when moving the virtual camera or the target. Further, the sensitivity of the right analog stick 4b is lower than the left analog stick 4a, whereby it is possible to perform a precise operation. Thus, it is possible to prevent an unintended input. Conversely to the above, the tilting range of the left analog stick 4a may be greater than that of the right analog stick 4b. Alternatively, the sensitivity of the left analog stick 4a may be lower than that of the right analog stick 4b. Further, the left analog stick 4a and the right analog stick 4b may be different in any one, or two or more, of "weight", "tilting range", and "sensitivity".

Figure 3:
FIG. 3 is a diagram showing a non-limiting example of a top surface portion of each of a left analog stick 4a and a right analog stick 4b.

FIG. 3 is a diagram showing an example of a top surface portion of each of the left analog stick 4a and the right analog stick 4b. FIG. 3 is a side view of the top surface portion (a portion to be touched by the user) of the analog stick 4a or 4b. As shown in FIG. 3, a top surface of each of the left analog stick 4a and the right analog stick 4b has a recessed portion in its center. The recessed portion is circular when the analog stick is viewed from above. The recessed portion is so shaped as to slightly swell upward. The height of the highest portion of the recessed portion is approximately the same as the height of the highest portion of an outer periphery of the recessed portion. Further, on a side surface of the top surface portion of each of the left analog stick 4a and the right analog stick 4b, a plurality of ribs (recesses and protrusions) that go around the top surface are formed in a concentric circle. This makes the finger of the user likely to be caught on the side surface of the top surface portion of the analog stick. That is, when the analog stick is tilted in any direction, the finger of the user is less likely to slide. This improves the operability. Further, in a center portion of the top surface of the analog stick, a rib is not provided, thereby improving the feel when the finger of the user operates the analog stick.

Further, as shown in (e) of FIG. 2, four LEDs 9 are provided on a lower surface of the game controller 1. If a plurality of game controllers 1 are connected to the game apparatus 100, the LEDs 9 emit light so that each game controller 1 can be identified by the user. For example, if four game controllers 1 are connected to the game apparatus 100, then in a first game controller 1, only the first one from the left among the four LEDs 9 emits light. In a second game controller 1, only the second one from the left among the four LEDs 9 emits light. In a third game controller 1, only the third one from the left among the four LEDs 9 emits light. In a fourth game controller 1, only the fourth one from the left among the four LEDs 9 emits light. It should be noted that each of a plurality of game controllers may be distinguished by the number of beams of light emitted by the four LEDs 9.

As shown in FIG. 2, to the left and right of the center of the game controller 1, grip portions 8a and 8b, which protrude downward (in a negative y-axis direction), are provided, respectively. The grip portion 8a is held by the left hand of the user. The grip portion 8b is held by the right hand of the user. As shown in (b) and (c) of FIG. 2, the grip portions 8a and 8b are formed so as to be curved in the direction of a back surface of the game controller 1 (the positive z-axis direction).

Further, as shown in (d) of FIG. 2, on an upper surface of the game controller 1, an L-button 6a, a ZL-button 7a, an R-button 6b, and a ZR-button 7b are provided. Specifically, the L-button 6a is provided in a left end portion on the upper surface of the game controller 1. The ZL-button 7a is provided to the side of the L-button 6a closer to the back surface of the game controller 1 (further in the positive z-axis direction). Further, the R-button 6b is provided in a right end portion on the upper surface of the game controller 1. The ZR-button 7b is provided to the side of the R-button 6b closer to the back surface of the game controller 1 (further in the positive z-axis direction).

The L-button 6a, the R-button 6b, the ZL-button 7a, and the ZR-button 7b are buttons used for a game operation. The ZL-button 7a and the ZR-button 7b may be trigger buttons.

Further, each of the buttons (A, B, X, Y, L, R, ZL, and ZR-buttons) in the exemplary embodiment is a button capable of outputting a signal (an ON/OFF signal) indicating whether or not the button is pressed. Alternatively, in another exemplary embodiment, each of the ZL-button 7a and the ZR-button 7b may be a button capable of outputting an analog value corresponding to the amount of pressing of the button. For example, if the user pushes down the ZL-button 7a or the ZR-button 7b to a first position, an analog value corresponding to the first position may be output. If the user pushes down the button to a second position below the first position, an analog value corresponding to the second position may be output.

Figure 4:
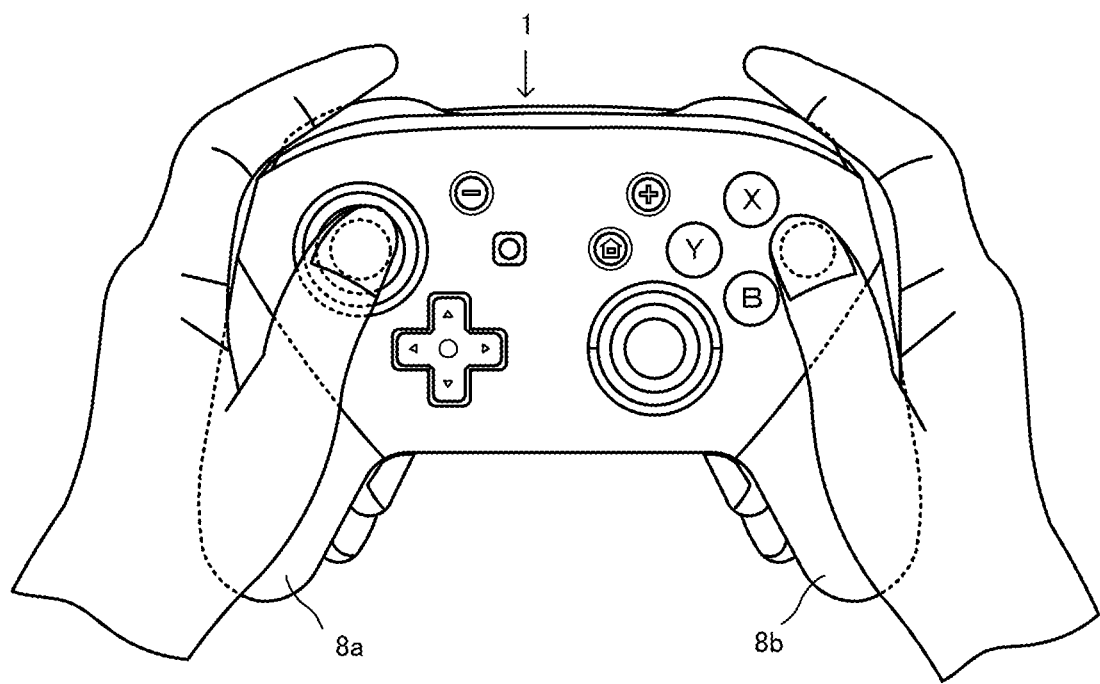
FIG. 4 is a diagram showing a non-limiting example of the state where a user holds the game controller 1 with both hands.

FIG. 4 is a diagram showing the state where the user holds the game controller 1 with both hands. As shown in FIG. 4, if the user holds the grip portion 8a with their left hand and holds the grip portion 8b with their right hand, the user can operate the left analog stick 4a and the directional pad 5 with the thumb of the left hand. Further, the user can operate the minus button 3a and the capture button 3c with the thumb of the left hand. Further, the user can operate the L-button 6a and the ZL-button 7a with the index finger (or the middle finger) of the left hand. Further, the user can operate the A-button 2a, the B-button 2b, the X-button 2x, the Y-button 2y, the right analog stick 4b, the plus button 3b, and the home button 3d with the thumb of the right hand. Further, the user can operate the R-button 6b and the ZR-button 7b with the index finger (or the middle finger) of the right hand. It should be noted that FIG. 4 shows the typical manner of holding the game controller 1. Depending on the user, the game controller 1 may be held in a different manner of holding the game controller 1.

[Details of L/R Button and ZL/ZR Button]

Next, a description is given of the details of the L-button 6a, the ZL-button 7a, the R-button 6b, and the ZR-button 7b, which are provided on the upper surface of the game controller 1.

Figure 5:
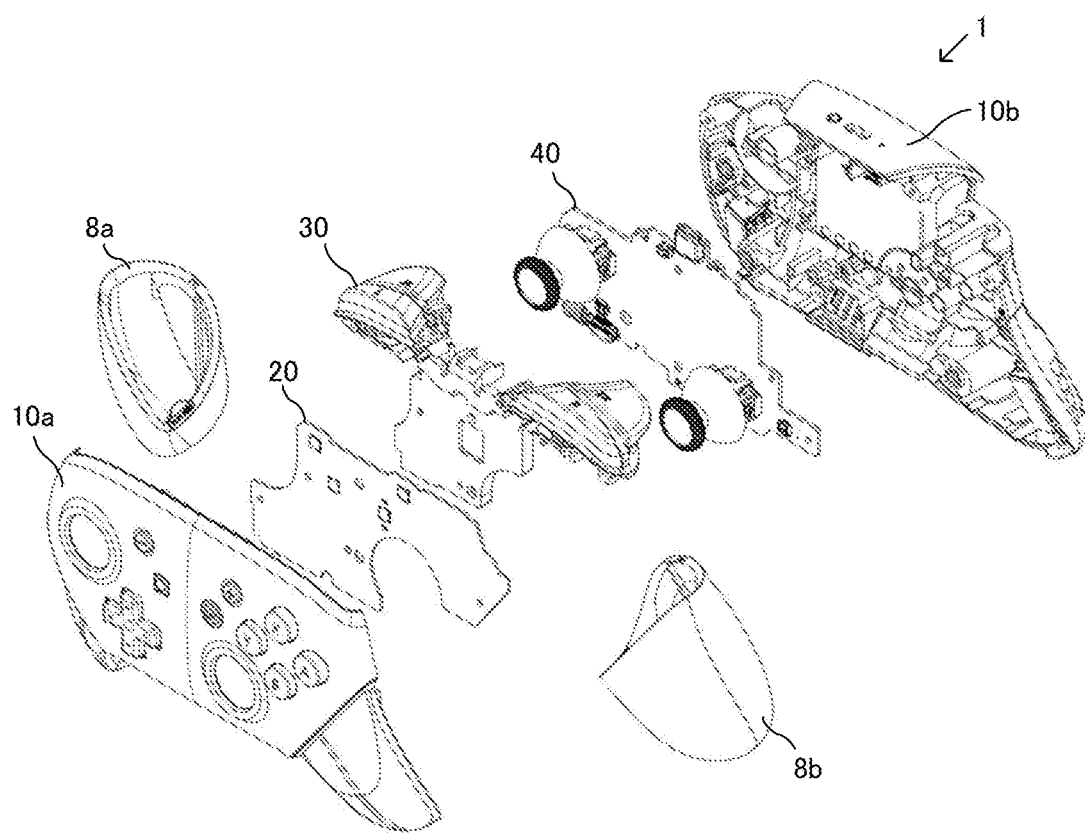
FIG. 5 is an exploded perspective view of a non-limiting example of the game controller 1.

FIG. 5 is an exploded perspective view of the game controller 1. As shown in FIG. 5, a housing 10 of the game controller 1 is formed by connecting a first housing 10a on the front surface side of the game controller 1 and a second housing 10b on the back surface side of the game controller 1. Within the housing 10, a button frame 30 is accommodated. Further, within the housing 10, a first substrate 20 and a second substrate 40 are accommodated.

FIG. 6 is an external view of the button frame 30. (a) of FIG. 6 is a front view of the button frame 30 (a diagram showing the button frame 30 as viewed from the front of the game controller 1). (b) of FIG. 6 is a left side view of the button frame 30. (c) of FIG. 6 is a right side view of the button frame 30. (d) of FIG. 6 is a top view of the button frame 30. (e) of FIG. 6 is a bottom view of the button frame 30. It should be noted that an x-axis, a y-axis, and a z-axis in FIG. 6 correspond to the x-axis, the y-axis, and the z-axis, respectively, in FIG. 2.

FIG. 7 is an external view of the key top of the ZR-button 7b. (a) of FIG. 7 is a front view of the key top of the ZR-button 7b (a diagram showing the key top of the ZR-button 7b as viewed from the front of the game controller 1). (b) of FIG. 7 is a right side view of the key top of the ZR-button 7b. (c) of FIG. 7 is a top view of the key top of the ZR-button 7b. (d) of FIG. 7 is a rear view of the key top of the ZR-button 7b. (e) of FIG. 7 is a bottom view of the key top of the ZR-button 7b. (f) of FIG. 7 is a perspective view of the key top of the ZR-button 7b. It should be noted that an x-axis, a y-axis, and a z-axis in FIG. 7 correspond to the x-axis, the y-axis, and the z-axis, respectively, in FIG. 2.

It should be noted that the ZL-button 7a and the ZR-button 7b are symmetrical, and the ZL-button 7a and the ZR-button 7b have the same shape. Further, the L-button 6a and the R-button 6b are symmetrical, and the L-button 6a and the R-button 6b have the same shape. Hereinafter, although only either one of the ZL-button 7a and the ZR-button 7b will be described, the same applies to the other button. Further, although only either one of the L-button 6a and the R-button 6b will be described, the same applies to the other button. Further, hereinafter, the L-button 6a and the R-button 6b will occasionally be collectively referred to as an "L/R button 6", and the ZL-button 7a and the ZR-button 7b will occasionally be collectively referred to as a "ZL/ZR button 7".

As shown in FIG. 6, the L-button 6a, the R-button 6b, the ZL-button 7a, and the ZR-button 7b are formed integrally with a frame portion 33, which is accommodated within the housing 10. Further, as will be described later, a button detection section for each button is also formed integrally. If the button frame 30 is accommodated in the housing 10, the L-button 6a, the R-button 6b, the ZL-button 7a, and the ZR-button 7b are exposed through an upper surface of the housing 10.

(Description of L/R Button)

As shown in (d) of FIG. 6, the R-button 6b is so shaped as to be horizontally long (is so shaped as to be long in the x-axis direction). That is, the R-button 6b is formed such that the length of the R-button 6b in the direction of the side surface of the game controller 1 is longer than the length of the R-button 6b in the direction of the back surface of the game controller 1. Further, the further in the direction of the side surface (the further in a positive x-axis direction) from the center of the game controller 1, the smaller the width of the R-button 6b.

Further, as shown in (a) of FIG. 6, the further in the direction of the side surface from the center in the left-right direction of the game controller 1, the further downward the R-button 6b slopes overall.

Figure 8A:
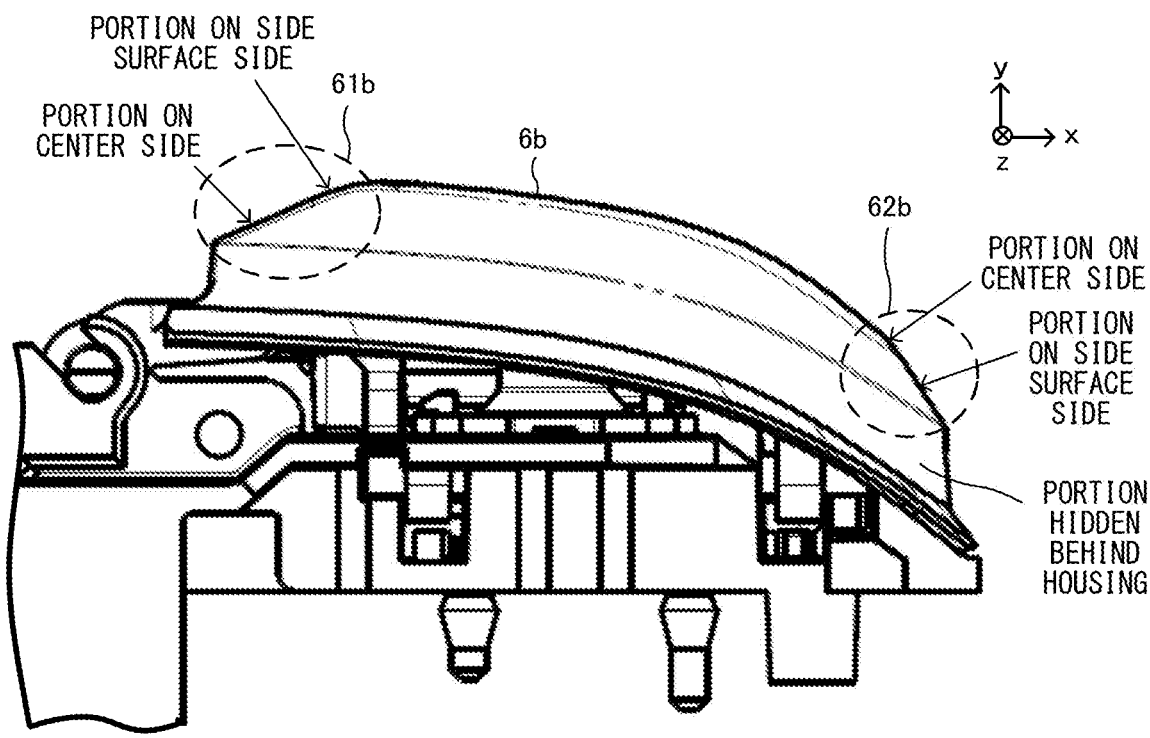
FIG. 8A is a partially enlarged view of a non-limiting example of an R-button 6b as viewed from its front.
Figure 8B:
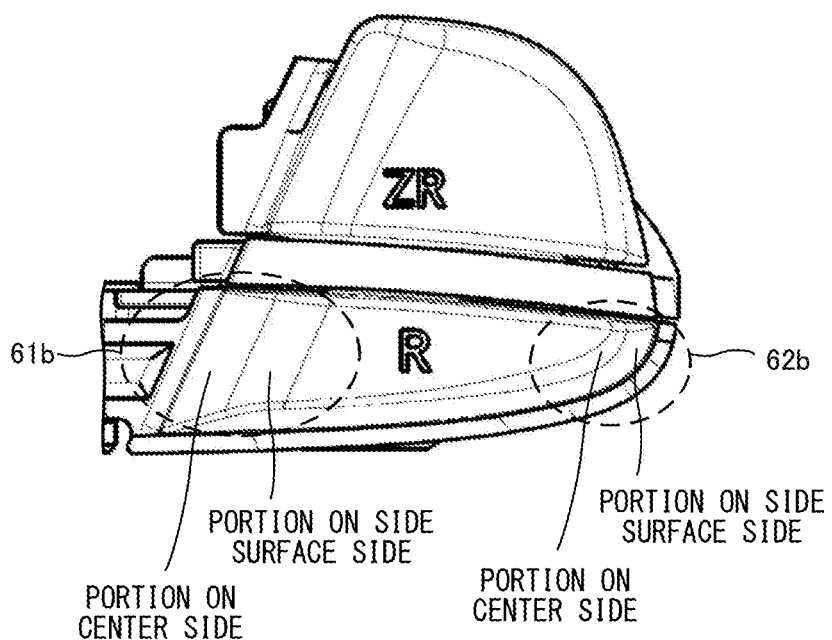
FIG. 8B is a partially enlarged view of a non-limiting example of the R-button 6b as viewed from its upper surface.
Figure 8C:
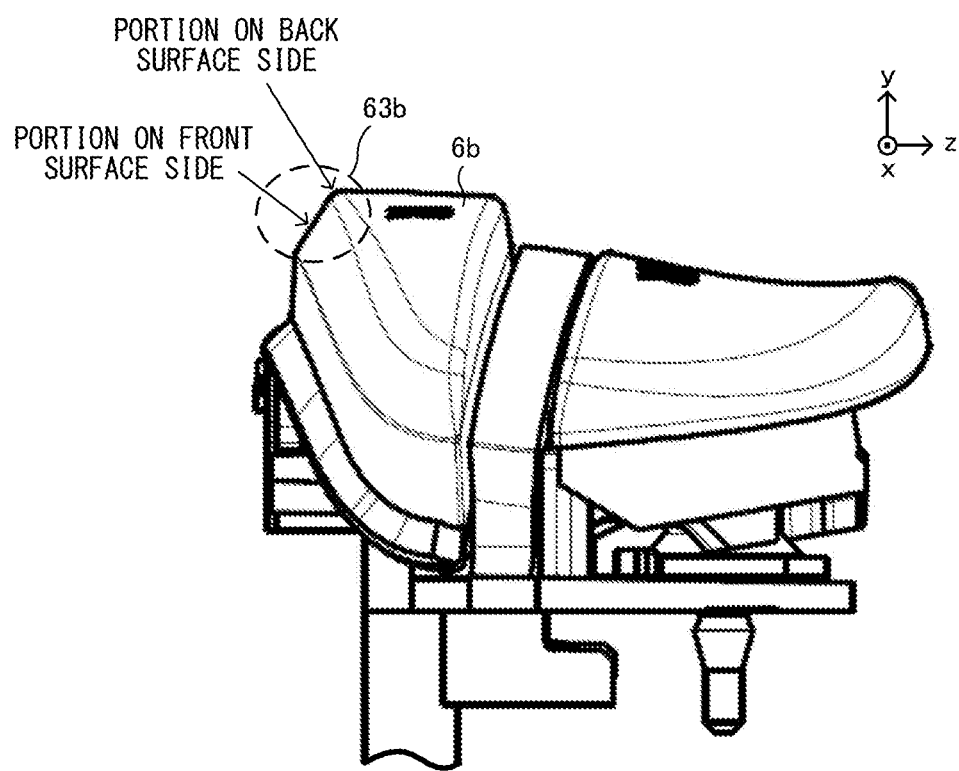
FIG. 8C is a partially enlarged view of a non-limiting example of the R-button 6b as viewed from its right side surface.

Specifically, as shown in (a) of FIG. 6, in an end portion of the R-button 6b on the center side in the left-right direction of the game controller 1 (further in a negative x-axis direction), a sloping portion 61b, which slopes downward, is provided. FIG. 8A is a partially enlarged view of the R-button 6b as viewed from its front. FIG. 8B is a partially enlarged view of the R-button 6b as viewed from its upper surface. FIG. 8C is a partially enlarged view of the R-button 6b as viewed from its right side surface.

More specifically, as shown in FIGS. 8A and 8B, the sloping portion 61 in the end portion of the R-button 6b on the center side of the game controller 1 slopes in two steps. A portion of the R-button 6b close to the end portion on the center side of the game controller 1 has a greater sloping angle. That is, the sloping portion 61b of the R-button 6b includes a portion on the side surface side and a portion on the center side. With respect to the horizontal direction (the x-axis direction in the xyz coordinate system), the sloping angle of the portion on the center side is greater than the sloping angle of the portion on the side surface side.

Further, as shown in (a) of FIG. 6, in an end portion of the R-button 6b on the side surface side in the left-right direction of the game controller 1 (further in the positive x-axis direction), a sloping portion 62b, which slopes downward, is provided.

Specifically, as shown in FIGS. 8A and 8B, the end portion of the R-button 6b on the side surface side of the game controller 1 slopes in two steps. A portion of the R-button 6b close to the end portion on the side surface side of the game controller 1 has a greater sloping angle. That is, the sloping portion 62b of the R-button 6b includes a portion on the side surface side and a portion on the center side. With respect to the horizontal direction (the x-axis direction in the xyz coordinate system), the sloping angle of the portion on the side surface side is greater than the sloping angle of the portion on the center side.

Further, as shown in (c) of FIG. 6, in an end portion of the R-button 6b on the front surface side of the game controller 1 (further in a negative z-axis direction), a sloping portion 63b, which slopes downward, is provided.

Specifically, as shown in FIG. 8C, the sloping portion 63b in the end portion of the R-button 6b on the front surface side of the game controller 1 slopes in two steps. A portion of the R-button 6b close to the end portion on the front surface side of the game controller 1 has a greater sloping angle. That is, the sloping portion 63b of the R-button 6b includes a portion on the front surface side and a portion on the back surface side. With respect to the horizontal direction (the z-axis direction in the xyz coordinate system), the sloping angle of the portion on the front surface side is greater than the sloping angle of the portion on the back surface side.

As described above, the sloping portion 61b is provided in the R-button 6b on the center side of the game controller 1, whereby it is easy for even a person having a long finger to operate the R-button 6b. That is, if the finger of the user is long, and when the user operates the R-button 6b, the tip of the finger reaches the end portion of the R-button 6b on the center side of the game controller 1. The sloping portion 61b, however, is provided in the end portion on the center side, whereby the sloping portion 61b fits the finger, and it is easy for the user to operate the R-button 6b.

Further, the sloping portion 62b is provided in the end portion of the R-button 6b on the side surface side of the game controller 1, whereby it is easy for both a person having a long finger and a person having a short finger to operate the R-button 6b. That is, a user having a short finger can operate the R-button 6b by placing the tip of the finger on the end portion of the R-button 6b on the side surface side of the game controller 1. On the other hand, when a user having a long finger operates the R-button 6b, the extremity of the index finger hits the end portion of the R-button 6b on the center side, and a portion near the base or the second joint of the finger hits the end portion of the R-button 6b on the side surface side. The sloping portion 62b is provided in the end portion on the side surface side, whereby, when the end portion of the R-button 6b on the center side is pressed by the extremity of the index finger, it is possible to make small a force (a force by reaction) applied to the portion near the base or the second joint of the finger, and make it easy for the user to press the R-button 6b.

Further, the sloping portion 63b is provided in the end portion of the R-button 6b on the front surface side of the game controller 1, whereby it is easy for the user to operate the R-button 6b. For example, there is a user who holds the game controller 1 by covering the front surface of the game controller 1 with their hand, without holding the grip portion 8 with both hands as in FIG. 4. The sloping portion 63b is provided in the R-button 6b, whereby it is also easy for such a user to operate the R-button 6b and the ZR-button 7b. Specifically, such a user does not access the L/R button 6 and the ZL/ZR button 7 with their finger (the index finger and/or the middle finger) from the side surface side of the housing 10, and accesses the L/R button 6 and the ZL/ZR button 7 with their finger from the front surface side of the housing 10. Here, if the sloping portion 63 (a, b) is not provided in the end portion of the L/R button 6 on the front surface side, the finger hits the corner of the L/R button 6 on the front surface side. This makes it difficult for the user to operate the L/R button 6. Further, when such a user operates the ZL/ZR button 7 on the back surface side, the finger may hit the corner of the L/R button 6 on the front surface side and erroneously press the L/R button 6. In the exemplary embodiment, the sloping portion 63 is provided in the L/R button 6 on the front surface side. Thus, even if the user holds the game controller 1 by covering the front surface of the game controller 1 with their hand, it is easy to operate the L/R button 6 and the ZL/ZR button 7. Thus, it is possible to prevent the user from erroneously pressing the L/R button 6 when operating the ZL/ZR button 7.

Further, as shown in (a) of FIG. 6, the L-button 6a and the R-button 6b are configured to be pivotable using as pivot points a shaft 32a and a shaft 32b, respectively, which are placed on the center side of the button frame 30. The shaft 32a and the shaft 32b are placed so as to extend in the z-axis direction (the direction of the back surface of the game controller 1). The L-button 6a extends from the shaft 32a in the direction of the side surface of the game controller 1 (the negative x-axis direction). The R-button 6b extends from the shaft 32b in the direction of the side surface of the game controller 1 (the positive x-axis direction). The L-button 6a and the R-button 6b are configured to pivot using as pivot points the shaft 32a and the shaft 32b, respectively, thereby being pressed downward in the game controller 1 (in the negative y-axis direction).

As described above, the L-button 6a and the R-button 6b pivot using as pivot points the shaft 32a and the shaft 32b, respectively, which are placed on the center side of the game controller 1, slope overall in the direction of the side surfaces, and include the above sloping portions 61 (a, b) and 62 (a, b). Thus, it is easy for the user to operate the L-button 6a and the R-button 6b. For example, in the case of a user having a long finger, the extremity of the index finger is placed on the sloping portion 61b on the center side, and the index finger comes into contact with the R-button 6b, from the extremity to the base of the finger along a curve downward to the right of the R-button 6b. In this case, it is easy for the user to press the R-button 6b with the entirety of the index finger. Particularly, if the sloping portion 61b (see FIG. 8A) is pressed in a direction perpendicular to the sloping surface, the force of the pressing causes the R-button 6b to pivot using the shaft 32b as a pivot point. Thus, it is also easy for a user having a long finger to operate the R-button 6b. Further, in the case of a user having a short finger, for example, the extremity of the index finger is placed on the sloping portion 62b on the side surface side. In this case, it is easy for the user to press the R-button 6b with the extremity of the index finger. Particularly, if the sloping portion 62b (see FIG. 8A) is pressed in the direction perpendicular to the sloping surface, the force of the pressing causes the R-button 6b to pivot using the shaft 32b as a pivot point. Thus, it is also easy for a user having a short finger to operate the R-button 6b.

(Description of ZR/ZL-Button)

Next, the ZR/ZL-button is described. As shown in FIG. 6, the ZL-button 7a is placed to the side of the L-button 6a closer to the back surface of the game controller 1. Further, the ZR-button 7b is placed to the side of the R-button 6b closer to the back surface of the game controller 1. The ZL-button 7a and the ZR-button 7b are so shaped as to be horizontally long (are so shaped as to be long in the x-axis direction). That is, the ZL-button 7a and the ZR-button 7b are each formed such that the length of the button in the direction of the side surface of the game controller 1 is longer than the length of the button in the direction of the back surface of the game controller 1.

As shown in FIG. 6, the ZR-button 7b includes a protruding portion 71b, which protrudes in the direction of the back surface of the game controller 1 (the positive z-axis direction) and the direction of the side surface of the game controller 1 (the positive x-axis direction: the right direction). Similarly, the ZL-button 7a includes a protruding portion 71a, which protrudes in the direction of the back surface of the game controller 1 (the positive z-axis direction) and the direction of the side surface of the game controller 1 (the negative x-axis direction: the left direction).

Specifically, as shown in (b) of FIG. 7, the ZR-button 7b includes an upper portion 72b, which includes the protruding portion 71b, and a lower portion 73b, which is below the upper portion 72b. The upper portion 72b of the ZR-button 7b is a portion with which the user comes into direct contact when pressing the button. If the ZR-button 7b is integrated with the button frame 30, and the button frame 30 is accommodated in the housing 10, the upper portion 72b of the ZR-button 7*b* is exposed to the outside, whereas the lower portion 73*b* of the ZR-button 7*b* is almost hidden behind the housing 10 (see FIG. 2). As shown in (e) of FIG. 7, the protruding portion 71*b* protrudes further in the positive z-axis direction (the direction of the back surface of the game controller 1) and the positive x-axis direction (the direction of the side surface of the game controller 1) than the outer edge of the upper end of the lower portion 73*b*.

More specifically, the protruding portion 71*b* extends continuously from the back surface side to the side surface side of the game controller 1. A portion of the protruding portion 71*b* extending from the back surface side to the side surface side of the game controller 1 (a portion in an oblique direction between the z-axis and the x-axis shown in (e) of FIG. 7) has a circular arc shape (a round shape). Further, as shown in (e) of FIG. 7, a protruding length L2 in the positive z-axis direction and the positive x-axis direction is longer than a protruding length L1 in the positive z-axis direction. That is, the protruding portion 71*b* is configured such that the length L2 in the oblique direction between the z-axis and the x-axis is longer than the length L1 in the direction along the z-axis. Further, the closer to the side surface, the smaller the degree of protrusion of the protruding portion 71*b*. Specifically, in (e) of FIG. 7, a length L3 is shorter than the length L2. In an end portion of a side surface of the ZR-button 7*b*, the protruding portion 71*b* slightly protrudes further than the lower portion 73*b* in the positive x-axis direction (the right direction).

As described above, the ZL-button 7*a* and the ZR-button 7*b* include the protruding portions 71 (a and b), which protrude in both the direction of the back surface and the direction of the side surface. This makes it possible to increase the areas of the upper surfaces of the key tops of the ZL-button 7*a* and the ZR-button 7*b*. Thus, it is easy for the user to operate the ZL-button 7*a* and the ZR-button 7*b*. If the entirety of the ZL-button 7*a* and the ZR-button 7*b* (the entirety of the buttons including the upper portion 72*b* and the lower portion 73*b*) is made large, the areas of the upper surfaces of the key tops of the ZL-button 7*a* and the ZR-button 7*b* can also be increased. However, the entirety of the buttons becomes large, and therefore, the housing 10 also becomes large. However, the protruding portions 71 are provided in the ZL-button 7*a* and the ZR-button 7*b* as in the exemplary embodiment, whereby it is possible to increase the areas of the upper surfaces of the key tops of the buttons without making the entirety of buttons large. Thus, it is possible to make the key tops of the ZL-button 7*a* and the ZR-button 7*b* large without making the entirety of the housing large, and therefore make it easy for the user to operate the ZL-button 7*a* and the ZR-button 7*b*.

In the exemplary embodiment, the ZL-button 7*a* and the ZR-button 7*b* protrude not only in the direction of the back surface but also in the direction of the side surface. Thus, it is easy for even a user having a short finger to operate the ZL-button 7*a* and the ZR-button 7*b*. That is, the ZL/ZR button 7 protrudes not only in the direction of the back surface but also in the direction of the side surface. Thus, the user can operate the ZL/ZR button 7 by placing their finger on, for example, a portion protruding in the direction of the side surface of the ZL/ZR button 7. For example, the ZR-button 7*b* protrudes in the direction of the side surface (the right direction). Thus, the user accesses the ZR-button 7*b* with the finger of their right hand from the right side surface of the game controller 1 and places the finger in the portion protruding in the direction of the side surface of the ZR-button 7*b*, and thereby can press the ZR-button 7*b*. In the ZR-button 7*b*, the protruding portion 71*b*, which protrudes in the direction of the right side surface, is provided. Thus, it is easy for even a user having a short finger to place their finger on the right side surface of the ZR-button 7*b*. Thus, the user can easily operate the ZR-button 7*b*. Further, the user can operate the ZL/ZR button 7 by placing their finger on, for example, the round-shaped portion between the ZL/ZR button 7 in the direction of the side surface and the direction of the back surface. This enables the user to operate the ZL/ZR button 7 without stretching their finger to a portion of the ZL/ZR button 7 on the center side (e.g., a portion protruding only in the direction of the back surface).

Further, the protruding portion 71 of the ZL/ZR button 7 extends continuously from the back surface side to the side surface side. The portion of the ZL/ZR button 7 from the back surface side to the side surface side has a round shape. Thus, there is less visual discomfort than in a case where the ZL/ZR button 7 includes a portion protruding only in the direction of the back surface and a portion protruding only in the direction of the side surface. This also improves the operability. In a case where the protruding portion 71 of the ZL/ZR button 7 is divided into a portion protruding only in the direction of the back surface and a portion protruding only in the direction of the side surface, and a portion from the back surface side to the side surface side does not protrude in the direction of the back surface and the direction of the side surface, the button has a discontinuous shape, which is unnatural. Further, in the case of a button having such a shape, the user operates the button by placing their finger on the portion protruding only in the direction of the back surface or the portion protruding only in the direction of the side surface. Thus, if the finger enters between these portions (between the direction of the back surface and the direction of the side surface), the user cannot operate the button. In contrast, the protruding portion 71 of the ZL/ZR button 7 is formed continuously from the back surface side to the side surface side, and the portion from the back surface side to the side surface side has a round shape, which results in a natural shape. Further, the game controller 1 according to the exemplary embodiment is so shaped as to be curved overall, and the round-shaped portion of the protruding portion 71 of the ZL/ZR button 7 matches the shape of the entirety of the game controller 1. Thus, there is no visual discomfort. Further, the protruding portion 71 of the ZL/ZR button 7 is formed continuously from the back surface side to the side surface side. Thus, the user can press the button at any position in this continuously formed portion. Thus, it is easy for the user to operate the ZL/ZR button 7.

Further, as shown in FIG. 7, an upper surface of the protruding portion 71*b* of the ZR-button 7*b* forms an integrated surface with an upper surface of a portion of the ZR-button 7*b* other than the protruding portion 71*b*. That is, an upper surface of the ZR-button 7*b* forms a surface continuous from the portion other than the protruding portion 71*b* (a portion that does not protrude in the direction of the back surface and the direction of the side surface) to the protruding portion 71*b*. The upper surface of the ZR-button 7*b* does not have a difference in level in the boundary between the protruding portion 71*b* and the portion other than the protruding portion 71*b*. Thus, there is no discomfort when the user operates the ZR-button 7*b*.

Further, as shown in (b) of FIG. 7, an end portion, in the direction of the back surface, of the protruding portion 71*b* has a round shape when viewed from the side surface side of the game controller 1. That is, a portion from the upper surface of the protruding portion 71*b* to a surface in the direction of the back surface has a round shape. As shown in (b) of FIG. 7, the ZR-button 7*b* is curved upward in the direction of the back surface. The ZR-button 7*b*, however, is not sharp in the end portion in the direction of the back surface, and has a round shape. Thus, even if the user presses the end portion, in the direction of the back surface, of the ZR-button 7*b* with their finger, there is no feeling of discomfort.

Further, as shown in (d) of FIG. 7, in an end portion of the ZR-button 7*b* on the center side in the left-right direction of the game controller 1 (further in the negative x-axis direction), a sloping portion 74*b*, which slopes downward, is provided. Specifically, the sloping portion 74*b* in the end portion of the ZR-button 7*b* on the center side of the game controller 1 slopes in two steps. A portion of the ZR-button 7*b* close to the end portion on the center side of the game controller 1 has a slightly great sloping angle. That is, the sloping portion 74*b* of the ZR-button 7*b* includes a portion on the side surface side and a portion on the center side. With respect to the horizontal direction (the x-axis direction in the xyz coordinate system), the sloping angle of the portion on the center side is greater than the sloping angle of the portion on the side surface side.

Further, as shown in (d) of FIG. 7, in an end portion of the ZR-button 7*b* on the side surface side in the left-right direction of the game controller 1 (further in the positive x-axis direction), a sloping portion 75*b*, which slopes downward, is provided. Specifically, the sloping portion 75*b* in the end portion of the ZR-button 7*b* on the side surface side of the game controller 1 slopes in two steps. A portion of the ZR-button 7*b* close to the end portion on the side surface side of the game controller 1 has a slightly great sloping angle. That is, the sloping portion 75*b* of the ZR-button 7*b* includes a portion on the side surface side and a portion on the center side. With respect to the horizontal direction (the x-axis direction in the xyz coordinate system), the sloping angle of the portion on the side surface side is greater than the sloping angle of the portion on the center side.

As described above, the end portion of the ZR-button 7*b* on the center side of the game controller 1 slopes, whereby it is easy for even a person having a long finger to operate the ZR-button 7*b*. That is, if the finger of the user is long, and when the user operates the ZR-button 7*b*, the tip of the finger reaches the end portion of the ZR-button 7*b* on the center side of the game controller 1. The sloping portion 74*b*, however, is provided in the end portion on the center side, whereby the sloping portion 74*b* fits the finger, and it is easy for the user to operate the ZR-button 7*b* (see FIG. 4).

Further, the end portion of the ZR-button 7*b* on the side surface side of the game controller 1 slopes, whereby it is easy for both a person having a long finger and a person having a short finger to operate the ZR-button 7*b*. That is, a user having a short finger can operate the ZR-button 7*b* by placing the tip of the finger on the end portion of the ZR-button 7*b* on the side surface side of the game controller 1. On the other hand, when a user having a long finger operates the ZR-button 7*b*, a portion near the base or the second joint of the index finger hits the end portion of the ZR-button 7*b* on the side surface side, and the tip of the finger hits the end portion of the ZR-button 7*b* on the center side. A sloping portion 75*d* is provided in the end portion on the side surface side, whereby, when the end portion of the ZR-button 7*b* on the center side is pressed by the extremity of the index finger, it is possible to make small a force (a force by reaction) applied to the portion near the base or the second joint of the finger, and make it easy for the user to press the ZR-button 7*b*.

Further, as shown in (c) of FIG. 2, the extremity of the ZR-button 7*b* on the back surface side of the game controller 1 (an end portion in the positive z-axis direction) is located closer to the front surface of the game controller 1 than the outer edge (a surface parallel with the back surface) of a center portion of a back surface of the housing 10 is. Specifically, as shown in (d) of FIG. 2, the extremity of the ZR-button 7*b* on the back surface side slightly protrudes further to the back surface side than the outer edge of the back surface of the housing 10 at the position of the ZR-button 7*b* thereof, but is located closer to the front surface than the outer edge of the center portion of the back surface of the housing 10 is. Thus, if the game controller 1 is placed on a planar surface, the game controller 1 is supported by the center portion of the back surface of the housing 10.

FIG. 9 is a diagram showing, when the game controller 1 is placed on a planar surface, the game controller 1 as viewed from a direction parallel with the planar surface. As shown in FIG. 9, if the game controller 1 is placed on a planar surface, the grip portion 8*a*, the grip portion 8*b*, and the center portion of the back surface of the housing 10 come into contact with the planar surface, and the load of the game controller 1 is applied to these three portions. It should be noted that if the game controller 1 is placed on a planar surface, at least one of the ZL-button 7*a* and the ZR-button 7*b* may come into contact with the planar surface. The load, however, is mainly applied to the center portion of the back surface of the housing 10, the grip portion 8*a*, and the grip portion 8*b*. Thus, even if the game controller 1 is placed on a planar surface, the ZL-button 7*a* and the ZR-button 7*b* are not pressed. Further, even in a case where a large load is applied to the game controller, such as a where the user accidentally steps on the game controller 1 placed on a planar surface, a large load is applied to the center portion of the back surface of the housing 10, the grip portion 8*a*, and the grip portion 8*b*, and a large load is not applied to the ZL/ZR button 7. Thus, it is possible to prevent a large load from being applied to the ZL/ZR button 7, which is structurally weaker in strength than the housing 10, and the button from being damaged.

Further, as shown in (b) of FIG. 7, the closer to the back surface side of the game controller 1, the further upward the ZR-button 7*b* is warped. Specifically, as shown in (c) of FIG. 6 and (b) of FIG. 7, the ZR-button 7*b* is curved downward from an end portion on the front surface side of the game controller 1 to a center portion of the ZR-button 7*b* and is curved upward near an end portion on the back surface side of the game controller 1. The degree of warp of the ZR-button 7*b* gradually becomes larger from the end portion on the front surface side to near the end portion of the back surface side. The ZR-button 7*b* slopes downward in an end portion on the back surface side (the sloping portion 75*d* goes around to the back surface side). More specifically, as shown in (b) of FIG. 7, a curvature r1 of the upper surface of the ZR-button 7*b* on the back surface side of the game controller 1 is greater than a curvature r2 of the upper surface of the ZR-button 7*b* on the front surface side of the game controller 1. That is, an end portion of the upper surface of the ZR-button 7*b* on the front surface side (a point A), the center portion of the ZR-button 7*b* (a point B at the midpoint between the point A and a point C in (b) of FIG. 7), and a portion on the near side (the point C) in an end portion of the ZR-button 7*b* sloping downward on the back surface side are different in curvature. The closer to the point A, the point B, and the point C, the greater the curvature gradually becomes. Further, a change in the curvature from the point B to the point C is greater than a change in the curvature from the point A to the point B.

As described above, in the game controller 1 according to the exemplary embodiment, the further in the direction of the back surface, the further upward the ZR-button 7b is warped. The degree of warp of the ZR-button 7b gradually becomes larger. The ZR-button 7b slopes downward in the end portion of the back surface side. Thus, it is easy for the user to operate the ZR-button 7b. For example, if the degree of warp of the ZR-button 7b abruptly changes, the ZR-button 7b is a hindrance and makes it difficult for a user having a long finger to operate the button. For example, if the user places their index finger on the back surface of the game controller 1 without placing the finger on the ZR-button 7b when the user does not operate the ZR-button 7b, the user needs to move the finger from the back surface onto the ZR-button 7b when operating the ZR-button 7b. If, however, the degree of warp of the ZR-button 7b abruptly changes, the finger hits the apex of this warped portion. In the game controller 1 according to the exemplary embodiment, however, the degree of warp of the ZR-button 7b gradually becomes larger. Thus, the finger of the user is less likely to hit the apex of the warped portion, and it is easy for the user to operate the ZR-button 7b. Further, the end portion of the ZR-button 7b on the back surface side of the game controller 1 slopes downward. Thus, the finger of the user is less likely to hit the warped portion.

Specifically, in the ZR-button 7b, the sloping portion 71b is provided on the back surface side, and an upper end portion of the second housing 10b does not protrude in the direction of the back surface. Thus, if the user places their finger on the housing 10 on the back surface side, it is easy to access the ZR-button 7b and the R-button 6b. As shown in FIGS. 2 and 7, the extremity of the ZR-button 7b on the back surface side protrudes slightly further to the back surface side than the outer edge of the second housing 10b at the position of the ZR-button 7b. However, the sloping portion 71b is provided, and further, the upper end portion of the second housing 10b does not protrude in the direction of the back surface. Thus, when the user moves their finger from the back surface side of the housing 10 to the positions of the ZR-button 7b and the R-button 6b, the finger is less likely to hit the extremity of the ZR-button 7b on the back surface side and the upper end portion of the housing 10 on the back surface side. Thus, it is possible to smoothly move the finger from the back surface side to the positions of the ZR-button 7b and the R-button 6b.

Further, as shown in (b) and (c) of FIG. 7, the lower portion 73b of the ZR-button 7b includes a bearing portion 76b and is supported to be pivotable by a shaft extending in the left-right direction of the game controller 1 (the x-axis direction). The bearing portion 76b is provided further in the direction of the front surface of the game controller 1 (the negative z-axis direction). The ZR-button 7b is configured to pivot about the shaft, thereby being pressed in the down direction of the game controller 1 (the negative y-axis direction).

FIG. 10 is a diagram showing an example of a structure for fixing the ZR-button 7b to the button frame 30. FIG. 10 is a diagram showing the ZR-button 7b as viewed from its upper surface. As shown in FIG. 10, the ZR-button 7b is supported to be pivotable by a shaft 35. In an end portion of the button frame 30 on the right side, a bearing portion 34, which receives the shaft 35, is provided. The shaft 35 is inserted from the center side of the game controller 1 in the direction of the side surface of the game controller 1, and is not inserted from the side surface side of the game controller 1. The shaft 35 is configured to be inserted only from the center side of the game controller 1, and therefore, it is possible to extend the ZR-button 7b to near an end portion of the side surface of the game controller 1. Further, the entrance of the bearing portion 34 is slightly larger than the diameter of the shaft 35. The further in the depth direction of the bearing portion 34, the narrower the bearing portion 34. For example, a buffer material 36 is applied inside the bearing portion 34 in the depth direction. Consequently, when the shaft 35 is inserted, it is possible to firmly fix the shaft 35 to the button frame 30. It should be noted that the position of the buffer material 36 is not limited to that exemplified in FIG. 10. Alternatively, the buffer material may be provided at any position where the ZR-button 7b comes into contact with a part of the button frame 30.

(Relationship Between L/R Button and ZL/ZR Button)

Next, the relationship between the L/R button and the ZL/ZR button is described. As shown in (d) of FIG. 6, the length in the left-right direction (the x-direction) of the L-button 6a is longer than the length in the left-right direction of the ZL-button 7a. Further, the length in the vertical direction (the z-direction: the direction of the front surface of the game controller 1) of the ZL-button 7a is longer than the length in the vertical direction of the L-button 6a. That is, the ZL-button 7a is formed to so as be longer than the L-button 6a in the direction of the back surface of the game controller 1.

Further, the further in the direction of the side surface of the game controller 1, the further downward the L/R button 6 slopes. Thus, it is easy for the user to operate the ZL/ZR button 7, which is located on the back surface side. Thus, it is possible to prevent the user from erroneously pressing the L/R button 6 when pressing the ZL/ZR button 7. That is, as shown in FIG. 4, if the user presses the ZL/ZR button 7 on the back surface side with their index finger, for example, a portion from the first joint to the second joint of the index finger may touch the L/R button 6. At this time, if the further in the direction of the side surface from the center of the game controller 1, the further downward the L/R button 6 does not slope, the finger is likely to come into contact with the L/R button 6. The L/R button 6, however, slopes downward, and therefore, the finger is less likely to hit an end portion of the L/R button 6 on the side surface side. Thus, it is possible to prevent the user from erroneously pressing the L/R button 6 when pressing the ZL/ZR button 7.

Further, in the end portion of the L/R button 6 on the side surface side, the sloping portion 62 (*a, b*), which slopes in two steps, is provided. Thus, when the user operates the ZL/ZR button 7, the finger is less likely to hit the end portion of the L/R button 6 on the side surface side. Thus, it is possible to prevent the user from erroneously pressing the L/R button 6. For example, a user having a long finger operates the ZL/ZR button 7 by placing the finger in an end portion of the ZL/ZR button 7 on the center side. At this time, a base portion of the finger may hit the end portion of the L/R button 6 on the side surface side. In the exemplary embodiment, the end portion of the L/R button 6 on the side surface side slopes downward, and therefore, the base portion of the finger is less likely to hit the end portion of the L/R button 6 on the side surface side. Thus, it is possible to prevent the user from erroneously pressing the L/R button 6 when operating the ZL/ZR button 7.

Further, the closer to the side surface of the game controller 1, the smaller the width (the width in the z-direction) of the L/R button 6. This makes it possible to prevent the user from erroneously pressing the L/R button 6 when pressing the ZL/ZR button 7. For example, if the width of the L/R button 6 is great in an end portion of the side surface of the L/R button 6, and when the user operates the ZL/ZR button 7 by moving their finger from the position of the L/R button 6 to the position of the ZL/ZR button 7, the finger may touch the end portion of the side surface of the L/R button 6, and the user may erroneously press the L/R button 6. However, the closer to the side surface, the smaller the width of the L/R button 6. Thus, it is possible to prevent the user from erroneously pressing the L/R button 6.

Further, the L/R button 6 includes the sloping portion 63 (*a, b*) in an end portion of the L/R button 6 on the front surface side. Thus, when the user places their finger on the front surface side of the housing 10, it is easy to access the L/R button 6, and it is also easy to access the ZL/ZR button 7. That is, the end portion of the L/R button 6 on the front surface side slopes, and therefore, when the user moves their finger from the front surface side of the housing 10 to the ZL/ZR button 7, it is possible to prevent the finger from touching the L/R button 6. Further, as described above, the end portion of the L/R button 6 on the front surface side slopes. Thus, also in the case of a user who holds the game controller 1 by covering the front surface of the game controller 1 with their hand, without holding the grip portion 8 of the game controller 1, it is easy for the user to operate the ZL/ZR button 7. Thus, it is possible to prevent the user from erroneously pressing the L/R button 6 when operating the ZL/ZR button 7.

Further, as shown in (d) of FIG. 6, the ZR-button 7*b* is located closer to the side surface of the game controller 1 than the R-button 6*b* is. Specifically, the left end (an end portion on the center side in the left-right direction of the game controller 1) of the ZR-button 7*b* is located closer to the side surface of the game controller 1 (further in the positive x-axis direction) than the left end (an end portion on the center side in the left-right direction of the game controller 1) of the R-button 6*b*. On the other hand, the right end (an end portion on the side surface side in the left-right direction of the game controller 1) of the ZR-button 7*b* is approximately coincide with the right end (an end portion on the side surface side in the left-right direction of the game controller 1) of the R-button 6*b*. Thus, the center position of the ZR-button 7*b* is located closer to the side surface of the game controller 1 than the center position of the R-button 6*b* is. The button detection sections provided below the ZR-button 7*b* and the R-button 6*b* also have a similar positional relationship.

Figure 11:
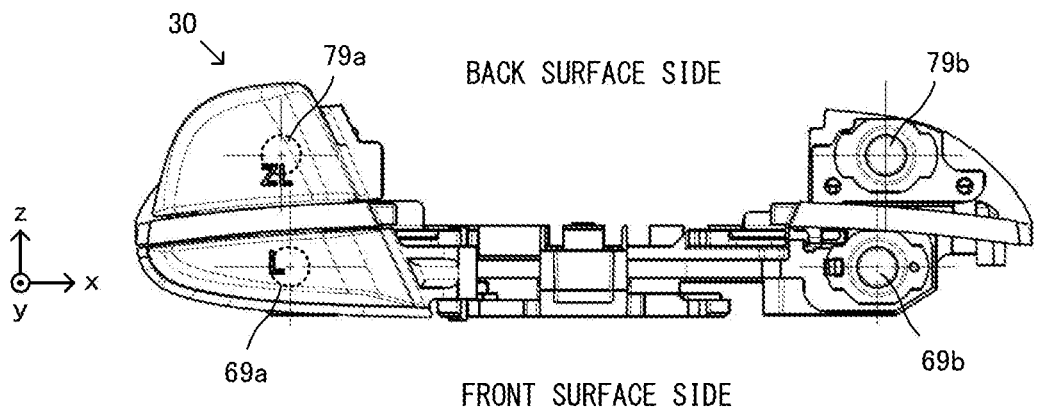
FIG. 11 is a top view of a non-limiting example of the button frame 30 when the key tops of the R-button 6b and the ZR-button 7b are removed.

FIG. 11 is a top view of the button frame 30 when the key tops of the R-button 6*b* and the ZR-button 7*b* are removed.

As shown in FIG. 11, below the key top of the R-button 6*b*, an R-button detection section 69*b* for detecting an operation on the R-button 6*b* is placed. Similarly, below the key top of the L-button 6*a*, an L-button detection section 69*a* for detecting an operation on the L-button 6*a* is placed. Further, below the key top of the ZR-button 7*b*, a ZR-button detection section 79*b* for detecting an operation on the ZR-button 7*b* is placed. Similarly, below the key top of the ZL-button 7*a*, a ZL-button detection section 79*a* for detecting an operation on the ZL-button 7*a* is placed.

Specifically, the R-button detection section 69*b* is placed in the approximate centers in the left-right direction (the x-axis direction) and the front-back direction (the z-axis direction) of the key top of the R-button 6*b*. Further, the ZR-button detection section 79*b* is placed in the approximate center in the front-back direction (the z-axis direction) of the key top of the ZR-button 7*b* and placed slightly closer to the center of the game controller 1 than the center in the left-right direction of the key top of the ZR-button 7*b*.

If the R-button detection section 69*b* and the ZR-button detection section 79*b* are compared with each other, the ZR-button detection section 79*b* is located closer to the side surface of the game controller 1 than the R-button detection section 69*b* is. Similarly, if the L-button detection section 69*a* and the ZL-button detection section 79*a* are compared with each other, the ZL-button detection section 79*a* is located closer to the side surface of the game controller 1 than the L-button detection section 69*a* is. That is, the ZL-button detection section 79*a* and the ZR-button detection section 79*b* are located on the outer side of the game controller 1, and the L-button detection section 69*a* and the R-button detection section 69*b* are located on the inner side of the game controller 1.

The reason why the ZL-button 7*a* and the ZR-button 7*b* (the ZL-button detection section 79*a* and the ZR-button detection section 79*b*) on the back surface side are located further outside is to match the track of the finger when the user operates the ZR-button 7*b* and the R-button 6*a* with their index finger, for example.

Figure 12:
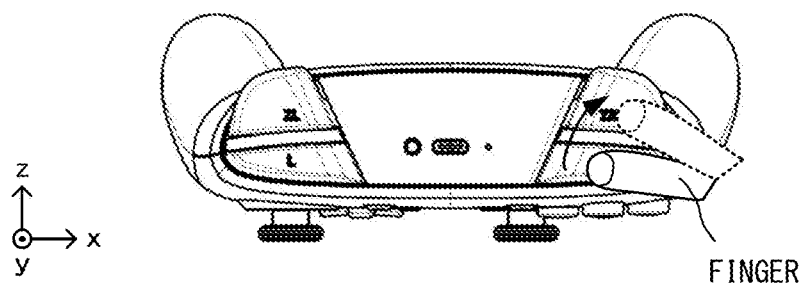
FIG. 12 is a diagram showing a non-limiting example of the motion of the index finger when the user operates the ZR-button 7b and the R-button 6b.

FIG. 12 is a diagram showing the motion of the index finger when the user operates the ZR-button 7*b* and the R-button 6*b*. As shown in FIG. 12, if the index finger moves from the position of the R-button 6*b* to the position of the ZR-button 7*b*, the finger of the user moves so as to draw a circular arc about the base of the finger. For example, if the user holds the grip portion 8*b* with their right hand, the base of the index finger is typically located on the extension of the R-button 6*b* on the right side surface of the game controller 1 (see FIG. 4). If the user operates the ZR-button 7*b* when placing their index finger on the R-button 6*b*, the user moves the finger in the direction of the back surface while almost keeping fixing the base of the index finger. Thus, the index finger of the user moves so as to draw a circular arc about its base. The further in the direction of the back surface of the game controller 1 the finger moves, the further in the direction of the side surface of the game controller 1 the extremity of the finger moves. Thus, the extremity of the index finger is located further in the direction of the side surface of (on the outer side of) the game controller 1 after the finger moves to the position of the ZR-button 7*b* than when the finger is located at the position of the R-button 6*a*.

In the game controller 1 according to the exemplary embodiment, the ZR-button 7*b* is placed on the outer side of the R-button 6*b*, taking into account such a motion of the finger of the user. Similarly, the ZR-button detection section 79*b* is also placed on the outer side of the R-button detection section 69*b*. With such placement of the buttons, it is possible to make it easy for the user to operate the ZR-button 7*b* and the R-button 6*a*. Further, the detection section for each button is similarly placed, whereby it is possible to place the detection section for the button approximately immediately below the finger when the user presses the button, and to certainly detect the operation of the user.

Referring back to FIG. 6, between the R-button 6*b* and the ZR-button 7*b*, a division wall 31*b* (a predetermined surface), which divides these buttons, is provided. The division wall 31*b* is a part of the button frame 30. Here, the height of the division wall 31*b* and the heights of the R-button 6*b* and the ZR-button 7*b* are described. It should be noted that each of the "heights" of the R-button 6*b*, the ZR-button 7*b*, and the division wall 31*b* as used herein indicates the distance from a surface parallel with the z-axis (an axis parallel with the direction of pressing the A-button 2*a* or the like provided on the front surface of the game controller 1) and the x-axis (an axis parallel with the left-right direction of the game controller 1 when viewed from the front) with respect to the game controller 1. That is, each of the "heights" of the R-button 6b, the ZR-button 7b, and the division wall 31b is a height with respect to the z-axis and the x-axis and indicates a distance in the y-axis direction.

Figure 13:
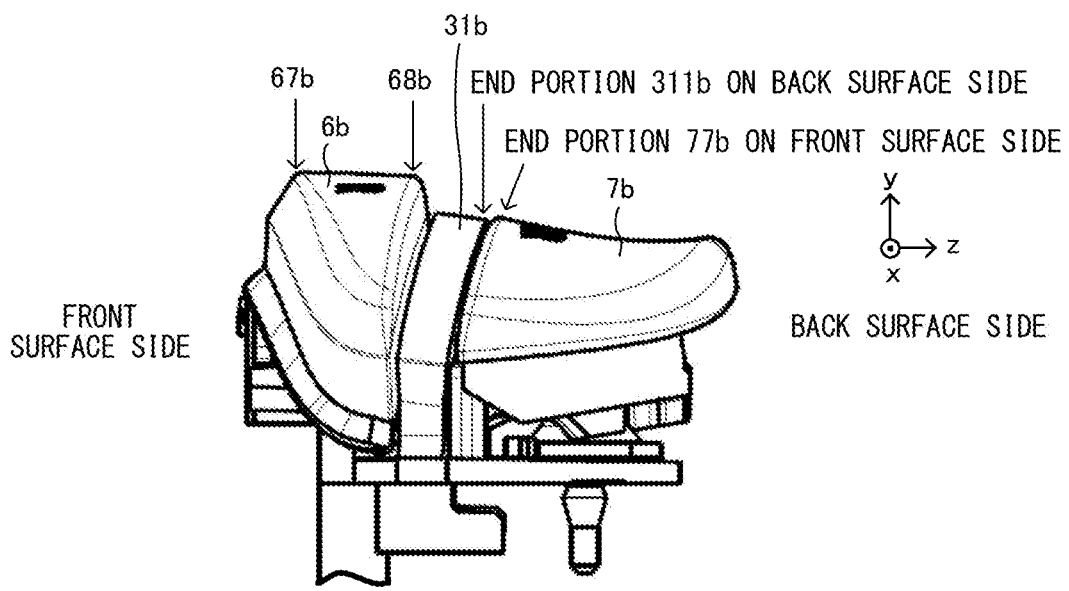
FIG. 13 is a partially enlarged view of a non-limiting example of (c) of FIG. 6.

FIG. 13 is a partially enlarged view of (c) of FIG. 6. As shown in FIG. 13, the height of the division wall 31b is smaller than that of the R-button 6b. Even when the R-button 6b is pressed, the height of the division wall 31b is smaller than the height of the R-button 6b. That is, both when the R-button 6b is not pressed and when the R-button 6b is pressed, a straight line extending from any point on an upper surface of the R-button 6b in the z-axis direction does not hit the division wall 31b. Further, if the ZR-button 7b is not pressed, the height of an end portion 311b of the division wall 31b on the back surface side of the game controller 1 is slightly smaller than the height of an end portion 77b of the ZR-button 7b on the front surface side of the game controller 1. That is, in a case where the ZR-button 7b is not pressed, a straight line extending from the end portion 77b of the ZR-button 7b in the negative z-axis direction does not hit the end portion 311b of the division wall 31b on the back surface side. Even when the ZR-button 7b is pressed, the height of the end portion 311 of the division wall 31b on the back surface side is slightly smaller than, or approximately the same as, the height of the end portion 77b of the ZR-button 7b on the front surface side of the game controller 1. That is, in a case where the ZR-button 7b is pressed, a straight line extending from the end portion 77b of the ZR-button 7b in the negative z-axis direction does not hit the end portion 311b of the division wall 31b on the back surface side, or passes through the end portion 311b of the division wall 31b.

The division wall 31b is provided between the R-button 6b and the ZR-button 7b, whereby the user can use the division wall 31b as a place to put their finger when the user does not operate the R-button 6b or the ZR-button 7b. Thus, it is possible to prevent the user from erroneously operating the R-button 6b or the ZR-button 7b. Further, both when the ZR-button 7b is not pressed and when the ZR-button 7b is pressed, the height of the end portion 77b of the ZR-button 7b on the front surface side of the game controller 1 is greater than (or substantially the same as) the height of the end portion 311b of the division wall 31b on the back surface side. Thus, it is possible to make the finger less likely to be caught between the ZR-button 7b and the division wall 31b. The ZR-button 7b pivots using as a pivot point the shaft 35 (see FIG. 10), which is located on the division wall 31b side in FIG. 13. Thus, if the ZR-button 7b is pressed, a gap occurs between the ZR-button 7b and the division wall 31b. However, even when the ZR-button 7b is pressed, and if the height of the division wall 31b is smaller than (or substantially the same as) the height of the ZR-button 7b in a boundary portion between the ZR-button 7b and the division wall 31b, the finger is less likely to enter the gap between the ZR-button 7b and the division wall 31b, and the finger is less likely to be caught.

Further, if the heights of the R-button 6b on the front surface side and the ZR-button 7b on the back surface side are compared with each other, the height of an end portion 68b of the R-button 6b on the back surface side of the game controller 1 is greater than the height of the end portion 77b of the ZR-button 7b on the front surface side of the game controller 1. Specifically, as shown in FIG. 13, the height of the R-button 6b is greater than that of the ZR-button 7b overall from the end portion 67b on the front surface side of the game controller 1 to the end portion 68b on the back surface side of the game controller 1. That is, a straight line extending from any point on the upper surface of the R-button 6b in the z-axis direction does not hit the ZR-button 7b. Thus, the user only touches the R-button 6b and the ZR-button 7b with their finger and thereby can recognize whether the button is the R-button 6b or the ZR-button 7b.

It should be noted that the closer to the side surface, the further downward the R-button 6b slopes. Thus, in the end portion on the side surface side (the end portion in the near-side direction of the paper in FIG. 13), the height of the R-button 6b is approximately the same as that of the ZR-button 7b. That is, as shown in (f) of FIG. 2, if the game controller 1 is viewed from the back surface side, the heights of the end portions of the L/R button 6 and the ZL/ZR button 7 on the side surface side are approximately the same. Thus, in a case where the user moves their finger in the front-back direction of the game controller 1, the finger is less likely to hit the end portions of the L/R button 6 and the ZL/ZR button 7 on the side surface side. Thus, it is possible to prevent the user from erroneously pressing the ZL/ZR button 7 when pressing the L/R button 6, and conversely, it is possible to prevent the user from erroneously pressing the L/R button 6 when pressing the ZL/ZR button 7.

As described above, in the exemplary embodiment, the ZL/ZR button 7 is provided to the side of the L/R button 6 closer to the back surface side of the game controller 1. The ZL/ZR button 7 includes the protruding portion 71, which protrudes in the direction of the back surface and the direction of the side surface, whereby it is easy for the user to operate the ZL/ZR button 7, which is located on the back surface side. Further, the L/R button 6 and the ZL/ZR button 7 include the above features (the sloping portion in the end portion in the left-right direction (the x-axis direction), the sloping portion in the end portion in the front-back direction (the z-axis direction), the position in the left-right direction, the height in the y-axis direction, and the like). Thus, it is difficult for the user to confuse the L/R button 6 and the ZL/ZR button 7 with each other, and it is easy for the user to operate the L/R button 6 and the ZL/ZR button 7.

Further, in the exemplary embodiment, the L/R button 6, the ZL/ZR button 7, the shafts supporting these buttons, and the detection sections for detecting the pressing of these buttons are formed integrally as the button frame 30. Thus, it is possible to make an error in the manufacture of each button smaller than a case where each button is fixed to the housing 10, and to prevent rattling when each button is operated.

[Description of Grip Portion]

Next, the grip portion 8 of the game controller 1 is described. FIG. 14 is an external view of the state where the grip portion 8 of the game controller 1 is removed. (a) of FIG. 14 is a front view when the grip portion 8 of the game controller 1 is removed. (b) of FIG. 14 is a left side view when the grip portion 8 of the game controller 1 is removed. (c) of FIG. 14 is a rear view when the grip portion 8 of the game controller 1 is removed. FIG. 15 is a diagram showing the state of the middle of removing the grip portion 8b of the game controller 1 on the right side. It should be noted that an x-axis, a y-axis, and a z-axis in FIG. 14 correspond to the x-axis, the y-axis, and the z-axis, respectively, in FIG. 2.

As shown in FIGS. 14 and 15, each of the grip portions 8a and 8b of the game controller 1 is configured to be able to be separated from the housing 10 (a main body housing). As described above, the housing 10 is formed by connecting the first housing 10a on the front surface side of the game controller 1 and the second housing 10b on the back surface side of the game controller 1 (FIG. 5).

As shown in FIG. 14, the housing 10, which is formed by connecting the first housing 10a and the second housing 10b, includes a controller main body portion in which various operation buttons, analog sticks, and the like for a game operation are provided, a first holding portion (first protruding portion) 18a, and a second holding portion (second protruding portion) 18b. The first holding portion 18a protrudes downward (in the negative y-axis direction) from the left of the center of the controller main body portion. As shown in (b) of FIG. 14, the first holding portion 18a is curved in the direction of the back surface (the positive z-axis direction). The second holding portion 18b protrudes downward (in the negative y-axis direction) from the right of the center of the controller main body portion. The second holding portion 18b is curved in the direction of the back surface (the positive z-axis direction). It should be noted that the first holding portion (first protruding portion) 18a is a portion to be held (through the grip portion 8a) by the left hand of the user when the grip portion 8a is connected to the first holding portion 18a. Here, the first holding portion (first protruding portion) 18a is not a portion to be directly held by the user, but is a portion to be indirectly held by the user. Thus, the first holding portion 18a is referred to as a "first holding portion". The same applies to the second holding portion (second protruding portion) 18b.

In the first holding portion 18a, a guide 181a is provided on the front surface side. The guide 181a is a long and narrow recessed groove and is used to guide the grip portion 8a to a predetermined position in the process of fitting the grip portion 8a to the first holding portion 18a. The guide 181a extends from an extremity portion (a lower portion in FIG. 14) to the base (an upper portion) of the first holding portion 18a. The guide 181a is formed such that the width of the guide 181a on the extremity side is greater than that of the guide 181a on the base side.

Further, as shown in (c) of FIG. 14, in the first holding portion 18a, a guide 182a is provided on the back surface side. The guide 182a is a long and narrow recessed groove and is used to guide the grip portion 8a to a predetermined position in the process of fitting the grip portion 8a to the first holding portion 18a. The guide 182a extends from an extremity portion (a lower portion) to the base (an upper portion) of the first holding portion 18a. The guide 182a is formed such that the width of the guide 182a on the extremity side is greater than that of the guide 182a on the base side.

Further, as shown in (b) of FIG. 14, at the extremity of the first holding portion 18a, a screw hole 183a, through which to insert a screw, is provided. The grip portion 8a is fitted to the first holding portion 18a, and the grip portion 8a and the first holding portion 18a are screwed together, thereby fixing the grip portion 8a to the first holding portion 18a. It should be noted that a screw hole does not necessarily need to be provided at the extremity of the first holding portion 18a. Alternatively, a screw hole may be provided in an extremity portion including the extremity (including the extremity and a portion near the extremity).

The same applies to the second holding portion 18b. That is, also in the second holding portion 18b, guides 181b and 182b are provided on the front surface side and the back surface side. Further, in an extremity portion of the second holding portion 18b, a screw hole 183b, through which to insert a screw, is provided.

Figure 16:
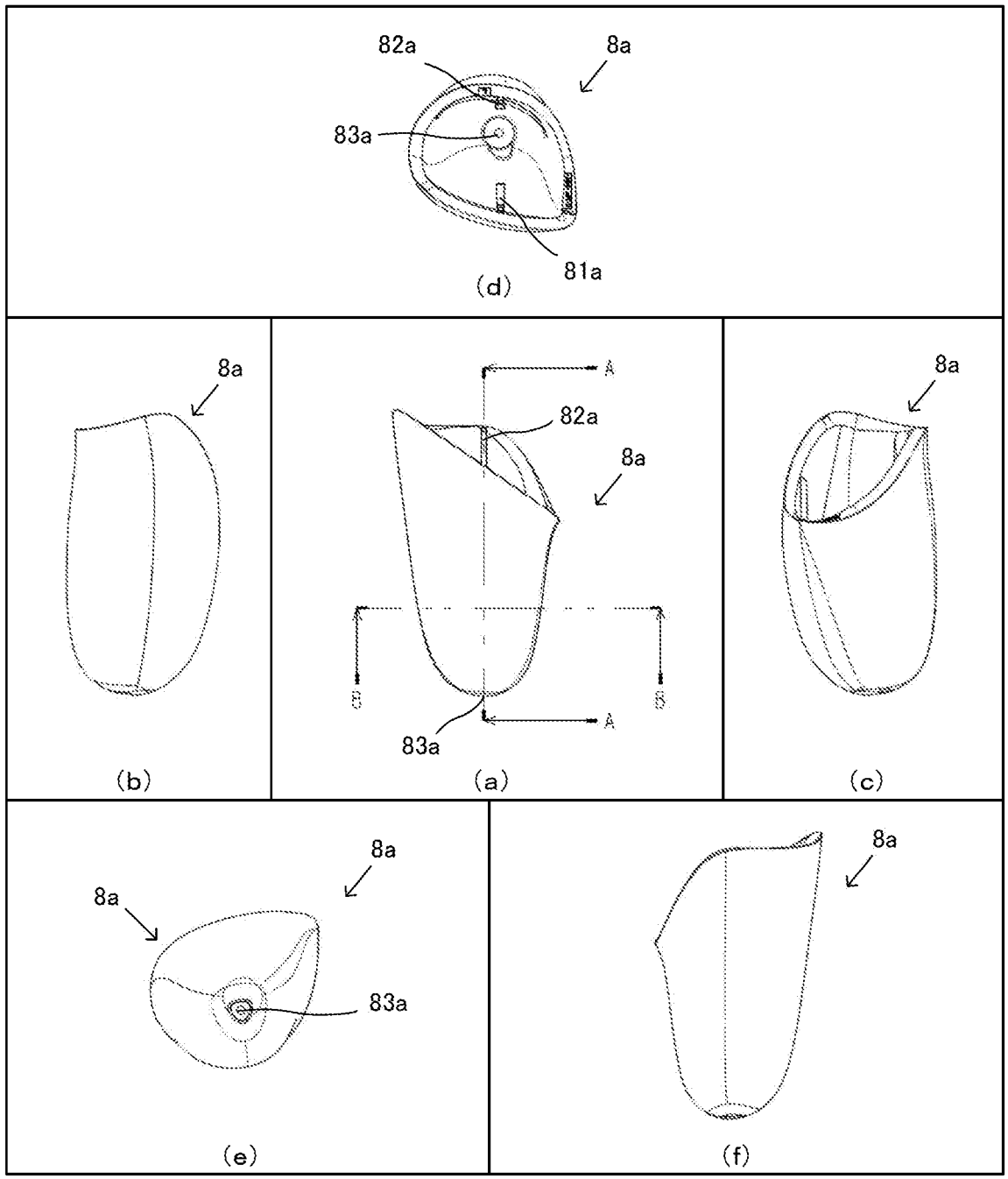
FIG. 16 is an external view of a non-limiting example of a grip portion 8a, which is fitted to a first holding portion 18a of a housing 10.
Figure 17A:
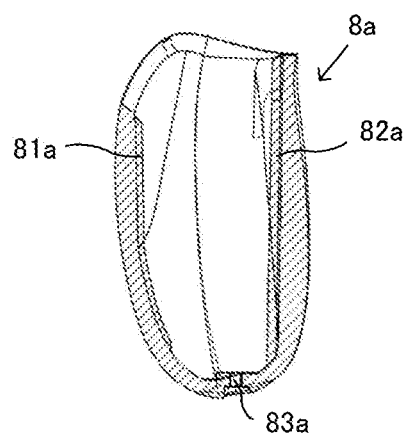
FIG. 17A is a non-limiting example of a cross-sectional view along a line A-A in FIG. 16.
Figure 17B:
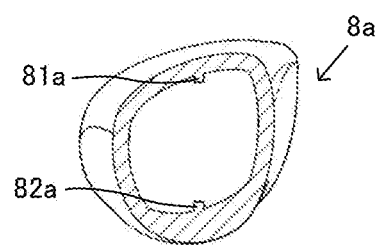
FIG. 17B is a non-limiting example of a cross-sectional view along a line B-B in FIG. 16.

Next, the grip portion 8 is described in detail. FIG. 16 is an external view of the grip portion 8a, which is fitted to the first holding portion 18a of the housing 10. (a) of FIG. 16 is a front view of the grip portion 8a and is a diagram of the grip portion 8a as viewed from the same direction as that in (a) of FIG. 2. Further, (b) of FIG. 16 is a left side view of the grip portion 8a. (c) of FIG. 16 is a right side view of the grip portion 8a. (d) of FIG. 16 is a top view of the grip portion 8a. (e) of FIG. 16 is a bottom view of the grip portion 8a. (f) of FIG. 16 is a rear view of the grip portion 8a. FIG. 17A is a cross-sectional view along a line A-A in FIG. 16. FIG. 17B is a cross-sectional view along a line B-B in FIG. 16.

It should be noted that in FIGS. 16, 17A, and 17B, a structure for fixing a vibration motor 50 described later is omitted. The structure for fixing the vibration motor 50 will be described in detail later.

Further, the grip portion 8a on the left side and the grip portion 8b on the right side are symmetrical. Although only the grip portion 8a on the left side is described below, the same applies to the grip portion 8b on the right side. Further, hereinafter, the grip portions 8a and 8b will occasionally be collectively referred to as a "grip portion 8", and the first holding portion 18a and the second holding portion 18b will occasionally be collectively referred to as a "holding portion 18".

As shown in FIG. 16, the grip portion 8a is a hollow member and is so shaped as to protrude in a predetermined direction (downward). The grip portion 8a is so shaped that if the grip portion 8a is cut along a plane perpendicular to the predetermined direction, the outer periphery of the cross section is approximately elliptical. Specifically, the shape of the outer periphery of the cross section is a shape obtained by deforming an ellipse and is an approximately oval shape having a blunt end and a pointed end (FIG. 17B). It should be noted that the shape of the cross section is not limited to an approximate ellipse, and may be any shape such as a polygon (e.g., a triangle, a quadrilateral, a pentagon, or the like) having round corners.

The upper end of the grip portion 8a is open, and the lower end (except for the screw hole) of the grip portion 8a is closed. Further, the grip portion 8a is so formed that a left side surface of the grip portion 8a is longer in the up-down direction than a right side surface of the grip portion 8a. The area of the left side surface of the grip portion 8a is larger than the area of the right side surface of the grip portion 8a. If the user grips the grip portion 8a with their left hand, a center portion of the palm hits the left side surface side of the grip portion 8a, a base portion of the thumb hits the front surface side of the grip portion 8a, and the middle finger, the third finger, and the little finger hit the back surface side to the right side surface side of the grip portion 8a so as to go around these sides. That is, the left side surface of the grip portion 8a, of which the area is larger, hits the center portion of the palm of the user, and the right side surface of the grip portion 8a, of which the area is smaller, hits the middle finger, the third finger, the little finger, and the like.

The grip portion 8a is not formed by connecting two housing members (10a and 10b) with a screw or the like as in the housing 10, and is molded in an integrated manner. The surface of the grip portion 8a is smooth without a difference in level in a boundary portion formed by connecting two members as in the housing 10. It should be noted that depending on the method for molding the grip portion 8a, it may be possible to visually recognize the boundary between a plurality of members. The grip portion 8a, however, does not have a difference in level formed in a boundary portion between a plurality of separated members assembled and connected together by screwing, and the surface of the grip portion 8*a* is almost smooth.

As shown in FIGS. 16, 17A, and 17B, inside the grip portion 8*a*, the guide 81*a* is provided on the front surface side of the game controller 1, and the guide 82*a* is provided on the back surface side of the game controller 1. The guide 81*a* and the guide 82*a* are provided at positions opposed to each other. That is, the guide 81*a* and the guide 82*a* are provided on a straight line dividing the grip portion 8*a* into two approximately equal parts.

The guide 81*a* and the guide 82*a* are long and narrow protruding portions. Specifically, the guide 82*a* is formed so as to extend from an opening portion (the base) of the grip portion 8*a* to the lower end (an extremity portion) of the grip portion 8*a*. Further, the guide 81*a* is formed so as to extend from the opening portion (the base) of the grip portion 8*a* to near the lower end (the extremity portion) of the grip portion 8*a*. The guide 81*a* and the guide 82*a* are small in width in the opening portions (the bases). The closer to the extremity, the larger the width of the guide.

The protruding guide 81*a* of the grip portion 8*a* and the recessed guide 181*a* of the first holding portion 18*a* are engaged together, the protruding guide 82*a* of the grip portion 8*a* and the recessed guide 182*a* of the first holding portion 18*a* are engaged together, and the grip portion 8*a* is slid (upward as in FIG. 15), whereby it is possible to fit the grip portion 8*a* to the first holding portion 18*a* of the housing 10.

As described above, the grip portion 8*a* is so formed that the closer to the extremity, the larger the widths of the guides 81*a* and 82*a* of the grip portion 8*a*. The first holding portion 18*a* is so formed that the closer to the extremity, the larger the widths of the guides 181*a* and 182*a* of the first holding portion 18*a*. Thus, when the grip portion 8*a* is fitted to the first holding portion 18*a*, first, portions (protrusions) having smaller widths in the guides 81*a* and 82*a* of the grip portion 8*a* are engaged with portions (recessed grooves) having larger widths in the guides 181*a* and 182*a* of the first holding portion 18*a*. Thus, it is easy to fit the grip portion 8*a* to the first holding portion 18*a*. Further, the guides 81*a* and 82*a* extend to near the extremity of the grip portion 8*a*. Thus, it is easy to remove or attach the grip portion 8*a*.

Further, at the extremity of the grip portion 8*a*, a screw hole 83*a* is provided. The screw is inserted into the screw hole 83*a* and screwed, thereby connecting the first holding portion 18*a* and the grip portion 8*a*. The grip portion 8*a* is screwed to the first holding portion 18*a* at the extremity of the grip portion 8*a*. Thus, the user is less likely to touch the screw hole during a game operation. That is, if the user grips the grip portion 8 as in FIG. 4, the hand is less likely to touch the extremity portion of the grip portion 8. Thus, it is possible to eliminate discomfort when the user grips the grip portion 8.

As is clear from FIG. 15, the grip portion 8 covers the entirety of the outer periphery of the holding portion 18 of the housing 10. If the holding portion 18 is cut along a plane perpendicular to the longitudinal direction, the grip portion 8 covers the entirety of the outer periphery of the cross section of the holding portion 18. That is, the entirety of the holding portion 18 including a boundary portion between the first housing 10*a* and the second housing 10*b* is covered with the grip portion 8. Thus, if the user grips the grip portion 8, it is possible to prevent discomfort from occurring. That is, if the housing 10 is formed by connecting the first housing 10*a* and the second housing 10*b*, a difference in level may occur in the boundary portion between the two members, and the user may feel discomfort when gripping the holding portion 18. This may hinder a game operation. In the exemplary embodiment, the boundary portion between the first housing 10*a* and the second housing 10*b* is covered with the grip portion 8, whereby, when the user holds the game controller 1, the game controller 1 is likely to fit the hand well, and it is possible to improve the feel when the user grips the holding portion.

Further, if the housing 10 and the grip portion 8*a* are connected together, a boundary portion (see FIG. 15) between the housing 10 and the grip portion 8*a* is smoothly joined. Specifically, the height of the surface of the grip portion 8*a* in the boundary portion between the housing 10 and the grip portion 8*a* is substantially the same as the height of the surface of the controller main body portion of the housing 10 in the boundary portion. That is, there is no difference in level in the boundary portion between the grip portion and the controller main body portion. The heights of the surfaces of the controller main body portion and the grip portion 8 in the boundary portion between the controller main body portion and the grip portion 8 are the same. Thus, it is possible to improve the feel when the user holds the game controller 1.

It should be noted that the above configurations of the grip portion 8 and the holding portion 18 are merely illustrative, and may be the following configurations.

For example, in the above description, the protruding guides 81 and 82 are provided on the grip portion 8 side, and the recessed guides 181 and 182 are provided on the holding portion 18 side. Alternatively, a recessed guide may be provided on the grip portion 8 side, and a protruding guide may be provided on the holding portion 18 side. Yet alternatively, the guides 81*a*, 82*a*, 181*a*, and 182*a* may not necessarily need to be provided.

Further, in the above description, a screw is used to connect the grip portion 8 and the housing 10. However, a fixing structure for fixing the grip portion 8 to the housing 10 is not limited to this. Alternatively, for example, a latch portion (a hook) may be provided in either one of the grip portion 8 and the housing 10, a latched portion may be provided in the other, and the latch portion and the latched portion may be engaged together, thereby fixing the grip portion 8 to the housing 10. For example, the grip portion 8 may not be fixed to the holding portion 18 with a screw, and a latch portion (a hook) may be provided at the extremity of a guide used to fit the grip portion 8 to the holding portion 18. Thus, the grip portion 8 may be guided by the guide, and when the grip portion 8 is fitted all the way to the holding portion 18, the latch portion (the hook) may be caught by the latched portion of the holding portion 18. Yet alternatively, for example, a rubber member (or another cushioning buffer material, an elastic member, or the like) may be provided inside the grip portion 8 or outside the holding portion 18, and the grip portion 8 may be press-fitted to the holding portion 18, thereby fixing the grip portion 8 to the holding portion 18. Yet alternatively, for example, thread grooves may be provided in the grip portion 8 and the holding portion 18, and the grip portion 8 may be screwed to the holding portion 18, thereby fixing the grip portion 8 to the holding portion 18.

Further, the color and the material of the grip portion 8 may be the same as or different from those of the housing 10. For example, the grip portion 8 and the housing 10 may be formed of the same material and have the same color. Alternatively, the grip portion 8 and the housing 10 may be formed of the same material and have different colors. Yet alternatively, the grip portion 8 and the housing 10 may be formed of different materials and have the same color. For example, the grip portion 8 may be formed of a material softer than, or a material harder than, that of the housing 10.

Further, in the above description, the grip portion 8 covers the entirety of the holding portion 18. Alternatively, a part of the holding portion 18 may not be covered with the grip portion 8. For example, the grip portion 8 may cover at least a part of the boundary portion between the first housing 10a and the second housing 10b in the holding portion 18. Yet alternatively, the grip portion 8 may not cover the entire periphery of the holding portion 18, but may cover the boundary portion between the first housing 10a and the second housing 10b and cover at least a part of the outer periphery of the holding portion 18.

Further, in the above description, the left and right grip portions 8 are fitted to the housing 10 (the main body housing) of the game controller 1. Alternatively, for example, a grip portion as described above may be connected to a holding portion of a mobile game apparatus obtained by integrating a processing apparatus (a CPU or the like) for performing game processing and a display apparatus. In the mobile game apparatus, a main body housing including a holding portion may be formed by connecting a first housing and a second housing, and a grip portion for covering the holding portion may be provided. The grip portion is configured to at least cover a boundary portion between the first housing and the second housing in the holding portion.

Further, the above grip portion may be used not only in the two-handed game controller 1, but also in a one-handed controller. For example, in the one-handed controller, a main body housing including a holding portion may be formed by connecting a first housing and a second housing, and a grip portion for covering the holding portion may be provided. The grip portion is configured to at least cover a boundary portion between the first housing and the second housing in the holding portion of the one-handed controller.

[Description of NFC and Inner Substrates]

Next, the substrates within the game controller 1 are described. As shown in FIG. 5, within the housing 10, the first substrate 20 and the second substrate 40 are accommodated. The first substrate 20 is located on the front surface side of the game controller 1, and the second substrate 40 is located on the back surface side of the game controller 1. That is, the game controller 1 has a two-layer structure including the first substrate 20 and the second substrate 40.

Specifically, if the game controller 1 is viewed from the front (the front surface), the first substrate 20 and the second substrate 40 placed within the housing 10 overlap each other. That is, if the first substrate 20 and the second substrate 40 are projected (subjected to parallel projection) onto a plane parallel with the front surface of the game controller 1, the projected first substrate 20 overlaps at least a part of the projected second substrate 40. The first substrate 20 and the second substrate 40 are described below.

Figure 18A:
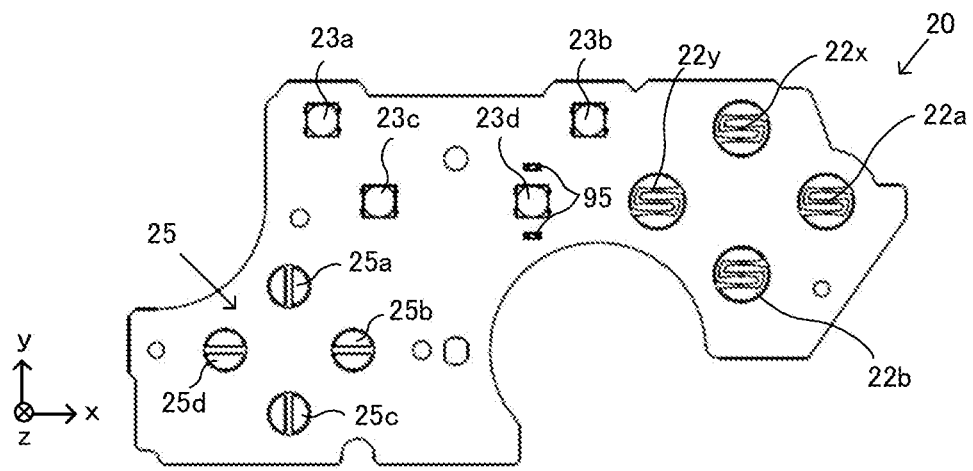
FIG. 18A is a front view of a non-limiting example of a first substrate 20.
Figure 18B:
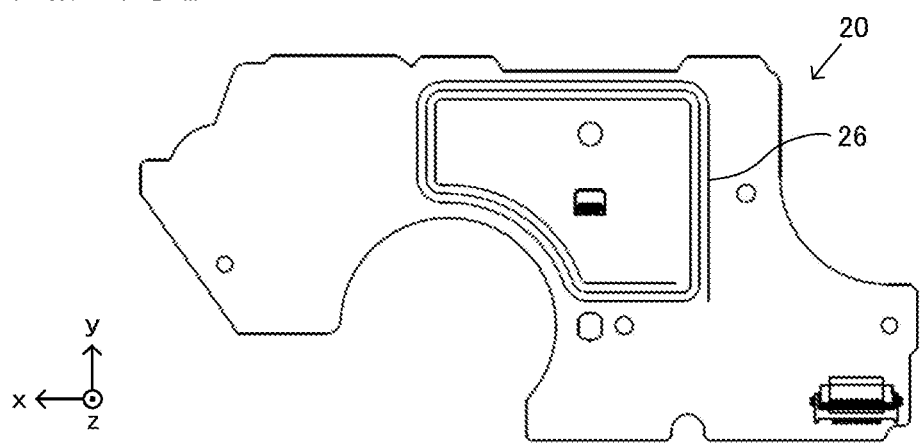
FIG. 18B is a rear view of a non-limiting example of the first substrate 20.

FIG. 18A is a front view of the first substrate 20. FIG. 18B is a rear view of the first substrate 20.

As shown in FIG. 18A, in a right region of the front surface of the first substrate 20, a switch (contact) 22a, which corresponds to the A-button 2a, a switch 22b, which corresponds to the B-button 2b, a switch 22x, which corresponds to the X-button 2x, and a switch 22y, which corresponds to the Y-button 2y, are placed. If the first substrate 20 is accommodated in the housing 10, the switch 22a, the switch 22b, the switch 22x, and the switch 22y are located immediately below the A-button 2a, the B-button 2b, the X-button 2x, and the Y-button 2y, respectively. For example, if the A-button 2a is pressed in the state where the first substrate 20 is accommodated in the housing 10, the switch 22a is also pressed, and the pressing of the A-button 2a is detected. The same applies to the B-button 2b, the X-button 2x, and the Y-button 2y.

Further, in a center region of the front surface of the first substrate 20, a switch 23a, which corresponds to the minus button 3a, a switch 23b, which corresponds to the plus button 3b, a switch 23c, which corresponds to the capture button 3c, and a switch 23d, which corresponds to the home button 3d, are provided. Further, above and below the switch 23d, which corresponds to the home button 3d, LEDs 95 are placed. The detailed structure of the home button 3d will be described later.

If the first substrate 20 is accommodated in the housing 10, the switch 23a, the switch 23b, the switch 23c, and the switch 23d are located immediately below the minus button 3a, the plus button 3b, the capture button 3c, and the home button 3d, respectively. For example, if the minus button 3a is pressed in the state where the first substrate 20 is accommodated in the housing 10, the switch 23a is also pressed, and the pressing of the minus button 3a is detected. The same applies to the plus button 3b, the capture button 3c, and the home button 3d.

Further, in a lower left region of the front surface of the first substrate 20, switches 25 (25a to 25d), which correspond to the directional pad 5, are placed. Specifically, the up direction of the directional pad 5 corresponds to the switch 25a, the right direction of the directional pad 5 corresponds to the switch 25b, the down direction of the directional pad 5 corresponds to the switch 25c, and the left direction of the directional pad 5 corresponds to the switch 25d. For example, if the up direction of the directional pad 5 is pressed, the switch 25a is also pressed, and the pressing of the up direction of the directional pad 5 is detected. The same applies to the other directions of the directional pad 5.

Meanwhile, as shown in FIG. 18B, in a center region of the back surface of the first substrate 20 (the surface on the back surface side of the game controller 1), an NFC antenna 26 is placed. The NFC antenna 26 is an antenna used for contactless communication. As the NFC antenna 26, a spiral antenna or a loop antenna is used.

Here, "contactless communication" in the present specification means a communication technique for performing communication at an extremely short distance (e.g., several centimeters to several tens of centimeters; typically, 10 centimeters or less). That is, "contactless communication" in the present specification does not mean a communication technique capable of performing communication even in a case where devices are several meters to several tens of meters away from each other, such as Bluetooth (registered trademark) or a wireless LAN, and means a communication technique for performing communication by holding an external storage device (an IC tag) over the apparatus. For example, contactless communication may be NFC (Near Field Communication) or RFID at the above extremely short distance. In the exemplary embodiment, it is assumed that contactless communication is NFC. It should be noted that not only the NFC standard but also another communication standard for performing contactless communication at the above extremely short distance may be used.

If the external storage device is present in a predetermined range in which the game controller 1 can perform communication, the game controller 1 can read data from the external storage device or write data to the external storage device. Typically, the predetermined range in which the game controller 1 can perform communication is within a region surrounded by the NFC antenna 26, and the distance from the NFC antenna 26 in the z-axis direction (both the positive and negative z-axis directions) shown in FIG. 18B is within the above extremely short distance. Even an external storage device that does not have a battery can communicate with the game controller 1. If the external storage device is placed in the predetermined range in which the game controller 1 can perform communication, an electromotive force is generated in the external storage device by an electromagnetic wave sent from the NFC antenna 26, and the game controller 1 can communicate with the external storage device. It should be noted that the external storage device may include a power supply and may be able to operate without an electromotive force from the game controller 1. It should be noted that the external storage device may be in any form such as a card, a figure having the shape of a predetermined character, an electronic device such as a mobile phone or a smartphone, or the like.

Figure 19:
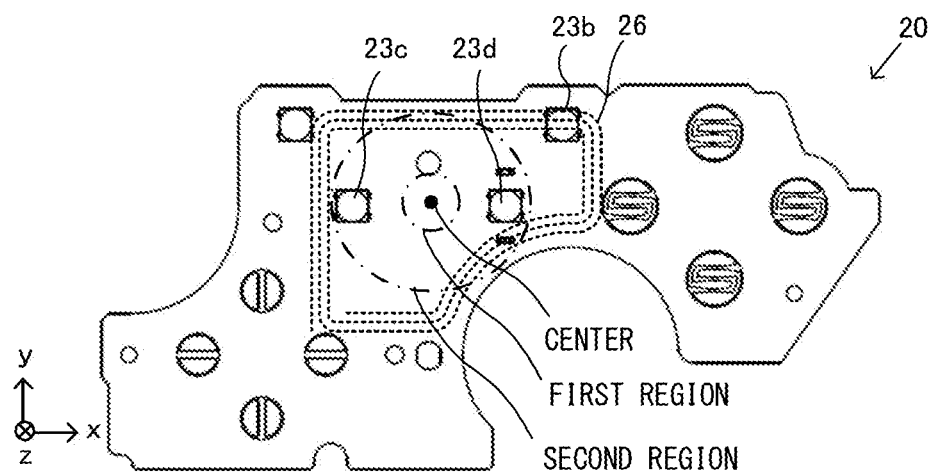
FIG. 19 is a front view of a non-limiting example of the first substrate 20 and a diagram showing a non-limiting example of the state where an NFC antenna 26 placed on a back surface of the first substrate 20 is projected onto a front surface of the first substrate 20.

FIG. 19 is a front view of the first substrate 20 and a diagram showing the state where the NFC antenna 26 placed on the back surface of the first substrate 20 is projected onto the front surface of the first substrate 20. In FIG. 19, the NFC antenna 26 placed on the back surface is indicated by a dashed line.

As shown in FIG. 19, in the region surrounded by the NFC antenna 26, the switch 23c, which corresponds to the capture button 3c, and the switch 23d, which corresponds to the home button 3d, are placed. That is, in a region on the front surface side corresponding to the region on the back surface side surrounded by the NFC antenna 26, the switch 23c, which corresponds to the capture button 3c, and the switch 23d, which corresponds to the home button 3d, are placed. In other words, if the game controller 1 is viewed from the front, the NFC antenna 26 (a region occupied by the NFC antenna 26) overlaps the capture button 3c and the home button 3d. Specifically, in a second region around a first region near the center of the region surrounded by the NFC antenna 26, the switch 23c, which corresponds to the capture button 3c, and the switch 23d, corresponds to the home button 3d, are provided.

Further, on the NFC antenna 26, the switch 23b, which corresponds to the plus button 3b, is placed. The other switches are placed outside the region surrounded by the NFC antenna 26.

If the external storage device (the IC tag) is placed in the region surrounded by the NFC antenna 26, the game controller 1 can communicate with the external storage device. Even if the external storage device is placed outside the region surrounded by the NFC antenna 26, the game controller 1 cannot communicate with the external storage device. It should be noted that "the region surrounded by the antenna" is a region including a portion on the line of the antenna and inside the antenna. Thus, if the external storage device is placed near (held over) the capture button 3c and the home button 3d, which are placed in the center portion of the game controller 1, the game controller 1 can read data stored in the external storage device or write data to the external storage device. On the other hand, even if the external storage device is placed on, for example, the A-button 2a, the B-button 2b, or the directional pad 5, the game controller 1 cannot communicate with the external storage device.

Figure 20:
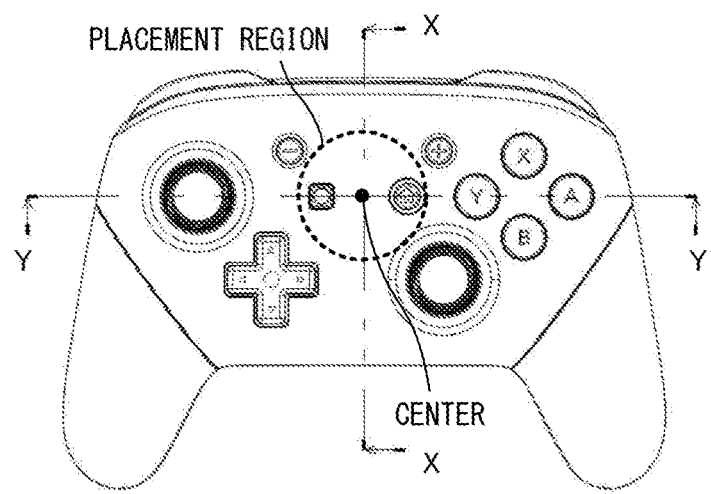
FIG. 20 is a diagram showing a non-limiting example of the position of the NFC antenna 26 in the game controller 1.

FIG. 20 is a diagram showing the position of the NFC antenna 26 in the game controller 1. A center shown in FIG. 20 indicates the center of the region surrounded by the NFC antenna 26 shown in FIG. 19. As shown in FIG. 20, the NFC antenna 26 is placed in the center in the left-right direction of the game controller 1.

As shown in FIG. 20, the capture button 3c and the home button 3d are placed in the center region of the front surface of the game controller 1, and a predetermined region including the positions of the buttons 3c and 3d is the region surrounded by the NFC antenna 26. Thus, the external storage device is placed in a region indicated by a dashed line in FIG. 20. This region has an approximately planar surface and is so shaped as to facilitate the placement of the external storage device. It should be noted that there is a case where even outside the region indicated by a dashed line in FIG. 20, the game controller 1 can communicate with the external storage device. For example, as shown in FIG. 19, a portion near the plus button 3b (the switch 23b) is included in the region surrounded by the NFC antenna 26. Thus, there is a case where even if the external storage device is placed near the plus button 3b, the game controller 1 can communicate with the external storage device. The region indicated by a dashed line including the center in FIG. 20, however, is a region where it is easiest to communicate with the external storage device.

Figure 21:
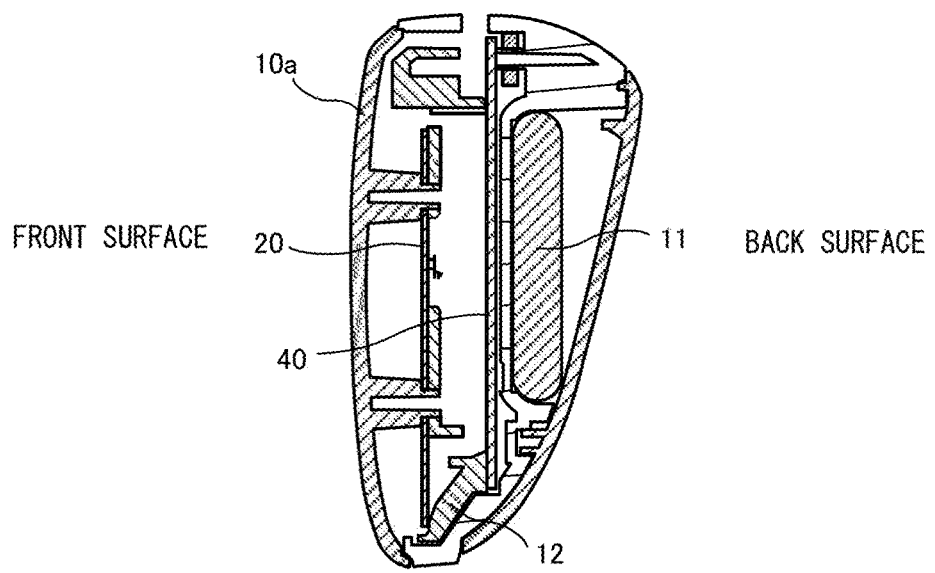
FIG. 21 is a non-limiting example of a cross-sectional view along a line X-X in FIG. 20.
Figure 22:
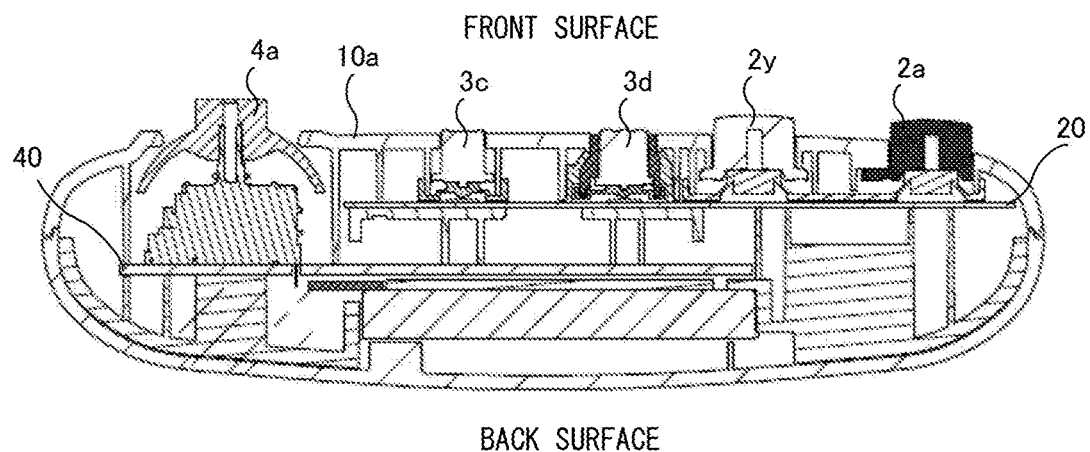
FIG. 22 is a non-limiting example of a cross-sectional view along a line Y-Y in FIG. 20.

FIG. 21 is a cross-sectional view along a line X-X in FIG. 20. FIG. 22 is a cross-sectional view along a line Y-Y in FIG. 20.

As shown in FIG. 21, the first substrate 20 is placed on the front surface side of the game controller 1. That is, the first substrate 20 is provided closer to the front surface than the center of the housing 10 in the front-back direction of the game controller 1 is. Thus, the NFC antenna 26 is placed at a position closer to the front surface of the game controller 1. Thus, if the external storage device is placed on the front surface side, it is easy for the game controller 1 to communicate with the external storage device.

Further, the second substrate 40 is placed on the back surface side of the game controller 1. To the side of the second substrate 40 closer to the back surface, a battery 11 is placed. Further, below the housing 10, a light-guiding member 12 for guiding light from an LED of the second substrate 40 is provided. The light-guiding member guides light from the LED to outside, and the LED 9 emits light.

As shown in FIG. 22, upper surfaces of the key tops of the capture button 3c and the home button 3d have substantially the same heights as that of the surface of the first housing 10a. Since the upper surfaces of the key tops of the capture button 3c and the home button 3d have substantially the same heights as that of the surface of the first housing 10a, even if the external storage device is placed on the capture button 3c and the home button 3d, the capture button 3c and the home button 3d are not pressed.

Here "the upper surface of the key top has substantially the same height as that of the surface of the housing" means such a height that even if the external storage device is placed on the key top, the button is not pressed (such a height that the pressing of the button is not detected). That is, if the external storage device is placed on the capture button 3c and the home button 3d, the upper surfaces of the key tops of the capture button 3c and the home button 3d may be slightly higher than the surface of the first housing 10a insomuch that the capture button 3c and the home button 3d are not pressed (insomuch that the pressing of the capture button 3c and the home button 3d is not detected).

It should be noted that the upper surfaces of the key tops of the capture button 3c and the home button 3d may be lower than the surface of the first housing 10a.

On the other hand, the key tops of the Y-button 2y and the A-button 2a (the same applies to the B-button 2b and the X-button 2x) protrude further upward than the surface of the first housing 10*a*. If the external storage device is placed on the Y-button 2*y*, the Y-button 2*y* is pressed by the external storage device.

Further, as is clear from FIGS. 22, 2, and the like, the capture button 3*c* and the home button 3*d* are smaller than the Y-button 2*y*, the A-button 2*a*, and the like.

Figure 23:
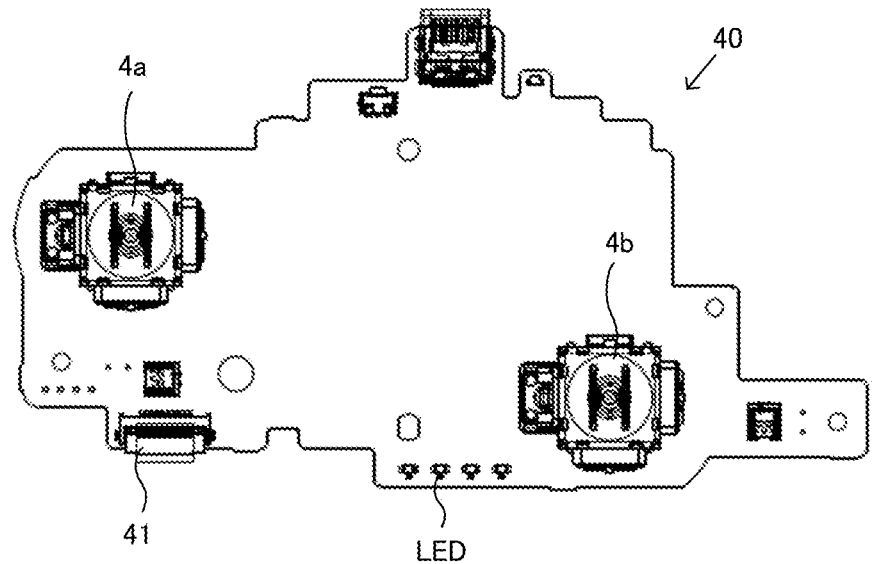
FIG. 23 is a front view of a non-limiting example of a second substrate 40.

FIG. 23 is a front view of the second substrate 40. As shown in FIG. 23, on the front surface of the second substrate 40 (the surface on the front surface side of the game controller 1), the left analog stick 4*a* is placed on the left side, and the right analog stick 4*b* is placed on the right side. Further, near the lower end in the center in the left-right direction of the second substrate 40, four LEDs are placed. Further, below the left analog stick 4*a*, a connection portion 41 is placed. The first substrate 20 and the second substrate 40 are connected together via the connection portion 41.

Figure 24:
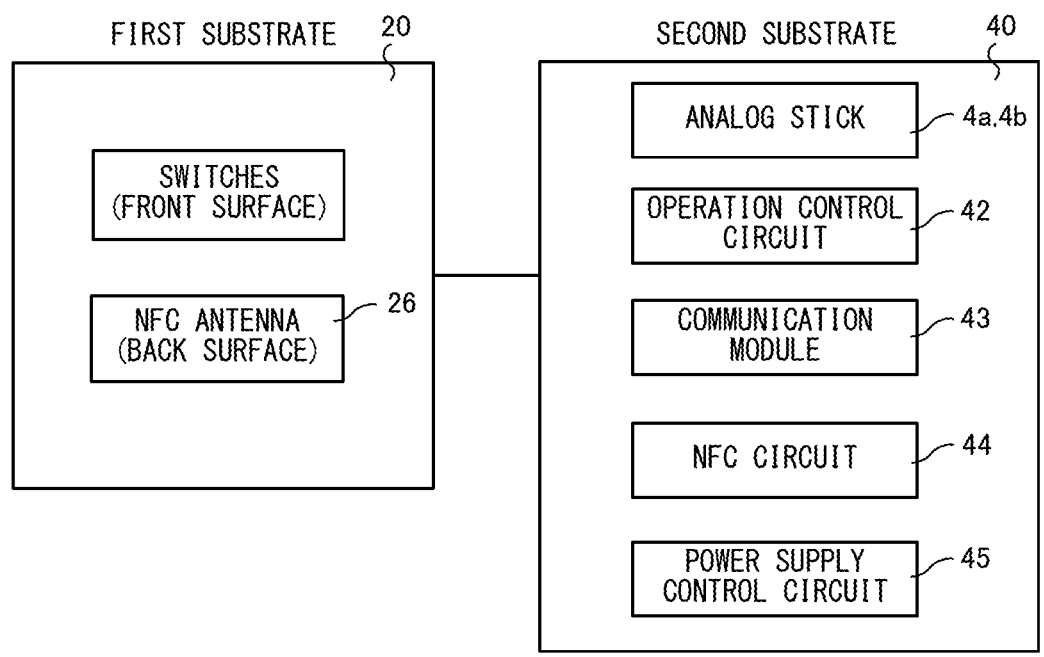
FIG. 24 is a block diagram showing a non-limiting example of the functional configurations of the first substrate 20 and the second substrate 40.

FIG. 24 is a block diagram showing an example of the functional configurations of the first substrate 20 and the second substrate 40. As shown in FIG. 24, in the second substrate 40, in addition to the analog sticks 4*a* and 4*b*, various control circuits for controlling the game controller 1 are provided. For example, in the second substrate 40, as control circuits, an operation control circuit 42 for generating and packetizing operation data indicating whether or not each of the buttons (2*a*, 2*b*, 2*x*, 2*b*, 3*a* to 3*d*, 5, 6*a*, 6*b*, 7*a*, and 7*b*) is pressed, a communication module (a communication circuit and an antenna) 43 for transmitting the operation data to the game apparatus 100, an NFC circuit 44 for controlling NFC communication, a power supply control circuit 45 for controlling power supply, and the like are placed.

Each switch placed on the first substrate 20 is connected to the operation control circuit 42. If each switch placed on the first substrate 20 is pressed, a signal corresponding to the pressing of the switch flows through the second substrate 40. As a result, the operation control circuit 42, which is placed on the second substrate 40, generates and packetizes operation data. Then, the operation data is output to the game apparatus 100 via the communication module. Further, the NFC circuit 44 controls the emission of a radio wave using the NFC antenna 26, the reading of data from the external storage device, the writing of data to the external storage device, and the like.

As described above, the game controller 1 includes the first substrate 20 and the second substrate 40, whereby it is possible to provide a controller with more functions without making the controller itself large. That is, if viewed from from the front surface (or the back surface) of the game controller 1, the first substrate 20 and the second substrate 40 overlap each other. Since the substrates thus have a two-layer structure, it is not necessary to increase the areas of the substrates, and it is possible to make the game controller 1 small. Further, the NFC antenna 26 is placed on, between the first substrate 20 and the second substrate 40, the first substrate 20 on the front surface side, whereby it is possible to shorten the distance between the surface of the housing 10 on the front surface side and the NFC antenna 26. This makes it possible to shorten the distance from the external storage device and facilitate communication with the external storage device.

Further, a switch is placed on the front surface of the first substrate 20, and the NFC antenna 26 is placed on the back surface of the first substrate 20 and at the position where the switch is placed, whereby it is possible to place a button in a region where the external storage device is to be placed (held over). This makes it possible to provide the game controller 1 with an NFC communication function and also place various buttons. Normally, to prevent an erroneous operation when the external storage device is read, a reading region (an antenna) for reading the external storage device is placed at the position where no button is provided. In this case, however, the game controller becomes large. In the exemplary embodiment, the upper surface of a button is low, whereby it is possible to prevent an erroneous operation on the button and also place a reading region (an antenna) at the position of the button. This can save space. That is, the upper surface of the button is low, whereby it is possible to solve the problem of an erroneous operation on the button in a case where the button and the reading region for the external storage device are placed so as to overlap each other, and it is possible to make the game controller small. Further, the smaller the area of the NFC antenna, the smaller the range where the game controller can perform communication. Thus, some size is required. If the NFC antenna 26 is placed on a single substrate, it is difficult to place another circuit in the region surrounded by the NFC antenna 26. Thus, in a case where the NFC antenna 26 is placed on a single substrate, and various buttons are placed, the substrate becomes large. Conversely, if various buttons are placed without making the substrate large, the region for the NFC antenna 26 becomes small. In the exemplary embodiment, the substrates have a two-layer structure, and the NFC antenna 26 is placed in the first substrate 20, while a control circuit is placed on the second substrate 40. Thus, it is possible to separate the NFC antenna 26 from another circuit. This increases the degree of freedom for design. Further, switches for operation buttons are provided on the front surface of the first substrate 20, and the NFC antenna 26 is provided on the back surface, whereby it is possible to place the NFC antenna 26, regardless of the positions of the operation buttons.

Further, in the exemplary embodiment, the analog sticks 4*a* and 4*b* are placed on the second substrate 40 on the back surface side. Each analog stick is used to input a direction by tilting an operation section of the analog stick and therefore requires some height. Thus, if the second substrate 40 including the analog sticks is placed on the front surface side of the game controller 1, the thickness of the game controller 1 increases. In the exemplary embodiment, the second substrate 40 is placed on the back surface side of the game controller 1, whereby it is possible to configure the game controller 1 to be thin. Further, the analog sticks 4*a* and 4*b* are mounted on a substrate (the second substrate 40) and integrated with the substrate, whereby it is possible to reduce the number of components as compared with a case where the analog sticks 4*a* and 4*b* are separate components.

Further, the substrates have a two-layer structure, and the NFC antenna 26 is placed on the first substrate 20 at a position close to the front surface of the housing 10, thereby increasing the degree of freedom for placing the second substrate 40. For example, it is possible to place the second substrate 40 in accordance with the heights of the analog sticks. It should be noted that the analog sticks may be mounted on yet another substrate different from the second substrate 40.

It should be noted that the above configuration of the game controller 1 may be applied not only to the two-handed game controller 1, but also to a one-handed controller. For example, the one-handed controller may include a first substrate on the front surface side of the controller and a second substrate on the back surface side of the controller. A switch for a button may be provided on the front surface of the first substrate (the surface on the front surface side of the controller), and an NFC antenna may be provided on the back surface of the first substrate. The switch on the front surface of the first substrate is provided in a region corresponding to a region surrounded by the NFC antenna provided on the back surface of the first substrate. Further, the one-handed controller may include an analog stick, and the analog stick may be provided on the second substrate.

[Description of Vibration Motor]

Figure 25:
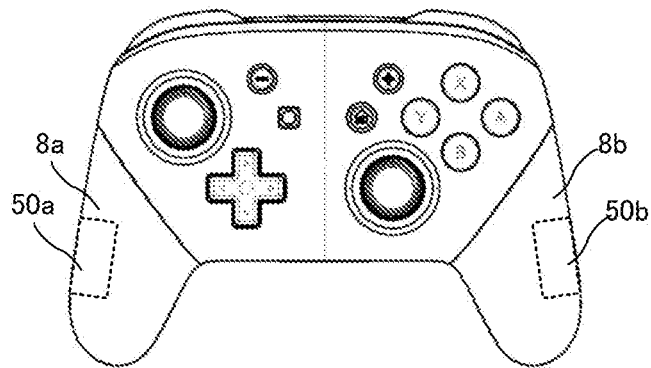
FIG. 25 is a diagram schematically showing a non-limiting example of a vibration motor provided in the grip portion 8 of the game controller 1.

Next, a vibration motor provided in the game controller 1 is described. FIG. 25 is a diagram schematically showing a vibration motor provided in the grip portion 8 of the game controller 1. It should be noted that hereinafter, vibration motors 50a and 50b will be collectively referred to as a "vibration motor 50".

As shown in FIG. 25, within the grip portions 8a and 8b of the game controller 1, the vibration motors 50a and 50b, respectively, are placed. Within the grip portion 8a, the vibration motor 50a is placed on the left side in the left-right direction of the game controller 1. Further, within the grip portion 8b, the vibration motor 50b is placed on the right side in the left-right direction of the game controller 1. That is, the vibration motor 50 is provided on the side of the grip portion 8 that the hand of the user hits.

Figure 26:
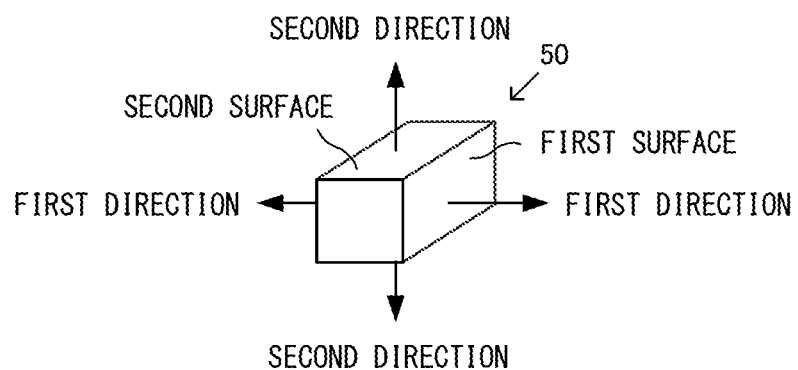
FIG. 26 is a diagram illustrating a non-limiting example of the vibration directions of a vibration motor 50.

FIG. 26 is a diagram illustrating the vibration directions of the vibration motor 50. As shown in FIG. 26, the vibration motor 50 has an approximately cuboid shape having a first surface and a second surface orthogonal to each other. The vibration motor 50 can vibrate in a first direction (the left-right direction) perpendicular to the first surface and can also vibrate in a second direction (the up-down direction) perpendicular to the first direction. That is, the vibration motor 50 is a vibration motor termed a so-called "linear vibration actuator" (or "linear vibration motor"). Specifically, the vibration motor 50 is configured to linearly vibrate in the first direction at a first resonance frequency and linearly vibrate in the second direction at a second resonance frequency different from the first resonance frequency. For example, the first resonance frequency may be 320 Hz, and the second resonance frequency may be 160 Hz.

Figure 27:
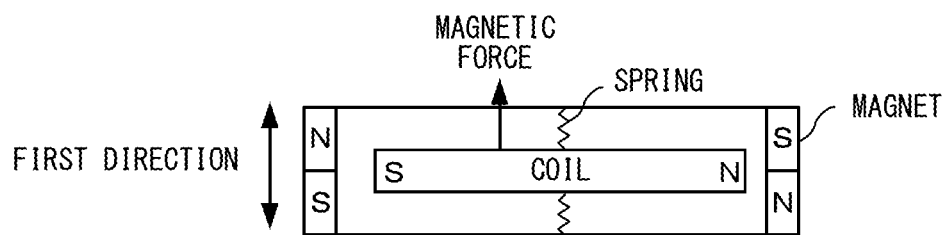
FIG. 27 is a diagram schematically showing a non-limiting example of the operating principle of the vibration motor 50.

Here, the operating principle of the vibration motor 50 is briefly described. FIG. 27 is a diagram schematically showing the operating principle of the vibration motor 50. As shown in FIG. 27, the vibration motor 50 includes a coil, magnets, and springs. A current is applied to the coil, whereby a magnetic force is generated in the up direction, and the coil moves in the up direction. Then, the coil moves in the down direction by the reaction force of the springs. This action is repeated, whereby the vibration motor 50 vibrates at a predetermined resonance frequency in the up-down direction in FIG. 27. In the vibration motor 50, the springs have two resonance frequencies. The vibration motor 50 is configured to vibrate at different resonance frequencies in the up-down direction in FIG. 27 and in a direction perpendicular to the paper in FIG. 27. It should be noted that the vibration motor 50 can also vibrate in an oblique direction by a combined wave obtained by combining a vibration in the first direction and a vibration in the second direction.

Figure 28:
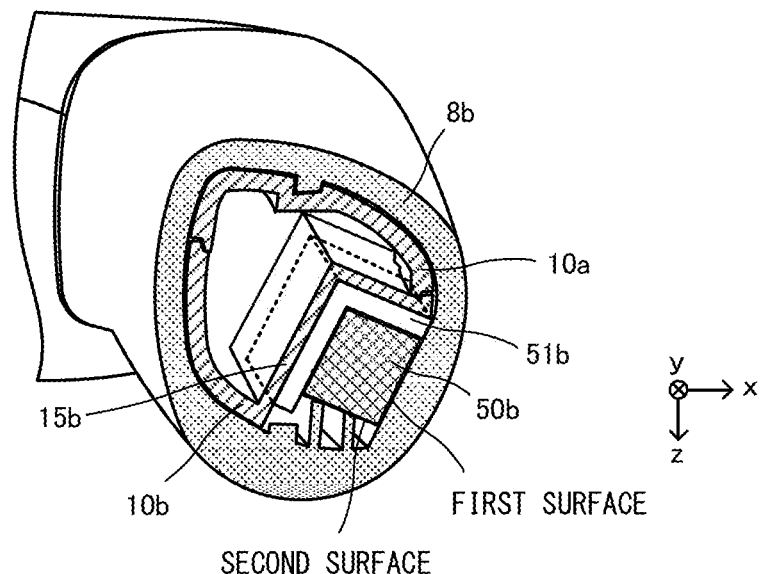
FIG. 28 is a cross-sectional view of a non-limiting example of the grip portion 8b, into which the vibration motor 50b is built, and is a diagram showing a non-limiting example of the internal structure of the grip portion 8b.
Figure 29:
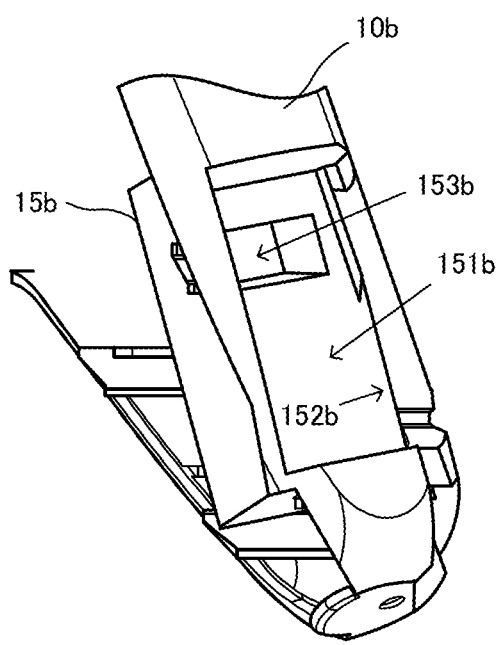
FIG. 29 is a diagram showing a non-limiting example of a second housing 10b on the back surface side of the game controller 1 and is an enlarge view of a non-limiting example of a portion of a second holding portion 18b on the right side of the second housing 10b.
Figure 30:
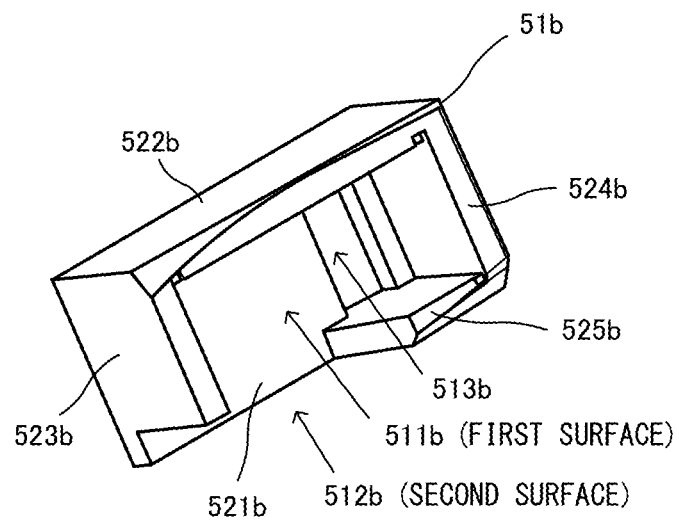
FIG. 30 is a diagram showing a non-limiting example of a holder 51b for fixing the vibration motor 50b within the housing 10.

FIG. 28 is a cross-sectional view of the grip portion 8b, into which the vibration motor 50b is built, and is a diagram showing an example of the internal structure of the grip portion 8b. FIG. 29 is a diagram showing an example of the second housing 10b on the back surface side of the game controller 1 and is an enlarged view of a portion of the second holding portion 18b on the right side of the second housing 10b. FIG. 29 is a diagram showing the second holding portion 18b of the second housing 10b as viewed from the direction of the right side surface. FIG. 30 is a diagram showing an example of a holder 51b for fixing the vibration motor 50b within the housing 10.

As shown in FIG. 28, inside the grip portion 8b, the vibration motor 50b is provided. Specifically, the vibration motor 50b is accommodated in the holder 51b. The holder 51b is used to fix the vibration motor 50b within the housing 10 and is formed of an elastic material likely to absorb the vibration of the vibration motor 50b. For example, the holder 51b is composed of a relatively soft material (a material softer than that of the housing 10) such as a silicon rubber or a synthetic rubber. For example, the material of the holder 51b may be ABS resin. In contrast, the housing 10 (the first housing 10a and the second housing 10b) is composed of a relatively hard material. The holder 51b is fitted (press-fitted) to a vibration motor fixing portion 15b (see FIG. 29), which is a part of the second housing 10b, and is fixed.

As shown in FIGS. 28 and 29, the vibration motor fixing portion 15b has an approximately cuboid shape and includes an opening portion 151b on the right side of the game controller 1, an opening portion 152b on the back surface side of the game controller 1, and an opening portion 153b on the center side of the game controller 1. The vibration motor fixing portion 15b is configured to be of approximately the same size as that of the holder 51b or slightly smaller than the holder 51b. The holder 51b is press-fitted to the vibration motor fixing portion 15b, thereby fixing the holder 51b to the second housing 10b.

As shown in FIG. 30, the holder Mb has an approximately cuboid shape and includes a surface 521b (a surface on the far side in FIG. 30), a surface 522b (a surface on the upper side in FIG. 30), a surface 523b (a surface on the left side in FIG. 30), a surface 524b (a surface on the right side in FIG. 30), and a surface 525b (a surface on the lower side in FIG. 30). Further, a surface on the near side opposed to the surface 521b on the far side of the holder 51b is open (an opening portion 511b in FIG. 30). Further, a part of a surface on the lower side opposed to the surface 522b on the upper side of the holder 51b is open (an opening portion 512b in FIG. 30). The opening portion 511b of the holder 51b is a portion corresponding to the first surface of the vibration motor 50b. The opening portion 512b of the holder 51b is a portion corresponding to the second surface of the vibration motor 50b. That is, if the vibration motor 50b is fitted to the holder 51b, the first surface of the vibration motor 50b is exposed through the opening portion 511b, and the second surface of the vibration motor 50b is exposed through the opening portion 512b. Further, a part of the surface 521b of the holder 51b is open (an opening portion 513b). The opening portion 513b of the holder 51b is configured to, if the holder 51b is fitted to the vibration motor fixing portion 15b of the second housing 10b, coincide with the opening portion 153b of the vibration motor fixing portion 15b. The opening portion 513b of the holder Mb and the opening portion 153b of the vibration motor fixing portion 15b are opening portions through which to pass the wiring of the vibration motor 50b.

Figure 31:
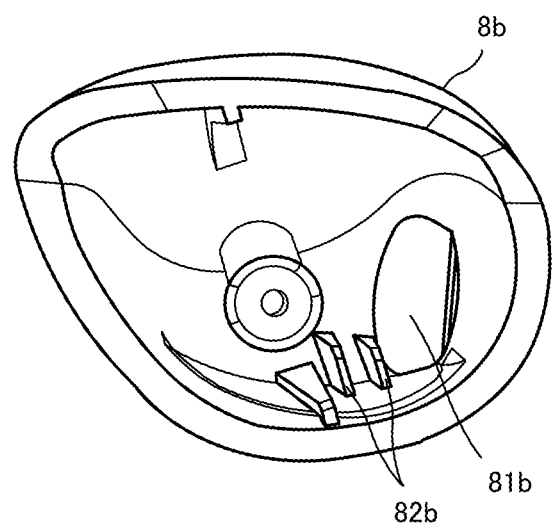
FIG. 31 is a diagram showing a non-limiting example of the internal configuration of the grip portion 8b.

FIG. 31 is a diagram showing an example of the internal configuration of the grip portion 8b. As shown in FIG. 31, on the right side within the grip portion 8b, a surface 81b is provided. Further, on the lower side within the grip portion 8b, two protruding ribs 82b are provided. The surface 81b is an approximately planar surface and is inclined at a predetermined angle when the grip portion 8b is viewed from the direction in FIG. 31. This is to facilitate the pulling out of the grip portion 8b from a mold in the process of manufacturing the grip portion 8b. For example, the surface 81b has a slope at several degrees with respect to the pull-out direction. The surface 81*b* comes into contact with the first surface of the vibration motor 50*b*. Further, the ribs 82*b* come into contact with the second surface of the vibration motor 50*b*. It should be noted that a portion of the grip portion 8*b* that comes into contact with the second surface of the vibration motor 50*b* may not be ribs, and may be an approximately planar surface as in the surface 81*b*.

With such a configuration, as shown in FIG. 28, if the vibration motor 50*b* is fixed within the housing 10, the first surface of the vibration motor 50*b* comes into direct contact with the surface 81*b* on the right side of the grip portion 8*b*. Further, the second surface of the vibration motor 50*b* comes into direct contact with the ribs 82*b* on the lower side of the grip portion 8*b*. That is, the vibration motor 50*b* comes into direct contact with the grip portion 8*b* on the first surface (a surface corresponding to the first direction in which the vibration motor 50*b* vibrates at the first resonance frequency) and the second surface (a surface corresponding to the second direction in which the vibration motor 50*b* vibrates at the second resonance frequency) of the vibration motor 50*b*. Meanwhile, since the surface of the vibration motor 50*b* opposed to the housing 10 (10*b*) is surrounded by the holder Mb, the vibration motor 50*b* does not come into direct contact with the housing 10, but comes into contact with the housing 10 through the holder 51*b*.

Here, a thin sheet (e.g., a sheet having a thickness of about 0.1 mm) may be sandwiched between the first surface and the second surface of the vibration motor 50*b* and the grip portion 8*b*. That is, "the first surface and the second surface of the vibration motor 50*b* come into direct contact with the grip portion 8*b*" also includes a case where a thin sheet (e.g., a sheet having a thickness of about 0.1 to 1 mm) is present between the first surface and the second surface of the vibration motor 50*b* and the grip portion 8*b*. Such a sheet is used to bring the vibration motor into firm contact with the housing 10 to prevent rattling, and is not used to make the vibration of the vibration motor 50*b* less likely to be transmitted to the grip portion 8*b*. On the other hand, the holder 51*b* is formed of a material softer and thicker than that of the sheet. Thus, the vibration of the vibration motor 50*b* is less likely to be transmitted to the grip portion 8*b*.

It should be noted that the grip portion 8*a* on the left side is also symmetrical with the grip portion 8*b* on the right side and is also similar to the grip portion 8*b* on the right side. That is, also in the grip portion 8*a* on the left side, similarly to the right side, the vibration motor 50*a* and a holder 51*a* are provided. The vibration motor 50*a* vibrates in a first direction and a second direction, comes into direct contact with the grip portion 8*a* on a first surface corresponding to the first direction and a second surface corresponding to the second direction, and comes into contact with the housing 10 through the holder 51*a*.

As described above, the vibration motor 50 is brought into direct contact with the grip portion 8 on the first surface corresponding to the first direction and on the second surface corresponding to the second direction, whereby it is possible to make the vibration of the vibration motor 50 likely to be transmitted to the grip portion 8, and it is possible to make the vibration likely to be transmitted to the hand of the user in contact with the grip portion 8. That is, it is possible to cause the user to feel more vibration. Meanwhile, the vibration motor 50 comes into contact with the housing 10 through the holder 51. The holder 51 is formed of a relatively soft material and therefore is likely to absorb the vibration of the vibration motor 50. Thus, the vibration of the vibration motor 50 is less likely to be transmitted to the housing 10. Thus, for example, it is possible to make the vibration of the vibration motor 50*b* on the right side less likely to be transmitted to the grip portion 8*a* on the left side. Thus, it is possible to impart a vibration only to the right hand of the user, or impart vibrations in different vibration patterns to the left and right hands. Further, it is possible to prevent the vibrations of the left and right vibration motors from being mixed with each other and separate the vibration on the left and the vibration on the right from each other.

Further, in the exemplary embodiment, the vibration motor 50 has two different resonance frequencies. Thus, it is possible to impart two vibrations different in feeling to the user and make representations in various vibration patterns.

Further, as shown in FIG. 28, the first surface of the vibration motor 50 comes into contact with the inside of the right side surface of the grip portion 8*b*. Further, the second surface of the vibration motor 50 comes into contact with the inside of the back surface of the grip portion 8*b* (a surface on the lower side in FIG. 28).

The first direction, which is the vibration direction of the vibration motor 50, is the substantial left-right direction of the game controller 1 (the x-axis direction). As shown in FIG. 4, if the user holds the game controller 1 with both hands, for example, the right side surface of the grip portion 8*b* hits an approximate center portion of the palm of the right hand of the user. Thus, the first direction, which is the vibration direction of the vibration motor 50*b*, is approximately perpendicular to the palm of the user. Thus, the vibration in the first direction is likely to be transmitted to the palm of the user.

Further, the second direction, which is the vibration direction of the vibration motor 50, is the substantial front-back direction of the game controller 1 (the z-axis direction: the up-down direction in FIG. 28). As shown in FIG. 4, if the user holds the game controller 1 with both hands, the back surface of the grip portion 8 hits the middle finger, the third finger, and the little finger of the user. Thus, the second direction, which is the vibration direction of the vibration motor 50, is approximately perpendicular to the middle finger, the third finger, and the little finger of the user. Thus, the vibration in the second direction is likely to be transmitted to the fingers of the user.

In the exemplary embodiment, the resonance frequency in the second direction is lower than the resonance frequency in the first direction. This makes it possible to cause the user to feel different types of vibrations. In the exemplary embodiment, the first surface of the vibration motor 50*b* comes into contact with the inside of the right side surface of the grip portion 8*b*, and the second surface of the vibration motor 50*b* comes into contact with the inside of the lower side surface of the grip portion 8*b*. Thus, a vibration having a high resonance frequency is likely to be transmitted to the right side surface of the grip portion 8*b*, and a vibration having a low resonance frequency is likely to be transmitted to the lower side surface of the grip portion 8*b*. The right side surface of the grip portion 8*b* hits the center portion of the palm of the user, and the lower side surface of the grip portion 8*b* hits the finger of the user. Thus, it is possible to impart a vibration having a high resonance frequency to the center portion of the palm of the user and impart a vibration having a low resonance frequency to the finger of the user. As described above, resonance frequencies are different between the first direction and the second direction, whereby it is possible to impart vibrations having different frequencies to portions of the hand of the user. It should be noted that the resonance frequency in the second direction may be higher than the resonance frequency in the first direction.

Further, in the exemplary embodiment, as shown in FIG. 28, the grip portion 8b is formed such that the thickness of the right side surface of the grip portion 8b is thinner than that of the lower surface of the grip portion 8b. That is, the grip portion 8 includes a first portion (a right side surface portion) and a second portion (a lower surface portion), which is thicker than the first portion. The first surface of the vibration motor 50 comes into contact with the first portion of the grip portion 8. The vibration motor 50 comes into contact with the thinner first portion of the grip portion 8. Thus, the vibration in the first direction is more likely to be transmitted to the hand of the user.

It should be noted that the above configuration is merely illustrative. Alternatively, another configuration may be employed. For example, the vibration motor 50 (the holder 51) is fixed to the second housing 10b on the back surface side, but may be fixed to the first housing 10a. Alternatively, the vibration motor 50 may be fixed by being sandwiched between the first housing 10a and the second housing 10b. Further, the vibration motor 50 may be fixed not to the second housing 10b but to the grip portion 8. In a case where the vibration motor 50 is fixed to the grip portion 8, it is possible to prevent the vibration motor 50 from coming into direct or indirect contact with the housing 10.

Further, as a configuration for making the vibration of the vibration motor 50 less likely to be transmitted to the housing 10, a rib (a protruding portion) may be provided inside the holder 51 (a surface with which the vibration motor 50 comes into contact), thereby making the vibration of the vibration motor 50 likely to attenuate.

Further, when the holder 51 is fixed to the second housing 10b, a floating structure may be employed, in which the second housing 10b does not come into contact with the entirety of four surfaces of the holder 51 (four surfaces except for the opening portions), and the holder 51 comes into partial contact with the second housing 10b. For example, a plurality of ribs (protruding portions) may be provided in the second housing 10b, and the holder 51 may be fixed to the second housing 10b such that the holder 51 is spaced from the second housing 10b.

Further, in the above exemplary embodiment, the surface 81b is placed on the right side of the inner surface of the grip portion 8b, and the ribs 82b are placed on the lower side of the inner surface of the grip portion 8b. Alternatively, the ribs 82b may be placed on the right side, and the surface 81b may be placed on the lower side. Alternatively, surfaces may be provided on both the right side and the lower side. That is, both two surfaces of the grip portion 8 that come into contact with the vibration motor 50 may be planar surfaces, or may have ribs. Alternatively, one of the two surfaces may have ribs, and the other may be a planar surface.

Further, in the above exemplary embodiment, the structure is such that the vibration motor 50b comes into direct contact with the right side (the side surface side of the game controller 1) and the lower side of the grip portion 8b. Alternatively, the structure may be such that the vibration motor 50b comes into direct contact with the left side of the grip portion 8b (the center side of the game controller 1).

Further, in the game controller 1, the vibration motors 50 are provided in the left and right grip portions 8, and another vibration motor may also be provided within the main body of the housing 10 (within the housing 10 in which the substrates and the like are placed). This vibration motor provided within the main body of the housing 10 may be a vibration motor for vibrating in the first direction and the second direction similarly to the vibration motors 50 provided in the grip portions 8, or may be a vibration motor for vibrating only in a single direction, or may be an eccentric vibration motor.

Further, in the above exemplary embodiment, a single vibration motor 50 capable of vibrating in the first direction and the second direction is used. Alternatively, in another exemplary embodiment, a vibration motor for vibrating only in the first direction and a vibration motor for vibrating only in the second direction may be combined, thereby enabling vibrations in the first direction and the second direction.

Further, in the above exemplary embodiment, in a case where the vibration motor vibrates in the left-right direction (the x-axis direction) and the front-back direction (the z-axis direction), i.e., directions approximately perpendicular to the surfaces of the game controller 1 that come into contact with the hand of the user, the user is more likely to feel vibrations at their hand than in a case where the vibration motor vibrates in the up-down direction (the y-axis direction). Thus, the vibration motor vibrates substantially in the left-right direction and the front-back direction (see FIG. 28). In another exemplary embodiment, the vibration motor may vibrate in the substantial up-down direction of the game controller 1 (the y-axis direction: the longitudinal direction of the grip portion 8).

Further, the vibration motor described above may be provided not only in the two-handed game controller 1, but also in a one-handed controller. For example, the one-handed controller may include a portion to be held by the user, and a vibration motor is placed in the portion to be held. The vibration motor can vibrate at different resonance frequencies in a first direction and a second direction, and is configured to come into direct contact with a housing on a first surface corresponding to the first direction and a second surface corresponding to the second direction.

[Details of Structure of Home Button]

Next, the detailed structure of the home button 3d is described. It should be noted that the housing 10 of the game controller 1 according to the exemplary embodiment is transparent or white, for example. The home button 3d is configured such that the periphery of the button emits light. A description is given below of the structure for causing the periphery of the home button 3d to emit light.

Figure 32:
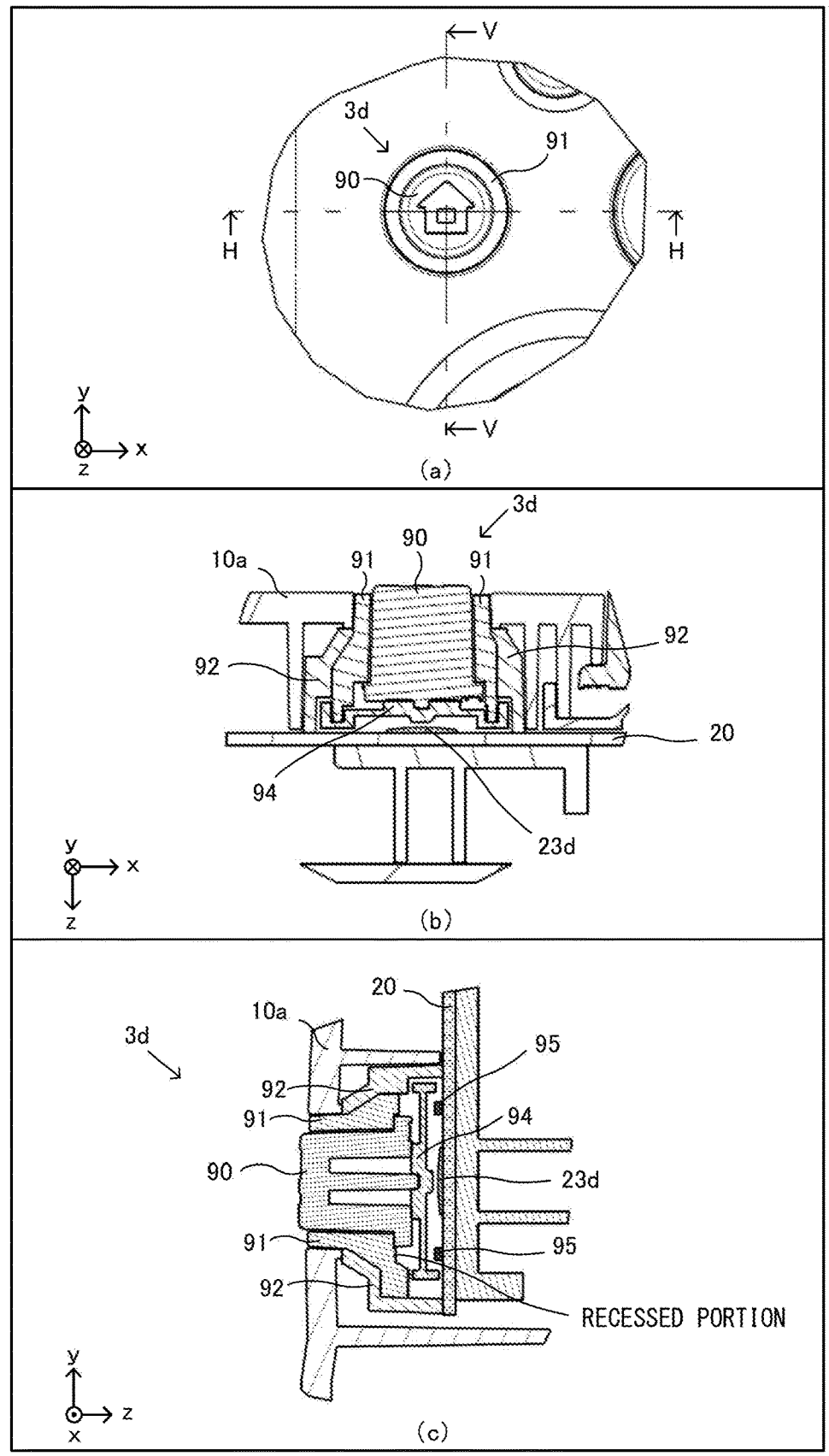
FIG. 32 is a diagram showing a non-limiting example of the structure of a home button 3d.

FIG. 32 is a diagram showing an example of the structure of the home button 3d. (a) of FIG. 32 is a partially enlarged view of the home button 3d. (b) of FIG. 32 is a cross-sectional view along a line H-H in (a) of FIG. 32. (c) of FIG. 32 is a cross-sectional view along a line V-V in (a) of FIG. 32.

As shown in FIG. 32, the home button 3d includes a key top 90, which is pressed by the user, and a light-guiding portion 91, which surrounds the periphery of the key top 90. The key top 90 has a columnar shape and is a member through which light cannot pass. The light-guiding portion 91 is a cylindrical member surrounding the outer periphery of the key top 90. It should be noted that the "cylindrical member" as used herein also includes a ring-shaped member. The light-guiding portion 91 is formed of a material through which light can pass, and guides light incident thereon to the surface of the housing 10 while diffusing the light.

As shown in (b) and (c) of FIG. 32, the outer periphery of the light-guiding portion 91 is surrounded by the cylindrical light-shielding portion 92. The light-shielding portion 92 is a member through which light cannot pass.

Immediately below the key top 90 of the home button 3d, the switch 23d is placed. Between the key top 90 and the switch 23*d*, an elastic member 94 is provided. The elastic member 94 is formed of a rubber-like material through which light can pass.

Further, below the elastic member 94, two LEDs 95 are provided on the first substrate 20, on which the switch 23*d* is provided. The two LEDs 95 are placed at positions below the elastic member 94 and overlapping the elastic member 94 (positions covered with the elastic member 94). Specifically, the two LEDs 95 are placed inside a region surrounded by the light-shielding portion 92 and are placed immediately below the light-guiding portion 91. The two LEDs 95 are placed symmetrically in the up-down direction (in the y-axis direction) with respect to the key top 90 ((c) of FIG. 32 or FIG. 18A).

The elastic member 94 pushes up the key top 90 in the up direction (the direction of the front surface of the game controller 1: the negative z-axis direction). If the key top 90 is pressed downward, the key top 90 pushes down the elastic member 94, the force of the pushing down deforms the elastic member 94, and the switch 23*d* is pressed through the elastic member 94. Even if the key top 90 is pressed, the light-guiding portion 91 and the light-shielding portion 92 around the key top 90 are not pushed down.

As shown in (b) and (c) of FIG. 32, an upper surface of the key top 90 and an upper surface of the light-guiding portion 91 are exposed through the surface of the housing 10. The upper surface of the key top 90 and the upper surface of the light-guiding portion 91 have substantially the same heights as that of the surface of the housing 10. Specifically, the upper surface of the key top 90, which is pressed by the user, is slightly higher than the surface of the housing 10 and is slightly higher than the upper surface of the light-guiding portion 91.

On the other hand, an upper surface of the light-shielding portion 92 is lower than the upper surface of the key top 90 and the upper surface of the light-guiding portion 91 and is not exposed through the surface of the housing 10. It should be noted that the upper surface of the light-shielding portion 92 may be exposed through the surface of the housing 10.

Light emitted from the two LEDs 95 passes through the elastic member 94, is incident on the light-guiding portion 91 immediately above the LEDs 95, passes through the inside of the light-guiding portion 91, and is guided to the surface of the first housing 10*a*. The light-guiding portion 91 is surrounded by the light-shielding portion 92, through which light cannot pass. Further, the key top 90 does not allow light to pass therethrough, either. Thus, if the two LEDs 95 emit light, the light-guiding portion 91 around the key top 90 emits light on the surface of the first housing 10*a*, and the light does not come out to the periphery of the light-guiding portion 91. Thus, even if the housing 10 is composed of a transparent member, a white member that makes light likely to pass therethrough, or the like, it is possible to cause only the periphery of the key top 90 to emit light in a ring-shaped manner.

As shown in (c) of FIG. 32, in a portion of the light-guiding portion 91 immediately above the two LEDs 95 (in the negative z-axis direction), recessed portions are formed. These recessed portions are formed so as to surround the LEDs 95 and are used to make larger the incident areas on which light from the LEDs 95 is incident.

Figure 33:
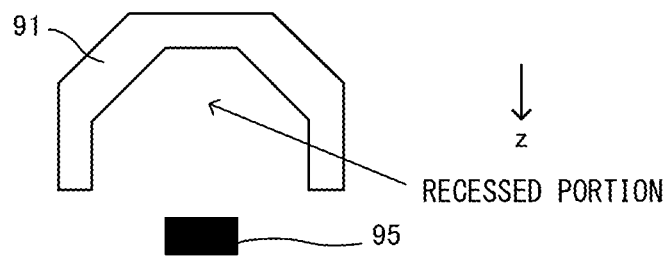
FIG. 33 is a diagram schematically showing a non-limiting example of each of recessed portions of a light-guiding portion 91 provided immediately above two LEDs 95.

FIG. 33 is a diagram schematically showing an example of each of the recessed portions of the light-guiding portion 91 provided immediately above the two LEDs 95. FIG. 33 is a diagram showing a portion including each LED 95 and the recessed portion of the light-guiding portion 91 in (c) of FIG. 32 when cut along an x-z plane in (c) of FIG. 32 and viewed from the positive y-axis direction. The down direction in FIG. 33 corresponds to the positive z-axis direction in FIG. 32. As shown in FIG. 33, the light-guiding portion 91 is formed so as to surround the LED 95. As described above, the recessed portion is formed in the light-guiding portion 91 so as to surround the LED 95, and thereby can receive light from the LED 95 in a wider surface area and make it easy to take the light into the light-guiding portion 91. It should be noted that the shapes of the recessed portions immediately above the two LEDs 95 are merely illustrative. Alternatively, the recessed portions may be formed into circular arc shapes, for example.

Figure 34:
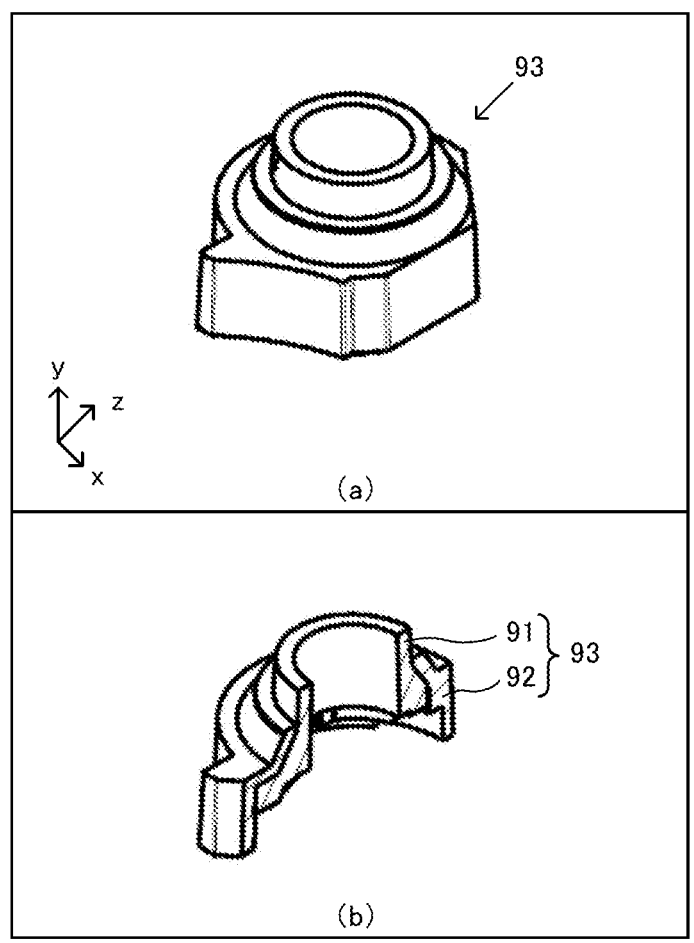
FIG. 34 is a perspective view of a non-limiting example of an integrally molded member 93, which is obtained by forming the light-guiding portion 91 and a light-shielding portion 92 in an integrated manner.

Here, the light-guiding portion 91 and the light-shielding portion 92 are formed in an integrated manner. FIG. 34 is a perspective view of an integrally molded member 93, which is obtained by forming the light-guiding portion 91 and the light-shielding portion 92 in an integrated manner. (a) of FIG. 34 is an external perspective view of the integrally molded member 93. (b) of FIG. 34 is a cross-sectional view of the integrally molded member 93 when cut along a plane parallel with the y-axis. As shown in FIG. 34, in the integrally molded member 93, the light-shielding portion 92 is formed so as to surround the outer periphery of the light-guiding portion 91. In the integrally molded member 93, the light-guiding portion 91 and the light-shielding portion 92 are formed in an integrated manner by two-color molding. It should be noted that the light-guiding portion 91 and the light-shielding portion 92 may be separately molded, and the two members may be assembled together.

As described above, the home button 3*d* of the game controller 1 according to the exemplary embodiment includes the cylindrical light-guiding portion 91, which surrounds the outer periphery of the key top 90, and the cylindrical light-shielding portion 92, which surrounds the periphery of the light-guiding portion 91. This makes it possible to configure the home button 3*d* such that only the periphery of the home button 3*d* (the key top 90 to be pressed by the user) emits light in a ring-shaped manner, while the other portion does not emit light.

In the exemplary embodiment, with a simple structure as described above, it is possible to cause the periphery of the key top 90 to emit light.

It should be noted that in the exemplary embodiment, the key top 90 is a member through which light cannot pass. Alternatively, the key top 90 may be composed of a member through which light can pass. If such a key top is used, it is possible to cause the key top of the home button 3*d* and the periphery of the key top to emit light.

Further, if a structure for pushing up the key top 90 in the direction opposite to the pressing direction is provided, the elastic member 94 may not need to be provided. Further, in (c) of FIG. 32, the elastic member 94 is placed at the position where the elastic member 94 overlaps the LEDs 95 (the position where the elastic member 94 covers the LEDs 95 from above). Alternatively, the elastic member 94 may be made smaller so as not to overlap the LEDs 95 (so as not to cover the LEDs 95).

Further, in the above exemplary embodiment, the light-guiding portion 91 is surrounded by the light-shielding portion 92. Alternatively, a light-shielding agent is applied to the outer periphery of the light-guiding portion 91, thereby preventing light from coming out of the light-guiding portion 91. Such an applied light-shielding agent can be used as an alternative to the light-shielding portion 92.

As described above, the game controller 1 according to the exemplary embodiment includes the above components.

The above components may be used not only in a two-handed game controller, but also in another controller.

For example, the above components may be applied not only to the two-handed game controller 1, but also to a one-handed controller. For example, the R-button and the ZR-button may be provided in the one-handed controller. Further, the configurations of the grip portion, the NFC function, the vibration motor, and the home button may be applied to the one-handed controller.

Further, the components provided in the above game controller 1 may be provided in a mobile game apparatus including a display apparatus and a processing apparatus capable of executing game processing. For example, the mobile game apparatus may include the L/R button and the ZL/ZR button of the game controller 1. Further, the configurations of the grip portion, the NFC function, the vibration motor, and the home button may be applied to the mobile game apparatus.

Further, the components of the above game controller 1 may be applied to a peripheral device for any information processing apparatus such as a PC or a smartphone. For example, the configurations of the R-button and the ZR-button may be applied to a peripheral device for a smartphone. Further, the configurations of the grip portion, the NFC function, the vibration motor, and the home button may be applied to the peripheral device.

Although the game controller 1 has been described, the vibration motor 50 included in the game controller 1 according the above exemplary embodiment may vibrate based on the following vibration data.

(Description of Vibration Data And Vibration Signal Generation Apparatus) A description is given below of vibration data and a vibration signal generation apparatus for generating a vibration control signal based on vibration data.

With reference to the drawings, a vibration signal generation apparatus for executing a vibration signal generation program according to an exemplary embodiment is described. While the vibration signal generation program can be applied by being executed by any computer system, a mobile information processing apparatus A3 (a tablet terminal) is used as an example of the vibration signal generation apparatus, and the vibration signal generation program according to the exemplary embodiment is described using a vibration signal generation program executed by the information processing apparatus A3. For example, the information processing apparatus A3 can execute a program and a pre-installed program (e.g., a game program) stored in a storage medium such as an exchangeable optical disk or an exchangeable memory card, or received from another apparatus. As an example, the information processing apparatus A3 can display on a screen an image generated by a computer graphics process, such as a virtual space image viewed from a virtual camera set in a virtual space. The information processing apparatus A3 may be a device such as a general personal computer, a stationary game apparatus, a mobile phone, a mobile game apparatus, or a PDA (Personal Digital Assistant). It should be noted that FIG. 35 is a plan view of an example of the external appearance of the information processing apparatus A3.

Figure 35:
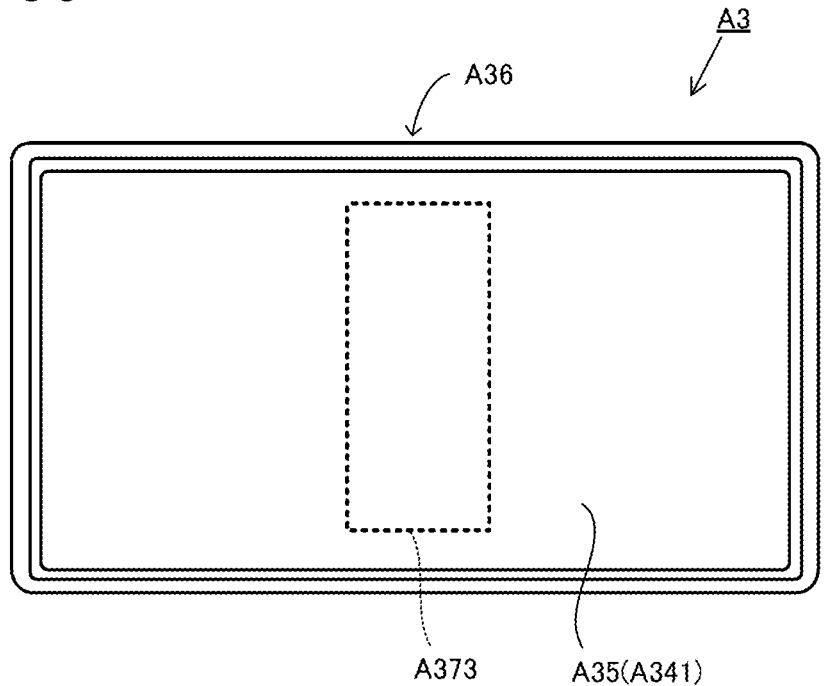
FIG. 35 is a plan view of a non-limiting example of the external appearance of an information processing apparatus A3 according to an exemplary embodiment.

In FIG. 35, the information processing apparatus A3 includes a display section A35, a sound output section A36, and an actuator A373. As an example, the display section A35 is provided on the front surface of the main body of the information processing apparatus A3. For example, the display section A35 includes an LCD (Liquid Crystal Display) and may employ, for example, a display device using EL. Further, the display section A35 may be a display device capable of displaying a stereoscopically viewable image.

A touch panel A341, which is an example of an input section A34, is provided so as to cover a display screen of the display section A35. The touch panel A341 detects the position of an input provided to a predetermined input surface (e.g., the display screen of the display section A35). It should be noted that the input section A34 is an input device that allows a user of the information processing apparatus A3 to input an operation, and the input section A34 may be any input device. For example, as the input section A34, an operation section such as a slide pad, an analog stick, a directional pad, an operation button, or the like may be provided on the side surfaces, the back surface, or the like of the main body of the information processing apparatus A3. Further, the input section A34 may be a sensor for detecting the orientation and the motion of the main body of the information processing apparatus A3. For example, the input section A34 may be an acceleration sensor for detecting the acceleration generated in the main body of the information processing apparatus A3, an angular velocity sensor (a gyro sensor) for detecting the amount of rotation of the main body of the information processing apparatus A3, or the like.

The sound output section A36 includes a loudspeaker for outputting a sound, and in the example shown in FIG. 35, includes a loudspeaker provided on the upper side surface or the back surface of the information processing apparatus A3. The sound output section A36 performs D/A conversion on a sound signal (a sound control signal) output from a control section A31 described later, thereby generating an analog sound signal. Then, the sound output section A36 outputs the analog sound signal to the loudspeaker, thereby outputting a sound.

The actuator A373 is a vibration actuator (a vibrator) for imparting a predetermined vibration to the main body of the information processing apparatus A3 and is included in a vibration generation section A37 described later. In the example shown in FIG. 35, the actuator A373 is provided near the center of the inside of the main body of the information processing apparatus A3. Specifically, as indicated by a dashed line area in FIG. 35, the actuator A373 is provided in a central portion of the display section A35, which is a position between the left hand and the right hand of the user when holding a left end portion of the information processing apparatus A3 in the left hand and holding a right end portion of the information processing apparatus A3 in the right hand. Further, the vibration generation section A37 performs D/A conversion on a vibration control signal output from the control section A31 described later, thereby generating an analog vibration signal. Then, the vibration generation section A37 outputs a driving signal obtained by amplifying the analog vibration signal to the actuator A373, thereby driving the actuator A373.

It should be noted that as is clear from FIG. 35, the display screen of the display section A35 and the sound output section A36, which are provided in the information processing apparatus A3, are placed at positions close to each other. The display screen of the display section A35 and the actuator A373 are placed at positions close to each other. Further, the sound output section A36 and the actuator A373 are placed at positions close to each other, but are different units disposed at different positions. Consequently, it is possible to include a unit dedicated to outputting a vibration and a unit dedicated to outputting a sound. Thus, it is possible to output a vibration and a sound more accurately than when a general-purpose unit is shared. It should be noted that a module into which a unit for outputting a vibration and a unit for outputting a sound are combined and integrated may be provided in the information processing apparatus A3.

Figure 36:
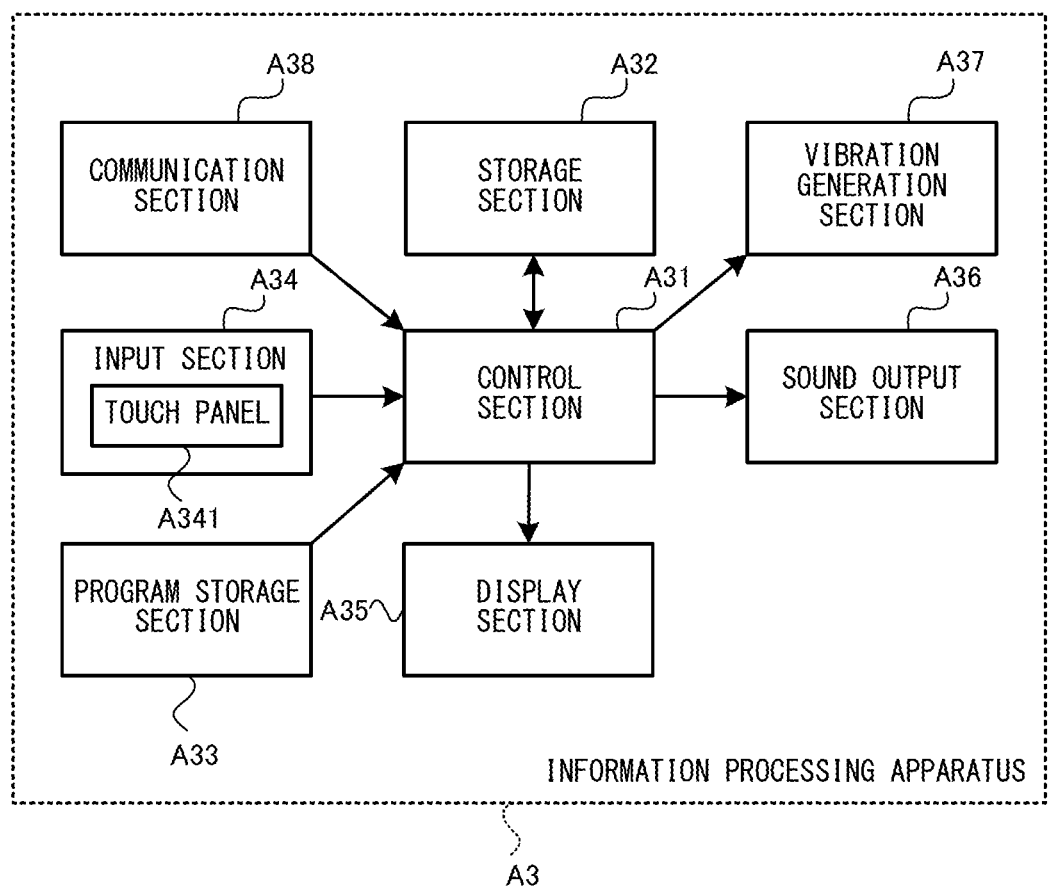
FIG. 36 is a block diagram showing a non-limiting example of the configuration of the information processing apparatus A3.

Next, with reference to FIG. 36, the internal configuration of the information processing apparatus A3 is described. It should be noted that FIG. 36 is a block diagram showing an example of the configuration of the information processing apparatus A3.

In FIG. 36, the information processing apparatus A3 includes the control section A31, a storage section A32, a program storage section A33, and a communication section A38 in addition to the input section A34, the display section A35, the sound output section A36, and the vibration generation section A37, which are described above. It should be noted that the information processing apparatus A3 may be composed of one or more apparatuses including: an information processing apparatus having at least the control section A31; and another apparatus.

The control section A31 is information processing means (a computer) for performing various types of information processing and is, for example, a CPU. The control section A31 has the function of performing, as the various types of information processing, processing or the like corresponding to an operation performed on the input section A34 by the user. For example, the functions of the control section A31 are achieved by, for example, the CPU executing a predetermined program.

As the various types of information processing, the control section A31 controls the display of an image to be displayed on the display section A35. Further, as the various types of information processing, the control section A31 outputs, to the sound output section A36, a sound control signal (e.g., a digital sound signal) for controlling a sound to be output from the loudspeaker. Further, as an example of the various types of information processing, the control section A31 receives vibration data transferred from another apparatus via the communication section A38, generates, based on the vibration data, a vibration control signal (e.g., a digital vibration signal) for controlling the vibration to be generated by the actuator A373, and outputs the vibration control signal to the vibration generation section A37.

The storage section A32 stores various data to be used when the control section A31 performs the above information processing. The storage section A32 is, for example, a memory accessible by the CPU (the control section A31).

The program storage section A33 stores a program. The program storage section A33 may be any storage device (storage medium) accessible by the control section A31. For example, the program storage section A33 may be a storage device provided in the information processing apparatus A3 having the control section A31, or may be a storage medium detachably attached to the information processing apparatus A3 having the control section A31. Alternatively, the program storage section A33 may be a storage device (a server or the like) connected to the control section A31 via a network. The control section A31 (the CPU) may read a part or all of a game program or the vibration signal generation program to the storage section A32 at appropriate timing and execute the read program.

The communication section A38 is composed of a predetermined communication module. The communication section A36 transmits and receives data to and from another device via the network, and directly transmits and receives data to and from another information processing apparatus A3. It should be noted that the communication section A38 may transmit and receive data to and from another device by wireless communication, or may transmit and receive data to and from another device by wired communication.

Figure 37:
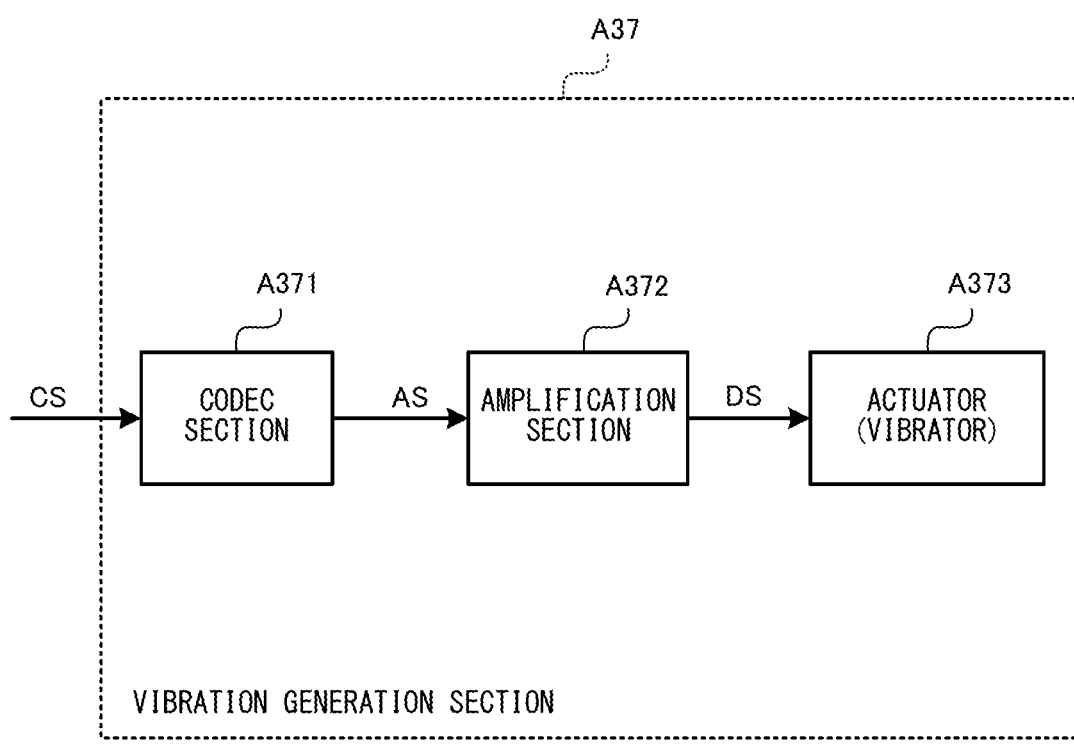
FIG. 37 is a block diagram showing a non-limiting example of the configuration of a vibration generation section A37.

Next, with reference to FIG. 37, the configuration of the vibration generation section A37 is described. It should be noted that FIG. 37 is a block diagram showing an example of the configuration of the vibration generation section A37.

In FIG. 37, the vibration generation section A37 includes a codec section A371, an amplification section A372, the actuator (vibrator) A373.

The codec section A371 acquires a vibration control signal output from the control section A31 and performs a predetermined decoding process on the vibration control signal, thereby generating an analog vibration signal. Then, the codec section A371 outputs the analog vibration signal to the amplification section A372. For example, to generate a vibration in the actuator A373, the control section A31 outputs a vibration control signal (e.g., a vibration control signal CS) for controlling the vibration to be generated. In this case, the codec section A371 decodes the vibration control signal output from the control section A31, thereby generating an analog vibration signal (e.g., an analog vibration signal AS) for generating a vibration in the actuator A373. Then, the codec section A371 outputs the analog vibration signal to the amplification section A372.

The amplification section A372 amplifies the analog vibration signal output from the codec section A371, thereby generating a driving signal for driving the actuator A373. Then, the amplification section A372 outputs the driving signal to the actuator A373. For example, the amplification section A372 increases changes in the amplitudes of the current and/or the voltage of the analog vibration signal (e.g., the analog vibration signal AS) output from the codec section A371, thereby generating a driving signal (e.g., a driving signal DS). Then, the amplification section A372 outputs the driving signal to the actuator A373.

The actuator A373 is driven in accordance with the driving signal output from the amplification section A372, thereby imparting a vibration corresponding to the driving signal to the main body of the information processing apparatus A3. For example, as shown in FIG. 35, the actuator A373 is provided in the center of the display screen of the display section A35. Here, the method of the actuator A373 imparting a vibration to the main body of the information processing apparatus A3 may be any method. For example, the actuator A373 may use the method of generating a vibration by an eccentric motor (ERM: Eccentric Rotating Mass), the method of generating a vibration by a linear vibrator (LRA: Linear Resonant Actuator), the method of generating a vibration by a piezoelectric element, or the like. If the driving signal to be output from the amplification section A372 is generated in accordance with the method of the actuator A373 generating a vibration, an actuator using any method can impart various vibrations to the user of the information processing apparatus A3.

It should be noted that in the above description, an example has been used where a driving signal for driving the actuator A373 is generated by amplifying the analog vibration signal generated by the codec section A371. Alternatively, the signal output from the codec section A371 to the amplification section A372 may be a digital signal. For example, if the actuator A373 is driven by pulse width modulation (PWM) control, the codec section A371 may generate a pulse signal for turning on and off the actuator A373. In this case, the signal output from the codec section A371 to the amplification section A372 is a digital vibration signal for controlling the driving of the actuator A373 using pulse waves. Consequently, the amplification section A372 amplifies the digital vibration signal.

Figure 39:
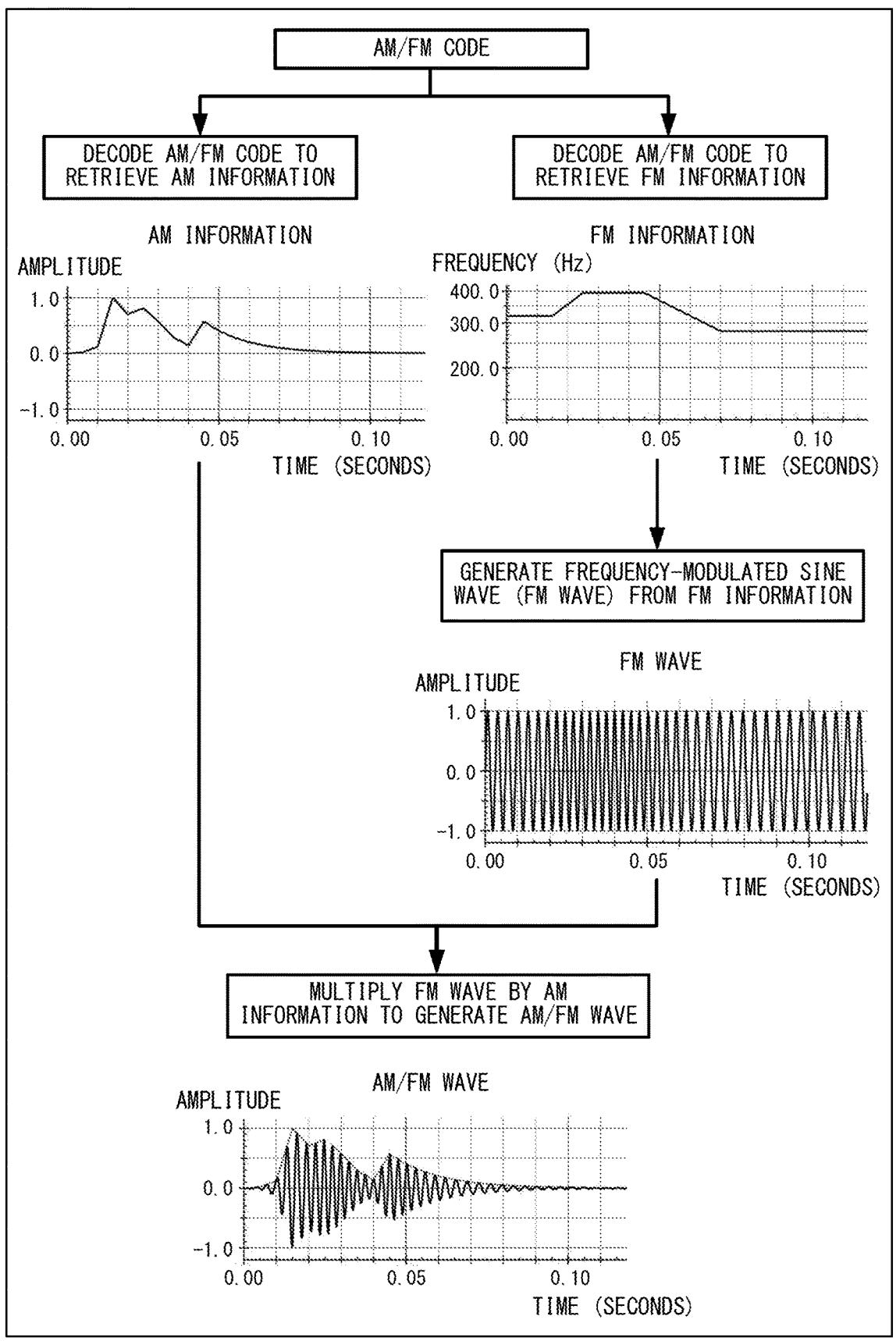
FIG. 39 is a diagram illustrating a non-limiting example of the process of generating a vibration control signal based on acquired vibration data.
Figure 40:
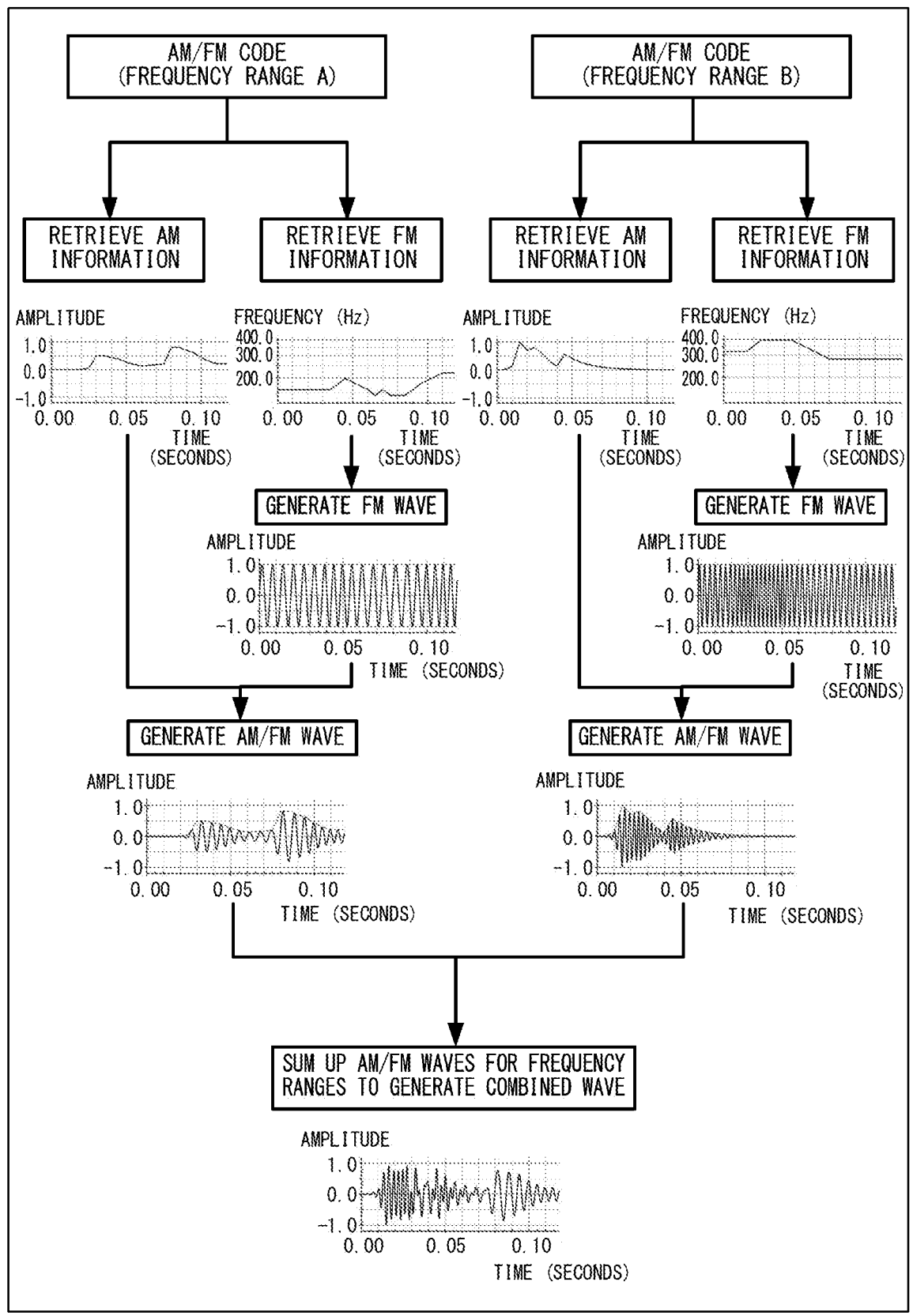
FIG. 40 is a diagram illustrating a non-limiting example of the process of generating a vibration control signal based on vibration data acquired with respect to each frequency range.

Next, with reference to FIGS. 38 to 40, a description is given of an overview of the processing performed by the information processing apparatus A3, before the description of specific processing performed by the information processing apparatus A3. In the following descriptions, the process of performing a game where a virtual object OBJ moves in the display screen of the display section A35 is used as an example of the information processing performed by the information processing apparatus A3. It should be noted that FIG. 38 is a diagram showing an example where the main body of the information processing apparatus A3 vibrates and simultaneously, a sound is output when a virtual object OBJ displayed on the display screen of the display section A35 moves. FIG. 39 is a diagram illustrating an example of the process of generating a vibration control signal based on acquired vibration data. FIG. 40 is a diagram illustrating an example of the process of generating a vibration control signal based on vibration data acquired with respect to each frequency range.

In the example shown in FIG. 38, a virtual object OBJ moving in a virtual space is displayed on the display screen of the display section A35. The virtual object OBJ is displayed on the display screen of the display section A35 so as to move in the virtual space in accordance with a user operation or automatically. Specifically, the virtual object OBJ is a sphere that moves while rolling on a board surface installed in the virtual space.

In accordance with the fact that the virtual object OBJ moves while rolling on the board surface in the virtual space, the information processing apparatus A3 outputs a sound, and simultaneously, the main body of the information processing apparatus A3 vibrates. For example, the loudspeaker (the sound output section A36) provided in the main body of the information processing apparatus A3 outputs a sound such that the virtual object OBJ displayed on the display screen of the display section A35 is the sound source. Further, the actuator A373 provided in the main body of the information processing apparatus A3 generates the vibration to occur when the virtual object OBJ moves while rolling. In the exemplary embodiment, vibration data for generating a vibration control signal for generating this vibration is acquired from another apparatus. Then, based on the acquired vibration data, the information processing apparatus A3 generates a vibration control signal for controlling the driving of the actuator A373.

Next, with reference to FIG. 39, a description is given of an example of the process of generating a vibration control signal. As described above, a vibration control signal for controlling the vibration to be generated by the actuator A373 is generated based on vibration data transferred from another apparatus. In the exemplary embodiment, AM/FM code data transferred from another apparatus is received as vibration data, and an AM/FM wave generated based on the AM/FM code data is used as a vibration control signal. Here, AM code data indicates data representing the amplitude modulation of the vibration, and FM code data indicates data representing the frequency modulation of the vibration. AM/FM code data indicates data representing both the amplitude modulation and the frequency modulation of the vibration. Further, an AM/FM wave indicates a vibration waveform amplitude-modulated and frequency-modulated based on the AM/FM code data.

As shown in FIG. 39, the AM/FM code data is transferred from another apparatus in each constant update cycle of modulating the vibration and functions as the amplitude of the vibration/frequency update command. Then, the AM/FM code data is decoded using a predetermined encoding table, thereby retrieving AM information and FM information. Here, the AM information is information indicating the amplitude of the vibration after the update, based on the vibration before the update. Such AM information is analyzed in each update cycle described above, whereby it is possible to acquire information as shown in FIG. 39 for modulating the amplitude of the vibration in a time-series manner based on a predetermined amplitude. Further, the FM information is information indicating the frequency of the vibration after the update, based on the frequency of the vibration before the update. Such FM information is analyzed in each update cycle described above, whereby it is possible to acquire information as shown in FIG. 39 for modulating the frequency of the vibration in a time-series manner based on a predetermined frequency. It should be noted that examples of the decoding process of the AM/FM code data and the encoding table for use in the decoding will be described later.

Next, a frequency-modulated sine wave (an FM wave) is generated from the FM information. Here, the FM wave is a sine wave as shown in FIG. 39 that is displaced with a frequency corresponding to the FM information acquired in each update cycle described above.

Then, the FM wave is multiplied by the AM information, thereby generating an AM/FM wave. Here, the AM/FM wave has a waveform as shown in FIG. 39 that is displaced with a frequency corresponding to the FM information acquired in each update cycle described above, and also with an amplitude corresponding to the AM information acquired in each update cycle described above. A vibration control signal is generated based on the thus generated AM/FM wave, whereby it is possible to vibrate the actuator A373 with a frequency and an amplitude indicated by the AM/FM wave.

Vibration data is transmitted by such an AM/FM transmission method, whereby it is possible to expect the following effects. As a first effect, it is possible to reduce the amount of data communication for transmitting vibration data as compared to a method for transmitting vibration data as it is, a method for transmitting vibration data by lowering the sampling rate of the vibration data, and a method for transmitting vibration data by compressing the vibration data by a predetermined method. As a second effect, the processing load for decoding the transmitted AM/FM code data is relatively low, and therefore, it is possible to perform the decoding process in real time and lead to controlling the vibration of the actuator A373. As a third effect, parameters for controlling the vibration are the frequency and the amplitude, and therefore, it is possible to simplify the work of generating a vibration material. As a fourth effect, the frequency of the vibration controlled by the AM/FM transmission method is set near the resonance frequency of the actuator A373, whereby it is possible to impart a relatively strong (power-efficient) vibration to the user.

In addition, in the above AM/FM transmission method, the AM/FM code data may be transmitted with respect to each frequency range. With reference to FIG. 40, a description is given below of the process of generating a vibration control signal based on vibration data acquired with respect to each frequency range.

As shown in FIG. 40, the AM/FM code data according to the exemplary embodiment is transferred from another apparatus with respect to each frequency range in a constant update cycle of modulating the vibration and functions as a vibration amplitude/frequency update command with respect to each frequency range. For example, in the example shown in FIG. 40, AM/FM code data targeted for a frequency range A, which is a low-frequency range, and AM/FM code data targeted for a frequency range B, which is a high-frequency range, are transmitted from another apparatus in the same update cycle or in different update cycles.

The AM/FM code data targeted for the frequency range A is decoded using the predetermined encoding table similarly to the above process, thereby retrieving AM information and FM information and generating an FM wave from the FM information. Then, the FM wave is multiplied by the AM information targeted for the frequency range A, thereby generating an AM/FM wave targeted for the frequency range A.

Meanwhile, the AM/FM code data targeted for the frequency range B is also decoded using the predetermined encoding table similarly to the above process, thereby retrieving AM information and FM information and generating an FM wave from the FM information. Then, the FM wave is multiplied by the AM information targeted for the frequency range B, thereby generating an AM/FM wave targeted for the frequency range B.

Then, the AM/FM wave targeted for the frequency range A and the AM/FM wave targeted for the frequency range B are summed up, thereby generating a combined wave. The combined wave has both the AM/FM information targeted for the frequency range A and the AM/FM information targeted for the frequency range B and therefore has a waveform as shown in FIG. 40 that is displaced based on information of the frequency and information of the amplitude for a plurality of frequency ranges. A vibration control signal is generated based on the thus generated combined wave, whereby it is possible to vibrate the actuator A373 with a frequency and an amplitude indicated by the combined wave.

Vibration data is transmitted by the AM/FM transmission method with respect to each of such a plurality of frequency ranges, whereby it is possible to transfer a change in the frequency and a change in the amplitude with respect to each of the plurality of frequency ranges. Thus, it is possible to transmit the vibration from another apparatus more accurately. Thus, it is possible to transmit vibration data without causing the deterioration of vibrating sensation to be imparted to the user as compared to another transmission method.

Next, a description is given of an example of the division of a frequency range when the AM/FM code data is transferred with respect to each of a plurality of frequency ranges. As an example, the plurality of frequency ranges for which the AM/FM code data is transferred can be set in accordance with the characteristics of the tactile sensation of a human being to which the vibration is to be imparted. The human sensory receptors for receiving cutaneous sensation include Merkel discs, Meissner corpuscles, Pacinian corpuscles, Ruffini endings, and the like, each of which responds to a vibration in a particular frequency range. Further, a vibration that a human being can feel is said to be a vibration in the frequency range of 0 to 1000 Hz. Here, among the human sensory receptors, only the Meissner corpuscles and the Pacinian corpuscles can solely generate vibrating sensation. The Meissner corpuscles respond to a low-frequency vibration (e.g., 10 to 200 Hz), and the Pacinian corpuscles respond to a high-frequency vibration (e.g., 70 to 1000 Hz). Thus, the AM/FM code data can be transferred for each of a low-frequency range (10 to 200 Hz) targeted for the Meissner corpuscles, and a high-frequency range (70 to 1000 Hz) targeted for the Pacinian corpuscles.

Then, a frequency as a reference with respect to each frequency range (hereinafter referred to as a "center frequency") is set so that, for example, the ratio of the center frequency is 1.5 or more, and is also set to fit the frequency characteristics (e.g., near the resonance frequency) of a vibration device (the actuator A373 in the above exemplary embodiment). As described above, a frequency band in which the vibration device is likely to vibrate is mainly used, whereby the amount of sense of the vibration to be felt by the user is large relative to power consumed when the vibration is generated. Thus, it is possible to cause the user to feel the vibration more efficiently. It should be noted that if the vibration device has ideal frequency characteristics (flat characteristics), only the characteristics of the human sensory receptors described above need to be taken into account. Thus, for example, the center frequency may be set near 40 Hz in a low-frequency range, and may be set near 250 Hz in a high-frequency range.

It should be noted that in the above description, an example has been used where a frequency range for which the AM/FM code data is transferred is divided in accordance with the response frequency ranges of the human sensory receptors for receiving cutaneous sensation. Alternatively, the frequency range may be divided based on other characteristics. For example, a frequency range for which the AM/FM code data is transferred may be divided in accordance with the characteristic frequency of an actuator to be vibrated. As an example, if the actuator to be vibrated has a plurality of resonance frequencies, a plurality of frequency ranges may be set to include at least one of the resonance frequencies, and the AM/FM code data may be transferred with respect to each of the frequency ranges.

In addition, the AM/FM code data may be transferred with respect to each of three or more frequency ranges. As an example, if it is necessary to generate vibrations in different frequency ranges in order at extremely short time intervals, and if the number of frequency ranges for which the AM/FM code data is transferred is small, the update cycle may not catch up with the speed of transition of frequencies. Specifically, if vibrations having three frequencies of 50 Hz, 150 Hz, and 450 Hz are to be generated in order at 50-millisecond intervals, the AM/FM code data is transferred with respect to each of three or more frequency ranges, whereby it is possible to generate accurate vibrations. It should be noted that as described above, if a vibration is to be felt only by the tactile sensation of a human being, the number of frequency ranges may be two. If, however, a vibration is to be felt by adding an auditory stimulus to the tactile sensation, it can be effective to perform control such that the number of frequency ranges is three or more. Further, to impart vibrations with a plurality of constant frequencies without changing the frequencies of the vibrations, it is desirable that the ratio between the frequencies (the center frequencies) should be a simple integer ratio. As described above, the ratio between frequencies to be generated is an integer ratio, whereby it is possible to prevent the generation of a "hum" when vibrations with two frequencies are simultaneously generated. Here, a "hum" is the phenomenon that two vibration waves having slightly different vibration frequencies interfere with each other to generate a combined wave of which the amplitude of the vibration slowly and cyclically changes.

In addition, the AM/FM code data may be transferred for a single frequency range. As a first example, if there is no use for the generation of vibrations including a plurality of frequency range components, the AM/FM code data can be transferred only for a single frequency range. As a second example, if the frequency characteristics of the vibration device to be vibrated are extremely biased to a certain frequency range, and if the vibration device that hardly vibrates with a frequency other than the only resonance frequency belonging to the frequency range is to be vibrated, the AM/FM code data can be transferred for the frequency range. As a third example, if priority is given to the data compression efficiency of the transfer of the AM/FM code data, the AM/FM code data can be transferred only for a single frequency range.

Next, with reference to FIGS. 41 and 42, an example of the decoding process of the AM/FM code data is described. It should be noted that FIG. 41 is a diagram showing an example of the encoding table used to decode the AM/FM code data. FIG. 42 is a diagram showing an example of a k-calculation table used to calculate a value k used in the encoding table.

FIG. 41 shows a 3-bit AM/FM encoding table for executing an amplitude update command and a frequency update command using a 3-bit code. In the decoding process of the AM/FM code data, an amplitude value and a frequency to be set next are set based on an amplitude value and a frequency indicated immediately before the update process, using such an AM/FM encoding table, and combined waveform data is calculated at a predetermined sampling rate (e.g., 8000 Hz). It should be noted that if the sampling rate in the decoding process is increased, the reproduction accuracy of a combined waveform to be calculated is increased. This, however, increases the load of the decoding process. Thus, the sampling rate may be set taking into account the balance between the frequency of update of the AM/FM code data described later and the reproduction accuracy of a required combined waveform, and the like. In the decoding process of the AM/FM code data described below, the initial value of the amplitude of the vibration is 1/4096, the minimum value of the amplitude of the vibration is 1/4096, the maximum value of the amplitude of the vibration is 1, and a zero threshold for determining the amplitude of the vibration as 0 is 1.5/4096. Further, in the decoding process of the AM/FM code data described below, the initial value of the frequency of the vibration is the center frequency set with respect to each frequency range (e.g., near 160 Hz or 320 Hz, which is the resonance frequency of the vibration device), the minimum value of the frequency of the vibration is 100 Hz, and the maximum value of the frequency of the vibration is 1000 Hz.

The amplitude update command and the frequency update command shown in FIG. 41 indicate the amplitude value and the frequency to be set next based on the amplitude value and the frequency indicated immediately before the update process. Then, an apparatus having received the amplitude update command and the frequency update command updates and sets, based on the received amplitude update command and frequency update command, the amplitude value of the vibration and the frequency of the vibration in the period until the amplitude update command and the frequency update command are received next. As a first example, the amplitude value of the vibration and the frequency of the vibration to be set based on the received amplitude update command and frequency update command may be set as values immediately after the reception, and the amplitude value of the vibration and the frequency of the vibration may be immediately updated. As a second example, the amplitude value of the vibration and the frequency of the vibration to be set based on the received amplitude update command and frequency update command may be set as values immediately before the amplitude update command and the frequency update command are received next, and the amplitude value of the vibration and the frequency of the vibration may be updated in a gradually increasing manner and/or in a gradually decreasing manner so as to reach the values in the above period. As a third example, the amplitude value of the vibration and the frequency of the vibration to be set based on the received amplitude update command and frequency update command may be set as values in the middle of the period until the amplitude update command and the frequency update command are received next, and the amplitude value of the vibration and the frequency of the vibration may be updated in a gradually increasing manner and/or in a gradually decreasing manner so as to reach the values at a time in the middle of the above period.

For example, if the AM/FM code data indicates a code 0 (000), the amplitude value of the vibration is reset to the initial value (e.g., 1/4096) and updated, and the frequency of the vibration is reset to the initial value (e.g., 160 or 320) and updated. If the AM/FM code data indicates a code 1 (001), the amplitude value of the vibration is multiplied by $2^{0.5}$ (approximately 1.414) and updated, and the frequency of the vibration is multiplied by $2^{0.2}$ (approximately 1.149) and updated. If the AM/FM code data indicates a code 2 (010), the amplitude value of the vibration is multiplied by $2^{0.5}$ (approximately 1.414) and updated, and the frequency of the vibration is multiplied by $2^{-0.2}$ (approximately 0.871) and updated. If the AM/FM code data indicates a code 3 (011), the amplitude value of the vibration is multiplied by $2^{-0.3}$ (approximately 0.812) and updated, and the frequency of the vibration is multiplied by $2^{0.2}$ (approximately 1.149) and updated. If the AM/FM code data indicates a code 4 (100), the amplitude value of the vibration is multiplied by $2^{-0.3}$ (approximately 0.812) and updated, and the frequency of the vibration is multiplied by $2^{-0.2}$ (approximately 0.871) and updated. If the AM/FM code data indicates a code 5 (101), the amplitude value of the vibration is multiplied by $2^{k-2}$ and updated, and the frequency of the vibration is constant. If the AM/FM code data indicates a code 6 (110), the amplitude value of the vibration is multiplied by $2^k$ and updated, and the frequency of the vibration is constant. If the AM/FM code data indicates a code 7 (111), the amplitude value of the vibration is multiplied by $2^{k+2}$ and updated, and the frequency of the vibration is constant.

Here, the value k is set in accordance with the amplitude value indicated immediately before the update process. For example, as shown in FIG. 42, the amplitude value indicated immediately before the update is equal to or greater than the minimum amplitude (e.g., 1/4096) and less than $2^{0.5}$ times the minimum amplitude, the value k is set to k=2. If the amplitude value indicated immediately before the update is equal to or greater than $2^{0.5}$ times the minimum amplitude and less than $2^{1.5}$ times (approximately 2.828 times) the minimum amplitude, the value k is set to k=1. If the amplitude value indicated immediately before the update is equal to or greater than $2^{1.5}$ times the minimum amplitude and less than or equal to $2^{-1.5}$ times (approximately 0.354 times) the maximum amplitude (e.g., 1), the value k is set to k=0. If the amplitude value indicated immediately before the update is greater than $2^{-1.5}$ times the maximum amplitude and less than or equal to $2^{-0.5}$ times (approximately 0.707 times) the maximum amplitude, the value k is set to k=−1. Then, if the amplitude value indicated immediately before the update is greater than $2^{-0.5}$ times the maximum amplitude and less than or equal to the maximum amplitude, the value k is set to k=−2.

It should be noted that in the decoding process of the AM/FM code data described above, an example has been used where a 3-bit AM/FM encoding table for executing an amplitude update command and a frequency update command using a 3-bit code is used. Alternatively, the decoding process may be performed by another method. For example, a decoding process using a 4-bit AM/FM encoding table for executing an amplitude update command and a frequency update command using a 4-bit code, or a decoding process using a 2-bit AM encoding table for executing an amplitude update command using a 2-bit code, or a decoding process using a 3-bit AM encoding table for executing an amplitude update command using a 3-bit code, or the like can be used. In the above decoding process using the 4-bit AM/FM encoding table, it is possible to execute 15 types of amplitude update commands and 15 types of frequency update commands. Thus, it is possible to control AM information and FM information in more detail than the decoding process using the 3-bit AM/FM encoding table. Further, in each of the decoding process using the 3-bit AM encoding table and the decoding process using the 2-bit AM encoding table, it is possible to execute only an amplitude update command. As an example, the decoding process is performed by modulating the amplitude of a constant and simple sine wave such that the frequency of the vibration is a predetermined frequency (e.g., the center frequency and also a frequency near the substantial resonance frequency of the actuator). Here, there is a tendency that in the sensation of the vibration to be imparted to the user, generally, the amplitude has a great influence, and the frequency has a small influence. Thus, in the decoding process using the 3-bit AM encoding table and the decoding process using the 2-bit AM encoding table, the vibration is controlled based only on the amplitude, whereby it is possible to control an amplitude update command in detail and also reduce the amount of data communication.

It should be noted that a fundamental wave used in the decoding process using the 3-bit AM encoding table or the decoding process using the 2-bit AM encoding table may not need to be a simple sine wave of which the frequency is constant, and may be a fundamental wave having a waveform having a shape in which positive and negative values are repeated, such as a rectangular wave, a triangular wave, or a sawtooth wave, or a fundamental wave having a waveform having another shape in which the amplitude is constant. Alternatively, noise having a particular frequency range component may be the above fundamental wave. For example, the fundamental wave may be formed of white noise passed through a bandpass filter allowing the passage of a particular frequency range component. Further, the AM/FM code data to be transferred in the decoding process using the 3-bit AM encoding table or the decoding process using the 2-bit AM encoding table may include information indicating the frequency, the shape, the noise type, and the like of the fundamental wave, and the decoding process may be performed using the fundamental wave based on this information.

In addition, the fundamental wave may be a waveform having a shape in which positive and negative values are not repeated. For example, the fundamental wave may only need to be a waveform in which a value greater than a reference value and a value smaller than the reference value are repeated. The fundamental wave may be a waveform having a shape in which a positive local maximum and a local minimum equal to or greater than 0 are alternately repeated, or a waveform having a shape in which a local maximum less than or equal to 0 and a negative local minimum are alternately repeated. As an example, the waveform of the fundamental wave may be a waveform in which a local maximum of +1 and a local minimum of 0 represented by $(1-\cos(2\pi ft))/2$ are alternately repeated. Here, f is the frequency, and t is time. If an FM wave is generated using such a fundamental wave, a waveform is formed in which a local maximum of +1 and a local minimum of 0 are alternately repeated with the frequency indicated by FM information. Then, if an AM/FM wave is generated based on the FM wave, a waveform is formed in which, with a local maximum being an amplitude value between 0 and +1 indicated by AM information, the local maximum and a local minimum of 0 are alternately repeated with the frequency indicated by the FM wave.

Using a fundamental wave having such a shape, it is possible to expect the following effect. For example, if the actuator A373 is composed of a linear vibration motor, a spring is provided in the linear vibration motor. Then, if a positive voltage is applied to the linear vibration motor, the position of a weight inside the linear vibration motor moves in the direction opposite to that of the force of the spring, and the weight acts in the direction of returning to the previous position by the reaction force of the spring. Thus, the weight returns to the previous position only by changing the applied voltage to 0 without applying a negative voltage. Thus, it is possible to generate a vibration having a sufficient intensity only by applying a positive voltage. Thus, it is possible to obtain an effect in terms of power efficiency when the linear vibration motor is driven.

In addition, if the AM/FM code data is to be acquired with respect to each of a plurality of frequency ranges and subjected to the decoding process, the AM/FM code data may be acquired with a lower frequency of update than in the form in which the AM/FM code data is acquired with respect to a single frequency range, and may be subjected to the decoding process, thereby generating vibration data. For example, if the AM/FM code data is to be acquired from another apparatus in a cycle of 400 Hz in the form in which the AM/FM code data is acquired with respect to a single frequency range and subjected to the decoding process, and is to be subjected to the decoding process, the AM/FM code data may be acquired from another apparatus in a cycle of 200 Hz in the form in which the AM/FM code data is acquired with respect to each of the two frequency ranges and subjected to the decoding process, and may be subjected to the decoding process. Further, if the AM/FM code data is to be acquired with respect to each of a plurality of frequency ranges and subjected to the decoding process, the AM/FM code data may be acquired with frequencies of update different between the frequency ranges and subjected to the decoding process. As an example, the frequency of update for a high-frequency range can be set to be relatively low with respect to the frequency of update for a low-frequency range. As another example, in accordance with the magnitude of the amplitude of the vibration generated in each frequency range, the AM/FM code data can be transferred with frequencies of update different between the frequency ranges and subjected to the decoding process. For example, if the magnitude of the amplitude of the vibration generated in a first frequency range is greater than the magnitude of the amplitude of the vibration generated in a second frequency range, then in the first frequency range, the AM/FM code data can be acquired from another apparatus with a relatively high frequency of update (e.g., in a cycle of 400 Hz) and subjected to the decoding process. In the second frequency range, the AM/FM code data can be acquired from another apparatus with a relatively low frequency of update (e.g., in a cycle of 200 Hz) and subjected to the decoding process. Further, if the magnitude of the amplitude of the vibration generated in the first frequency range is equivalent to the magnitude of the amplitude of the vibration generated in the second frequency range, and both magnitudes are greater than a predetermined threshold, then in both the first frequency range and the second frequency range, the AM/FM code data can be acquired from another apparatus with a relatively high frequency of update (e.g., in a cycle of 400 Hz) and subjected to the decoding process. Further, if the magnitude of the amplitude of the vibration generated in the first frequency range is equivalent to the magnitude of the amplitude of the vibration generated in the second frequency range, and both magnitudes are smaller than a predetermined threshold, then in both the first frequency range and the second frequency range, the AM/FM code data can be acquired from another apparatus with a relatively low frequency of update (e.g., in a cycle of 200 Hz) and subjected to the decoding process.

Next, a description is given of examples of the process of, in an apparatus as the transfer source of AM code data (i.e., code data for which only an amplitude update command is executed), encoding AM code data, and the process of receiving and decoding the AM code data. First, in the transfer source apparatus, original vibration data (a vibration waveform) to be transferred is prepared. Then, if the transfer source apparatus is to transfer AM code data with respect to each of a plurality of frequency ranges in order to transmit the vibration data to another apparatus, the transfer source apparatus passes the vibration data through a bandpass filter with respect to each of the frequency ranges, thereby generating vibration data of each frequency range component. As an example, to transfer AM code data corresponding to a first frequency range of which the center frequency is 160 Hz and AM code data corresponding to a second frequency range of which the center frequency is 320 Hz, the transfer source apparatus processes the original vibration data using a bandpass filter allowing the passage of a first frequency range component, thereby generating vibration data of the first frequency range component. Then, the transfer source apparatus processes the original vibration data using a bandpass filter allowing the passage of a second frequency range component, thereby generating vibration data of the second frequency range component. Then, using the envelope waveform of a vibration waveform indicating the vibration data of the first frequency range component, the transfer source apparatus encodes the general shape of the envelope using a predetermined encoding table, thereby generating AM code data of the first frequency range component. Further, using the envelope waveform of a vibration waveform indicating the vibration data of the second frequency range component, the transfer source apparatus encodes the general shape of the envelope using the above encoding table, thereby generating AM code data of the second frequency range component. Then, the apparatus as the transfer source of AM code data transmits the generated AM code data of the first frequency range component and the generated AM code data of the second frequency range component to another apparatus in each update cycle. It should be noted that the above process of encoding AM code data may be analyzed and prepared in advance in an off-line process by the transfer source apparatus.

On the other hand, an apparatus having received the AM code data with respect to each frequency range retrieves AM information of the first frequency range component using the above encoding table and multiplies the AM information of the first frequency range component by the fundamental wave of the first frequency range component (e.g., a sine wave of 160 Hz), thereby generating an AM wave corresponding to the first frequency range component. Further, the apparatus retrieves AM information of the second frequency range component using the above encoding table and multiplies the AM information of the second frequency range component by the fundamental wave of the second frequency range component (e.g., a sine wave of 320 Hz), thereby generating an AM wave corresponding to the second frequency range component. Then, the apparatus sums up the AM wave corresponding to the first frequency range component and the AM wave corresponding to the second frequency range component to generate a combined wave, thereby generating a vibration control signal for controlling the driving of the actuator based on the combined wave. It should be noted that the above process of decoding the AM code data and controlling the vibration of the actuator may be performed in real time in accordance with the acquisition of the AM code data from the transfer source apparatus.

Figure 43:
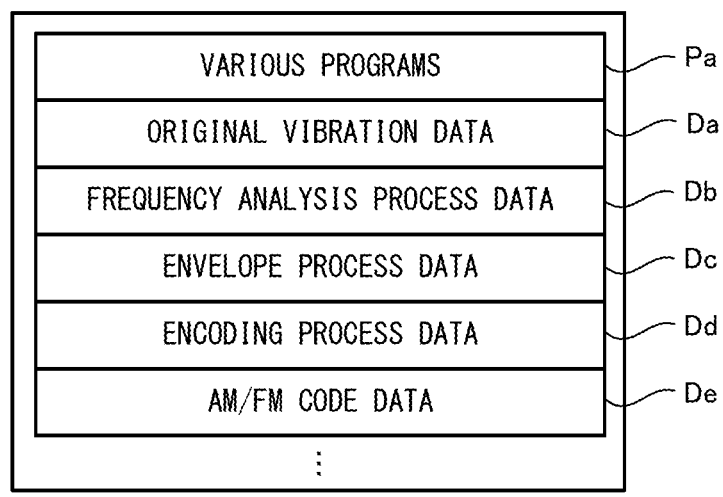
FIG. 43 is a diagram showing non-limiting examples of main data and programs stored in a storage section of a transfer source apparatus when a code data transmission process is performed.

Next, a description is given of the details of a data output process performed by the apparatus as the transfer source of the AM/FM code data (i.e., code data for which an amplitude update command and a frequency update command are executed). It should be noted that in the following description, a code data transmission process is used as an example of the data output process. First, with reference to FIG. 43, main data used in the code data transmission process performed by the transfer source apparatus is described. FIG. 43 is a diagram showing examples of main data and programs stored in a storage section of the transfer source apparatus when the code data transmission process is performed.

As shown in FIG. 43, the following are stored in the data storage area of the storage section of the transfer source apparatus: original vibration data Da; frequency analysis process data Db; envelope process data Dc; encoding process data Dd; AM/FM code data De; and the like. It should be noted that the storage section of the transfer source apparatus may store, as well as the data shown in FIG. 43, data and the like necessary for the processing, such as data used in an application to be executed. Further, in the program storage area of the storage section of the transfer source apparatus, various programs Pa included in a code data transmission program are stored.

The original vibration data Da is original vibration data (a vibration waveform) prepared in advance in the transfer source apparatus and is vibration data as a source for the process of generating AM/FM code data.

The frequency analysis process data Db is data representing a frequency included in vibration data obtained by preforming frequency analysis on original vibration data (a vibration waveform).

The envelope process data Dc is data representing the envelope waveform of a vibration waveform indicating original vibration data or vibration data of a predetermined frequency range component.

The encoding process data Dd is data used when encoding is performed using AM information (the general shape of an envelope) and/or FM information, and is, for example, data including an encoding table data or the like for use in an encoding process.

The AM/FM code data De is data representing AM/FM code data obtained by encoding AM information (the general shape of an envelope) and/or FM information.

Figure 44:
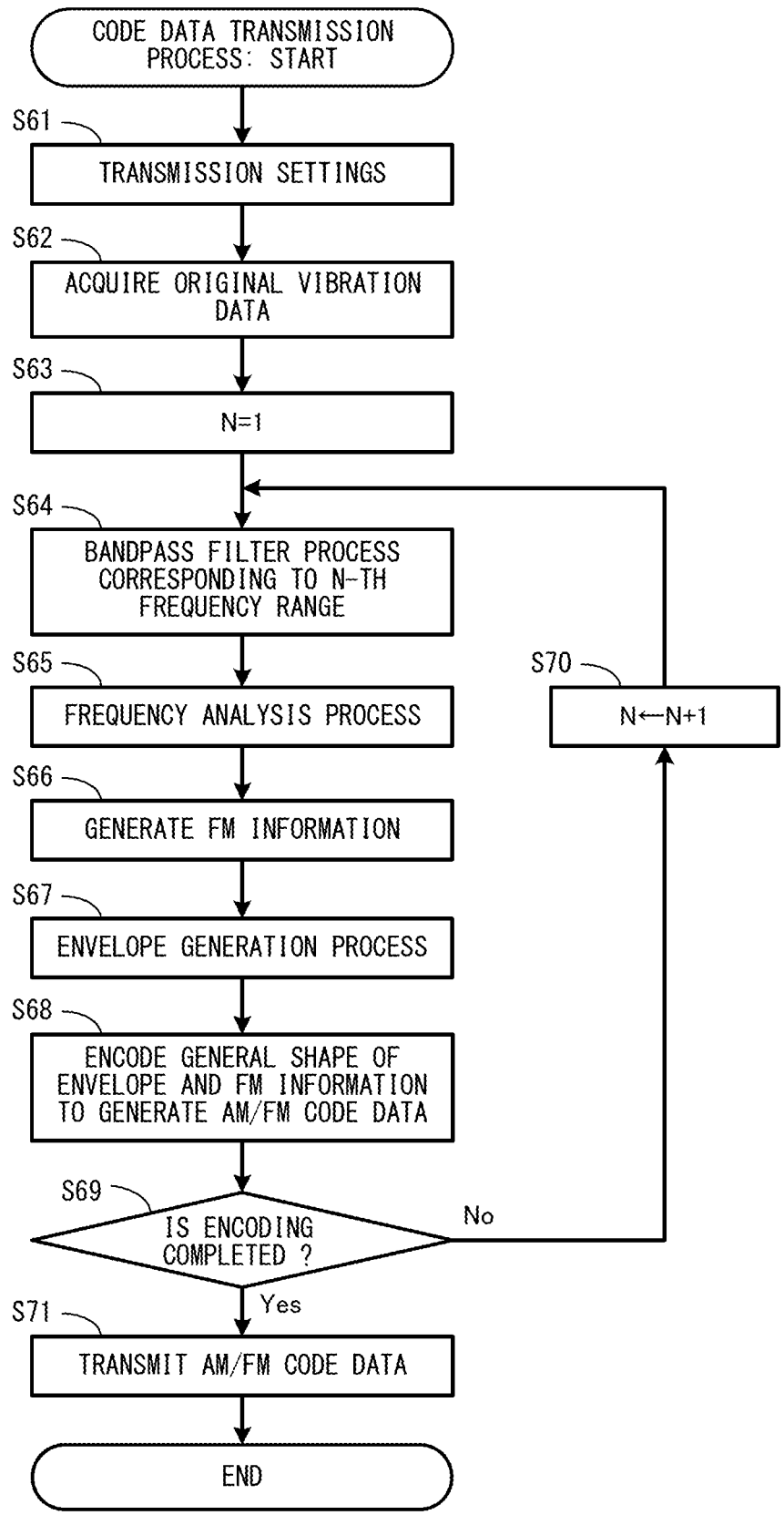
FIG. 44 is a flow chart showing a non-limiting example of the code data transmission process performed by the transfer source apparatus.

Next, with reference to FIG. 44, a detailed description is given of the code data transmission process, which is an example of the data output process performed by the transfer source apparatus. It should be noted that FIG. 44 is a flow chart showing an example of the code data transmission process performed by the transfer source apparatus. Here, in the flow chart shown in FIG. 44, a description is given mainly of, in the processing performed by the transfer source apparatus, the process of generating AM/FM code data based on original vibration data and transmitting the AM/FM code data. The detailed descriptions of other processes not directly related to these processes are omitted. Further, in FIG. 44, all of the steps performed by a control section of the transfer source apparatus are abbreviated as "S".

The CPU of the control section of the transfer source apparatus initializes a memory and the like of the storage section of the transfer source apparatus and loads the code data transmission program from the program storage section A33 into the memory. Then, the CPU starts the execution of the code data transmission program. Further, the CPU of the control section A31 also loads the code data transmission program from the transfer source apparatus into the memory. Then, the CPU starts the execution of the code data transmission program. The flow chart shown in FIG. 44 is a flow chart showing the processing performed after the above processes are completed.

It should be noted that the processes of all of the steps in the flow chart shown in FIG. 44 are merely illustrative. Thus, the processing order of the steps may be changed, or another process may be performed in addition to and/or instead of the processes of all of the steps, so long as similar results are obtained. Further, in the exemplary embodiment, descriptions are given on the assumption that the control section (the CPU) of the transfer source apparatus performs the processes of all of the steps in the flow chart. Alternatively, the CPU may perform the processes of some of the steps in the flow chart, and a processor or a dedicated circuit other than the CPU may perform the processes of the other steps. Yet alternatively, a processor or a dedicated circuit other than the CPU may perform the processes of all of the steps in the flow chart.

Referring to FIG. 44, the control section of the transfer source apparatus makes transmission settings (step 61), and the processing proceeds to the next step. For example, the control section of the transfer source apparatus performs initialization for transmitting AM/FM code data to another apparatus (e.g., the information processing apparatus A3). As an example, the control section of the transfer source apparatus sets the number of frequency ranges for which AM/FM code data is to be transmitted, the range of each frequency range, the cycle of transmitting the AM/FM code data, an encoding table for use in encoding, and the like in the encoding process data Dd, thereby initializing each parameter.

Next, the control section of the transfer source apparatus acquires, from the storage section of the transfer source apparatus, original vibration data from which to generate AM/FM code data (step 62), and the processing proceeds to the next step. For example, the control section of the transfer source apparatus extracts, from a plurality of pieces of vibration data stored in advance in the storage section of the transfer source apparatus, vibration data from which to generate AM/FM code data, and stores the extracted vibration data as the original vibration data Da.

Next, the control section of the transfer source apparatus initializes a temporary variable N for use in this process to 1 (step 63), and the processing proceeds to the next step.

Next, the control section of the transfer source apparatus performs a bandpass filter process corresponding to an N-th frequency range (step 64), and the processing proceeds to the next step. For example, the control section of the transfer source apparatus sets a bandpass filter allowing the passage of an N-th frequency range component and processes the vibration data (the vibration waveform) stored as the original vibration data Da, using the bandpass filter, thereby generating vibration data obtained by removing frequency range components other than the N-th frequency range component.

Next, the control section of the transfer source apparatus performs frequency analysis on the vibration data of the N-th frequency range component generated in the above step 64 (step 65), and the processing proceeds to the next step. For example, the control section of the transfer source apparatus performs frequency analysis on the vibration data of the N-th frequency range component to analyze a change in the frequency of the vibration included in the vibration data, and stores data representing the analysis result as the frequency analysis process data Db.

Next, the control section of the transfer source apparatus generates FM information of the N-th frequency range component based on the frequency analysis process data Db corresponding to the N-th frequency range component (step 66), and the processing proceeds to the next step. For example, the control section of the transfer source apparatus generates FM information indicating a change in the frequency of the vibration data of the N-th frequency range component (e.g., the FM information as shown in FIG. 39 or 6) based on the frequency analysis result obtained in the above step 65.

Next, the control section of the transfer source apparatus generates the envelope waveform of the vibration data of the N-th frequency range component generated in the above step 64 (step 67), and the processing proceeds to the next step. For example, the control section of the transfer source apparatus generates a signal having an envelope of the vibration data (the vibration waveform) of the N-th frequency range component generated in the above step 64 and stores data representing the signal as the envelope process data Dc. It should be noted that in the above envelope process, an envelope of a moving maximum value (a maximum value in each certain moving section) of the vibration data of the N-th frequency range component (e.g., waveform data in which the horizontal axis represents time, and the vertical axis represents the amplitude) may be calculated, or an envelope of a section maximum value in each certain section of the vibration data may be calculated, or a curve passing through a local maximum of the amplitude in the vibration data may be calculated.

Next, the control section of the transfer source apparatus encodes the general shape of the envelope waveform generated in the above step 67 and the FM information, thereby generating AM/FM code data (step 68), and the processing proceeds to the next step. For example, based on the general shape of the envelope waveform generated in the above step 67, the control section of the transfer source apparatus calculates the amount of change in the amplitude of the N-th frequency range component with respect to each cycle of transmitting AM/FM code data. Further, based on the FM information generated in the above step 66, the control section of the transfer source apparatus calculates the amount of change in the frequency of the N-th frequency range component with respect to each cycle of transmitting AM/FM code data. Then, based on the encoding table for use in encoding, the control section of the transfer source apparatus encodes the calculated amount of change in the amplitude and the calculated amount of change in the frequency, thereby generating AM/FM code data corresponding to the N-th frequency range component with respect to each cycle of transmitting AM/FM code data. Then, the control section of the transfer source apparatus stores the AM/FM code data as the AM/FM code data De corresponding to the N-th frequency range component.

Next, the control section of the transfer source apparatus determines whether or not the encoding process of the original vibration data acquired in the above step 62 is completed with respect to each frequency range (step 69). Then, if a frequency range with respect to which the encoding process is not completed remains, the processing proceeds to step 70. If, on the other hand, a frequency range with respect to which the encoding process is not completed does not remain, the processing proceeds to step 71.

In step 70, the control section of the transfer source apparatus adds 1 to the temporary variable N to update the temporary variable N, and the processing proceeds to the above step 64.

On the other hand, in step 71, the control section of the transfer source apparatus transmits to the transfer destination apparatus (e.g., the information processing apparatus A3) the AM/FM code data corresponding to each cycle of transmitting AM/FM code data and ends the processing of the flow chart.

It should be noted that the above process of encoding AM/FM code data (i.e., the processes of the above steps 61 to 69) may be performed in advance in an off-line process by the transfer source apparatus and stored as the AM/FM code data De, or may be performed in real time in accordance with a request from the transfer destination apparatus.

Figure 45:
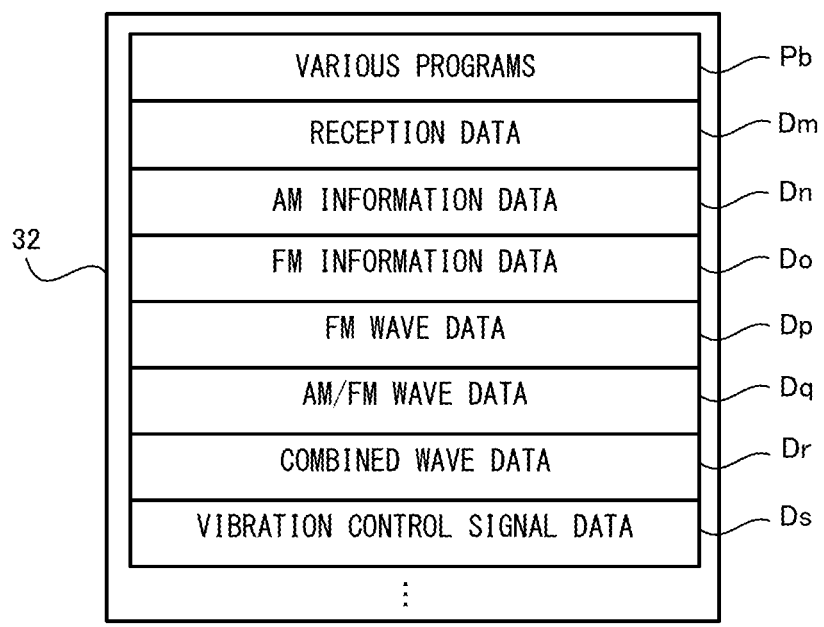
FIG. 45 is a diagram showing non-limiting examples of main data and programs stored in a storage section A32 of the information processing apparatus A3 when a code data reception process is performed.

Next, a description is given of the details of a vibration signal generation process performed by the information processing apparatus A3 as the transfer destination of the AM/FM code data. It should be noted that in the following description, a code data reception process is used as an example of the vibration signal generation process. First, with reference to FIG. 45, main data used in the code data reception process performed by the information processing apparatus A3 is described. FIG. 45 is a diagram showing examples of main data and programs stored in the storage section A32 of the information processing apparatus A3 when the code data reception process is performed.

As shown in FIG. 45, the following are stored in the data storage area of the storage section A32: reception data Dm; AM information data Dn; FM information data Do; FM wave data Dp; AM/FM wave data Dq; combined wave data Dr; vibration control signal data Ds; and the like. It should be noted that the storage section A32 may store, as well as the data shown in FIG. 45, data and the like necessary for the processing, such as data used in an application to be executed. Further, in the program storage area of the storage section A32, various programs Pb included in a code data reception program are stored. For example, the various programs Pb include a reception program for receiving AM/FM code data, a decoding program for decoding AM/FM code data, a vibration control signal generation program for generating a vibration control signal, and the like.

The reception data Dm is data received from another apparatus (e.g., the above transfer source apparatus).

The AM information data Dn is data representing AM information retrieved from AM/FM code data transferred from another apparatus. The FM information data Do is data representing FM information retrieved from AM/FM code data transferred from another apparatus.

The FM wave data Dp is data representing a frequency-modulated sine wave (an FM wave) generated from FM information. The AM/FM wave data Dq is data representing an AM/FM wave generated by multiplying an FM wave by AM information.

The combined wave data Dr is data representing a combined wave generated by summing up AM/FM waves generated for respective frequency ranges. The vibration control signal data Ds is data, generated based on the combined wave, for controlling the driving of the actuator A373. For example, the vibration control signal data Ds is data representing a vibration control signal (the vibration control signal CS; see FIG. 37) to be output from the control section A31 to the vibration generation section A37.

Figure 46:
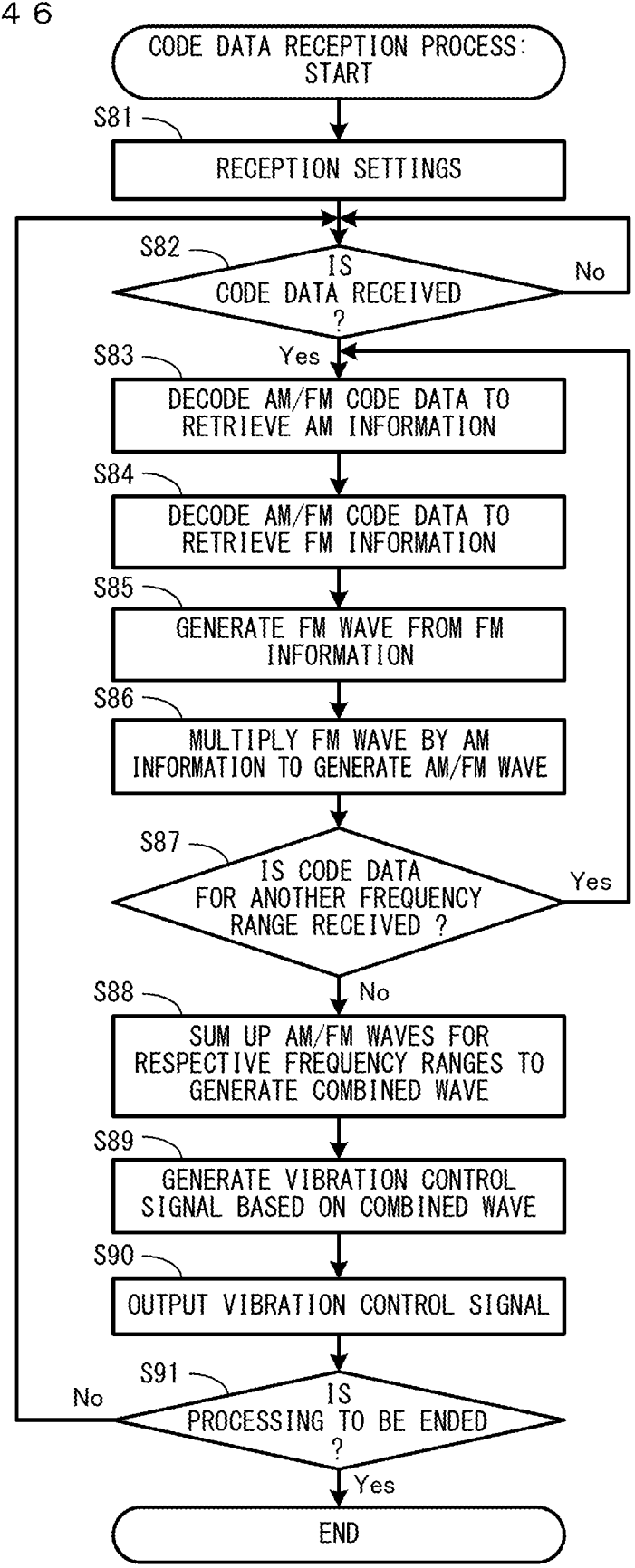
FIG. 46 is a flow chart showing a non-limiting example of the code data reception process performed by the information processing apparatus A3.

Next, with reference to FIG. 46, a detailed description is given of the code data reception process, which is an example of the vibration signal generation process performed by the information processing apparatus A3. It should be noted that FIG. 46 is a flow chart showing an example of the code data reception process performed by the information processing apparatus A3. Here, in the flow chart shown in FIG. 46 a description is given mainly of, in the processing performed by the information processing apparatus A3, the process of receiving AM/FM code data from another apparatus to generate a vibration control signal. The detailed descriptions of other processes not directly related to these processes are omitted. Further, in FIG. 46, all of the steps performed by the control section A31 of the information processing apparatus A3 are abbreviated as "S".

The CPU of the control section A31 of the information processing apparatus A3 initializes a memory and the like of the storage section A32 and loads the code data transmission program from the program storage section A33 of the information processing apparatus A3 into the memory. Then, the CPU starts the execution of the code data reception program. The flow chart shown in FIG. 46 is a flow chart showing the processing performed after the above processes are completed.

It should be noted that the processes of all of the steps in the flow chart shown in FIG. 46 are merely illustrative. Thus, the processing order of the steps may be changed, or another process may be performed in addition to and/or instead of the processes of all of the steps, so long as similar results are obtained. Further, in the exemplary embodiment, descriptions are given on the assumption that the control section A31 (the CPU) of the information processing apparatus A3 performs the processes of all of the steps in the flow chart. Alternatively, the CPU may perform the processes of some of the steps in the flow chart, and a processor or a dedicated circuit other than the CPU may perform the processes of the other steps. Yet alternatively, a processor or a dedicated circuit other than the CPU may perform the processes of all of the steps in the flow chart.

Referring to FIG. 46, the control section A31 makes reception settings (step 81), and the processing proceeds to the next step. For example, the control section A31 performs initialization for receiving AM/FM code data from another apparatus (e.g., the above transfer source apparatus). As an example, the control section A31 sets the number of frequency ranges for which AM/FM code data is to be received, the range of each frequency range, the cycle of receiving the AM/FM code data, an encoding table for use in a decoding process, and the like, thereby initializing each parameter. It should be noted that the parameters to be set in the above reception settings may be set based on information described in reception data received from another apparatus.

Next, the control section A31 waits to receive code data (e.g., AM/FM code data) from another apparatus (step 82). Then, if receiving code data from another apparatus, the control section A31 stores the received data as the reception data Dm, and the processing proceeds to step 83.

In step 83, the control section A31 decodes the AM/FM code data received in the above step 82 to retrieve AM information, and the processing proceeds to the next step. For example, the control section A31 sets a frequency range as a processing target, extracts AM/FM code data corresponding to the frequency range from the data received in the above step 82, retrieves AM information of the frequency range component based on the set encoding table, and stores the AM information as the AM information data Dn. Here, the method for retrieving AM information is similar to the form described above with reference to FIGS. 39 to 42. It should be noted that if the amplitude value calculated as the AM information is smaller than the minimum value (e.g., 1/4096) of the amplitude of the vibration set in advance, the AM information is set as the minimum value. Further, if the amplitude value calculated as the AM information is greater than the maximum value (e.g., 1) of the amplitude of the vibration set in advance, the AM information is set as the maximum value.

Next, the control section A31 decodes the AM/FM code data received in the above step 82 to retrieve FM information (step 84), and the processing proceeds to the next step. For example, the control section A31 extracts, from the data received in the above step 82, AM/FM code data corresponding to a frequency range set as a processing target, retrieves FM information of the frequency range component based on the set encoding table, and stores the FM information as the FM information data Do. It should be noted that the method for retrieving FM information is similar to the form described above with reference to FIGS. 39 to 42. It should be noted that if the frequency calculated as the FM information is smaller than the minimum value (e.g., 100 Hz) of the frequency of the vibration set in advance, the FM information is set as the minimum value. Further, if the frequency calculated as the FM information is greater than the maximum value (e.g., 1000 Hz) of the frequency of the vibration set in advance, the FM information is set as the maximum value.

Next, the control section A31 generates a frequency-modulated sine wave (an FM wave) from the FM information retrieved in the above step 84 (step 85), and the processing proceeds to the next step. For example, as described above with reference to FIGS. 39 and 40, the control section A31 generates, as an FM wave corresponding to the above frequency range, a sine wave that is displaced with a frequency corresponding to the FM information. Then, the control section A31 stores data representing the FM wave as the FM wave data Dp.

Next, the control section A31 multiplies the FM wave generated in the above step 85 by the AM information retrieved in the above step 83, thereby generating an AM/FM wave (step 86), and the processing proceeds to the next step. For example, the control section A31 generates, as an AM/FM wave corresponding to the above frequency range, a vibration waveform that is displaced with an amplitude corresponding to the AM information retrieved in the above step 83 and with a frequency corresponding to the FM wave generated in the above step 85. Then, the control section A31 stores data representing the AM/FM wave as the AM/FM wave data Dq. It should be noted that if the amplitude value of the AM/FM wave is to be converted to the value of the amplitude of the vibration for use in an application for generating a vibration, the amplitude value of the AM/FM wave may be changed by a multiplying factor necessary for the conversion in the above step 86. For example, if a vibration sample is represented by a 16-bit integer type with a sign (−32768 to +32767) in the application, the amplitude value of the AM/FM wave is multiplied by 32767 for conversion. If the amplitude value of the AM/FM wave is smaller than the zero threshold (e.g., 1.5/4096), the value of the amplitude of the vibration for use in the application is converted to 0.

Next, the control section A31 determines whether or not code data for another frequency range is received in the above step 82 (step 87). Then, if code data for another frequency range is received, the control section A31 sets a different frequency range as a processing target, and the processing proceeds to the above step 83. If, on the other hand, code data for another frequency range is not received (the decoding process of code data for all the frequency ranges is completed), the control section A31 sets a different frequency range as a processing target, and the processing proceeds to step 83.

In step 88, the control section A31 sums up the AM/FM waves targeted for the respective frequency ranges generated in the above step 86, thereby generating a combined wave, and the processing proceeds to the next step. For example, the control section A31 stores, as the combined wave data Dr, data representing a combined wave generated by summing up the AM/FM waves targeted for the frequency ranges.

Next, based on the combined wave generated in the above step 88, the control section A31 generates a vibration control signal (step 89), and the processing proceeds to the next step. For example, the control section A31 generates the combined wave generated in the above step 88, as it is as a vibration control signal and stores the vibration control signal in the vibration control signal data Ds.

Next, the control section A31 outputs the vibration control signal (step 90), and the processing proceeds to the next step. For example, the control section A31 outputs to the vibration generation section A37 the vibration control signal CS indicated by the vibration control signal data Ds. Consequently, the vibration generation section A37 generates a vibration corresponding to the vibration control signal CS from the actuator A373.

Next, the control section A31 determines whether or not the processing is to be ended (step 91). Examples of conditions for ending the processing include: the satisfaction of the condition under which the processing is ended; and the fact that the user performs the operation of ending the processing. If the processing is not to be ended, the control section A31 returns to the above step 8 and repeats the process thereof. If the processing is to be ended, the control section A31 ends the processing indicated by the flow chart.

As described above, in the processing according to the above exemplary embodiment, a transfer destination apparatus (e.g., the information processing apparatus A3) can generate vibration data using code data transferred from a transfer source apparatus. Here, using code data transferred in each predetermined cycle, the transfer destination apparatus can also change a vibration parameter (e.g., the frequency of the vibration or the amplitude of the vibration)

while vibrating an actuator. Thus, it is possible to efficiently treat code data when a vibration parameter is changed during a vibration.

It should be noted that in the above exemplary embodiment, an example has been used where apparatuses transfer code data to and from each other, whereby a transfer destination apparatus generates a vibration signal based on the code data. Alternatively, a vibration signal may be generated in another form. For example, code data generated in each predetermined cycle may be stored in advance in an apparatus for generating a vibration signal (the information processing apparatus A3 in the above example), and if a vibration signal based on the code data is needed, the apparatus may acquire and decode the code data stored in the apparatus itself, thereby generating the vibration signal. This makes it possible to reduce, in an apparatus for generating a vibration signal, the amount of data stored for generating the vibration signal.

In addition, in the above exemplary embodiment, an example is used where a single actuator A373 is provided in the information processing apparatus A3. Alternatively, a plurality of actuators for imparting vibrations to the user may be provided. As an example, a pair of actuators may be provided on the left and right of the information processing apparatus A3. In this case, the control section A31 may generate vibration control signals for driving the respective actuators from a single piece of code data, or may generate vibration control signals for driving the respective actuators from different pieces of code data (e.g., code data for one of the actuators, and code data for the other actuator).

For example, if a plurality of actuators 373 are provided and independent vibrations are generated from the respective actuators 373, the control section A31 outputs a vibration control signal for controlling the vibration of each actuator A373. In this case, the codec section A371 decodes the vibration control signals output from the control section A31, thereby generating analog vibration signals for generating vibrations in the respective actuators 373. Then, the codec section A371 outputs the vibration control signals to the amplification section A372. Then, the amplification section A372 increases changes in the amplitudes of the current and/or the voltage of each of the analog vibration signals output from the codec section A371, thereby generating driving signals. Then, the amplification section A372 outputs the driving signals to the plurality of actuators 373. If a plurality of actuators are included in the information processing apparatus A3, with the use of phantom sensation that stimulates two different points in the user's skin (as an example, the left hand and the right hand of the user holding the main body of the information processing apparatus A3) to cause the user to perceive a pseudo stimulus at one point, the actuators can also impart, to the user of the information processing apparatus A3, vibrations for causing the user to perceive the position of a predetermined image displayed on the display section A35, as the vibration source in a pseudo manner.

In addition, in the above exemplary embodiment, an example has been used where a transfer source apparatus for transferring code data wirelessly transmits the code data to the information processing apparatus A3. Alternatively, the transfer source apparatus may transmit the code data to the information processing apparatus A3 in a wired manner. Even if the transfer speed of communication in a wireless or wired manner is slow, the sending of code data makes it possible to prevent the delay of vibration control.

In addition, an apparatus as the transfer destination of code data may be an operation apparatus (a so-called controller) held and operated by the user. In this case, an actuator for generating a vibration is provided in the operation apparatus, and an apparatus as the transfer source of the code data (e.g., the main body of a game apparatus) transfers the code data for generating vibration data to the operation apparatus (e.g., a controller) by wireless communication. Then, the operation apparatus decodes the code data and controls the driving of the actuator built into the operation apparatus based on the decoded vibration data. As described above, even in a game system including the main body of a game apparatus and a controller wirelessly connected to the main body, the main body of the game apparatus transmits code data to the controller, and the driving of an actuator in the controller is controlled, whereby it is possible to obtain an effect similar to the above. It should be noted that the controller wirelessly connected to the main body of the game apparatus may be a plurality of controllers (e.g., a plurality of controllers held by a plurality of users, or a pair of controllers held by a single user with both hands), and the game system may include the main body of the game apparatus and the plurality of controllers into which actuators are built. In this case, the main body of the game apparatus transfers code data for generating vibration data to each of the plurality of controllers by wireless communication, thereby enabling each controller to generate a vibration corresponding to the code data. It should be noted that the main body of the game apparatus may not perform the process of encoding vibration data, and data obtained by encoding vibration data may be included in advance in a program or the like installed in the main body of the game apparatus. In this case, the main body of the game apparatus outputs code data encoded in advance to the controller, where necessary, and the controller decodes the code data. It should be noted that the communication between the main body of the game apparatus and a single controller or a plurality of controllers may be performed in a wireless or wired manner.

In addition, the above descriptions are given using the example where the transfer source apparatus performs the data output process (e.g., the code data transmission process), and the information processing apparatus A3 performs the vibration signal generation process (the code data reception process). Alternatively, another apparatus may perform at least some of the processing steps in the processing. For example, if the transfer source apparatus and the information processing apparatus A3 are further configured to communicate with another apparatus (e.g., another server, another game apparatus, or another mobile terminal), the other apparatus may cooperate to perform the processing steps of the processing. Another apparatus may thus perform at least some of the processing steps in the processing, thereby enabling processing similar to the above information processing. Further, the above processing can be performed by a processor or the cooperation of a plurality of processors, the processor or the plurality of processors included in an information processing system including at least one information processing apparatus. It should be noted that the information processing system including at least one information processing apparatus can be an information processing system including a plurality of information processing apparatuses (a so-called system including a complex of a plurality of apparatuses), or can be an information processing system including a single information processing apparatus (a so-called system including a single apparatus including a plurality of units). Further, in the above exemplary embodiment, the processing indicated in the above flow chart is performed by the control section of each of the transfer source apparatus and the information processing apparatus A3 executing a predetermined vibration signal generation program. Alternatively, a part or all of the processing indicated in the flow chart may be performed by a dedicated circuit included in each of the transfer source apparatus and the information processing apparatus A3.

Here, the above variations make it possible to achieve the exemplary embodiment also by a system form such as so-called cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the process of each step of the above processing. Thus, it goes without saying that it is possible to achieve the exemplary embodiment by sharing the processing in any manner.

In addition, the processing orders, the setting values, the conditions used in the determinations, and the like that are used in the above information processing are merely illustrative. Thus, it goes without saying that the exemplary embodiment can be achieved also with other orders, other values, and other conditions. Further, the shapes, the number, the placement positions, the functions, and the like of the components used by the above information processing apparatus are merely illustrative, and may be other shapes, number, and placement positions. It goes without saying that the exemplary embodiment can be achieved by the information processing apparatus having other functions. As an example, three or more actuators may impart vibrations to the information processing apparatus, or three or more loudspeakers may output sounds from the information processing apparatus. Alternatively, the information processing apparatus may include a plurality of display sections. Further, in the above description, a mobile apparatus (e.g., a tablet terminal) has been used as an example of the information processing apparatus A3. Alternatively, the information processing apparatus A3 may be a handheld apparatus or a portable apparatus larger than a mobile apparatus. Here, a handheld apparatus is an apparatus that can be operated by the user holding it in their hands, and is a concept including the above mobile apparatus. Further, a portable apparatus is an apparatus that allows the movement of the main body of the apparatus when the apparatus is used, or allows a change in the orientation of the main body of the apparatus when the apparatus is used, or allows the carrying around of the main body of the apparatus, and is a concept including the above handheld apparatus and mobile apparatus.

In addition, the vibration signal generation program may be supplied to the information processing apparatus A3 not only through an external storage medium such as the external memory 45, but also through a wired or wireless communication link. Further, the vibration signal generation program may be stored in advance in a non-volatile storage device included in the information processing apparatus A3. It should be noted that examples of an information storage medium having stored therein the vibration signal generation program may include CD-ROMs, DVDs, optical disk storage media similar to these, flexible disks, hard disks, magneto-optical disks, and magnetic tapes, as well as non-volatile memories. Alternatively, an information storage medium having stored therein the vibration signal generation program may be a volatile memory for storing the vibration signal generation program. It can be said that such a storage medium is a storage medium readable by a computer or the like. For example, it is possible to provide the above various functions by causing a computer or the like to load a game program from the storage medium and execute it.

While the exemplary embodiment has been described in detail above, the above descriptions are merely illustrative in all respects, and do not limit the scope of the exemplary embodiment. It is needless to say that the exemplary embodiment can be improved and modified in various manners without departing the scope thereof. It is understood that the scope of the exemplary embodiment should be interpreted only by the scope of the claims. Further, it is understood that the specific descriptions of the embodiments of the exemplary embodiment enable a person skilled in the art to carry out an equivalent scope on the basis of the descriptions of the exemplary embodiment and general technical knowledge. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

The vibration motor 50, which is provided in the left and right grip portions of the above game controller 1, may operate based on the above vibration data (vibration data (e.g., the above AM/FM code data) received by the above vibration signal generation apparatus). The game controller 1 may receive the above vibration data from the game apparatus 100 (or the information processing apparatus A3 or another apparatus), and based on the vibration data, vibrate the vibration motor 50, which is provided in the left and right grip portions. In this case, the game controller 1 may receive two different pieces of vibration data, and based on the two received pieces of vibration data, vibrate the vibration motors 50, which are provided in the left and right grip portions, in different vibration patterns. Further, the game controller 1 may receive a single piece of vibration data (or the same two pieces of vibration data), and based on the received vibration data, vibrate the vibration motors 50, which are provided in the left and right grip portions, in the same vibration pattern. Further, the above vibration data may be saved in a storage device (e.g., a ROM, a readable/writable non-volatile memory, or the like) provided in the game controller 1, and based on the vibration data, the vibration motors 50, which are provided in the left and right grip portions, may vibrate.

Further, also within the main body of the housing 10 of the game controller 1 (within the housing 10 in which a substrate and the like are placed), another vibration motor (a linear vibration actuator of the same type as that of the vibration motors 50 in the left and right grip portions or a vibration motor of a type different from the vibration motors 50 in the left and right grip portions) may be provided, and based on the vibration data, the vibration motor in the main body of the housing 10 may vibrate. In this case, the game controller 1 may receive three different pieces of vibration data (or three different pieces of vibration data may be stored in a storage device of the game controller 1), and based on the three pieces of vibration data, the vibration motor 50a, which is provided in the left grip portion 8a, the vibration motor 50b, which is provided in the right grip portion 8b, and the vibration motor provided in the main body of the housing 10 may be vibrated. Further, three vibration motors may be vibrated based on a single piece of vibration data.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game controller comprising:
a housing; and
a vibrator contained in the housing and configured to vibrate in a first direction and a second direction different from the first direction, wherein
the vibrator includes a first surface configured to contact the housing when the vibrator vibrates in the first direction and a second surface, different from the first surface, configured to contact the housing when the vibrator vibrates in the second direction, and
a first resonance frequency of vibration of the vibrator in the first direction is different from a second resonance frequency of vibration of the vibrator in the second direction.

2. The game controller according to claim 1, wherein the first direction and the second direction are orthogonal to each other.

3. The game controller according to claim 1, wherein in a front view of the game controller, the first direction corresponds to a left-right direction of the game controller.

4. The game controller according to claim 1, wherein in a front view of the game controller, the second direction corresponds to a front-back direction of the game controller.

5. The game controller according to claim 1, wherein the vibrator has a cuboid shape.

6. The game controller according to claim 1, wherein the first and second surfaces of the vibrator are configured to contact planar surface portions of an inner surface of the housing.

7. The game controller according to claim 1, wherein at least one of the first surface of the vibrator or the second surface of the vibrator is configured to contact a rib portion of an inner surface of the housing.

8. The game controller according to claim 1, wherein the vibrator is contained in a holder, and the holder is fixed to the housing.

9. The game controller according to claim 8, wherein the holder is configured to cover at least a part of the vibrator, and at least a surface of the holder corresponding to the first surface of the vibrator is open.

10. The game controller according to claim 8, wherein the holder comprises an elastic material.

11. The game controller according to claim 1, wherein the vibrator comprises a first vibrator and a second vibrator,
the first vibrator is configured to vibrate in the first direction and the second direction,
the second vibrator is configured to vibrate in the first direction and the second direction,
the housing includes a left grip portion and a right grip portion,
the first vibrator is disposed in the left grip portion, and the second vibrator is disposed in the right grip portion,
the first vibrator includes a first surface configure to contact the left grip portion when the first vibrator vibrates in the first direction and a second surface, different from the first surface, configured to contact the left grip portion when the first vibrator vibrates in the second direction, and
the second vibrator includes a first surface configured to contact the right grip portion when the second vibrator vibrates in the first direction and a second surface, different from the first surface, configures to contact the right grip potion when the second vibrator vibrates in the second direction.

12. The game controller according to claim 1, wherein the housing includes a grip portion configured to be held by a hand of a user including a palm, and
the first surface of the vibrator is configured to contact first portion of the grip portion with which the palm of the user comes into contact.

13. The game controller according to claim 1, wherein in a front view of the game controller, the first direction corresponds to a left-right direction of the game controller, and the second direction to a front-back direction of the game controller, and
a first resonance frequency of vibration of the vibrator in the first direction is different from a second resonance frequency of vibration of the vibrator in the second direction.

14. The game controller according to claim 1, wherein the housing includes a main body housing and a grip portion, and
at least the first surface of the vibrator is configured to directly contact the grip portion.

15. The game controller according to claim 14, wherein the vibrator is configured to contact the main body housing through a buffer member.

16. A system comprising:
a game machine configured to execute a game program for playing a video game; and
a game controller according to claim 1.

17. A game controller comprising:
a housing; and
a vibrator contained in the housing and configured to vibrate in a first direction and a second direction different from the first direction, wherein
the vibrator includes a first surface configured to contact the housing when the vibrator vibrates in the first direction and a second surface, different from the first surface, configured to contact the housing when the vibrator vibrates in the second direction.
the housing includes a first portion and a second portion thicker than the first portion, and
at least one of the first surface of the vibrator or the second surface of the vibrator is configured to contact the first portion of the housing.

18. A game controller comprising;
a housing; and
a vibrato contained in the housing and configured to vibrate in a first direction and a second direction different from the first direction, wherein
the vibrator includes a first surface configured to contact the housing when the vibrator vibrates in the first direction and a second surface, different from the first surface, configured to contact the housing when the vibrator vibrates in the second direction, wherein
the housing includes a grip potion configured to be held by a hand of a user including a palm,
the first surface of the vibrator is configured to contact a first portion of the grip portion with which the palm of the user comes into contact, the grip portion includes a second portion different from the first portion, the first portion corresponds to an approximate center portion of the palm of the user, and the second portion corresponds to a portion of a finger of the user, the second surface of the vibrator is configured to contact the second portion of the grip portion, and a first resonance frequency of vibration of the vibrator in the first direction is different from a second resonance frequency of vibration of the vibrator in the second direction.

19. A game controller comprising:

a housing; and a vibrator contained in the housing and configured to vibrate in a first direction and second direction different from the first direction, wherein the vibrator includes a first surface configured to contact the housing when the vibrator vibrates in the first direction and a second surface, different from the first surface, configured to contact the housing when the vibrator vibrates in the second direction, the vibrator has as resonance frequencies, a first resonance frequency and a second resonance frequency, different from the first resonance frequency.

20. The game controller according to claim 19, wherein the vibrator comprises a linear vibration actuator.

21. A game controller comprising:

a housing; and a vibrator contained in the housing and configured to vibrate in a first direction and second direction different from the first direction, wherein the vibrator includes a first surface configured to contact the housing when the vibrator vibrates in the first direction and a second surface, different from the first surface, configured to contact the housing when the vibrator vibrates in the second direction, the vibrator is configured to receive respective signals at a given time, each causing vibration in a different one of the first and second directions, and a first resonant frequency of vibration of the vibrator in the first direction is different from a second resonant frequency of vibration of the vibrator in the second direction.

22. A system comprising:

a game machine configured to execute a game program for playing a video game; and a game controller according to claim 21.

* * * * *